US011010443B1

(12) United States Patent
Alvidrez Falconer

(10) Patent No.: US 11,010,443 B1
(45) Date of Patent: May 18, 2021

(54) SYSTEM AND METHOD FOR READING, SEARCHING AND ENHANCING SOCIALIZATION AND DEMOCRATIZATION OF GENERAL LITERATURE AND DIVERSE TYPES OF CONTENT FROM AN ELECTRONIC TEXT REPOSITORY

(71) Applicant: Carlos Eduardo Alvidrez Falconer, Waxhaw, NC (US)

(72) Inventor: Carlos Eduardo Alvidrez Falconer, Waxhaw, NC (US)

(*) Notice: Subject to any disclaimer, the term of this patent is extended or adjusted under 35 U.S.C. 154(b) by 110 days.

(21) Appl. No.: 16/514,162

(22) Filed: Jul. 17, 2019

(51) Int. Cl.

| | |
|---|---|
| ***G06F 16/95*** | (2019.01) |
| ***G06F 16/9536*** | (2019.01) |
| ***G06F 16/957*** | (2019.01) |
| ***G06F 16/951*** | (2019.01) |
| ***G06F 16/955*** | (2019.01) |
| ***G06F 16/958*** | (2019.01) |

(52) U.S. Cl.
CPC ........ *G06F 16/9536* (2019.01); *G06F 16/951* (2019.01); *G06F 16/955* (2019.01); *G06F 16/958* (2019.01); *G06F 16/9574* (2019.01)

(58) Field of Classification Search
CPC .................................................. G06F 16/9536
USPC ........................................................ 707/707
See application file for complete search history.

(56) References Cited

U.S. PATENT DOCUMENTS

| | | | | |
|---|---|---|---|---|
| 2004/0230572 | A1* | 11/2004 | Omoigui | G06F 16/3338 |
| 2008/0183750 | A1* | 7/2008 | Lee | G06Q 10/10 |
| 2010/0250497 | A1* | 9/2010 | Redlich | H04L 63/0227 707/661 |
| 2012/0330759 | A1* | 12/2012 | Aggarwal | G06Q 30/0282 705/14.73 |
| 2013/0232170 | A1* | 9/2013 | Hirate | G06F 16/3322 707/769 |
| 2016/0225278 | A1* | 8/2016 | Leddy | G09B 5/06 |
| 2017/0224990 | A1* | 8/2017 | Goldwasser | A61N 1/0456 |

* cited by examiner

*Primary Examiner* — Syling Yen
(74) *Attorney, Agent, or Firm* — Cramer Patent & Design, PLLC; Aaron R. Cramer

(57) ABSTRACT

A system for reading, searching and enhancing socialization and democratization of general literature and diverse types of content from an electronic text repository that allows more persons to be able to meet and interact in a more intimate fashion while utilizing additional capabilities than before the Internet. The overall system includes a method and a non-transitory computer storage media for reading, searching and enhancing socialization and democratization of general literature and diverse types of content from an electronic text repository.

21 Claims, 43 Drawing Sheets

800

Browse Titles Search Activity 13 books / 19 translations

Figure 10:
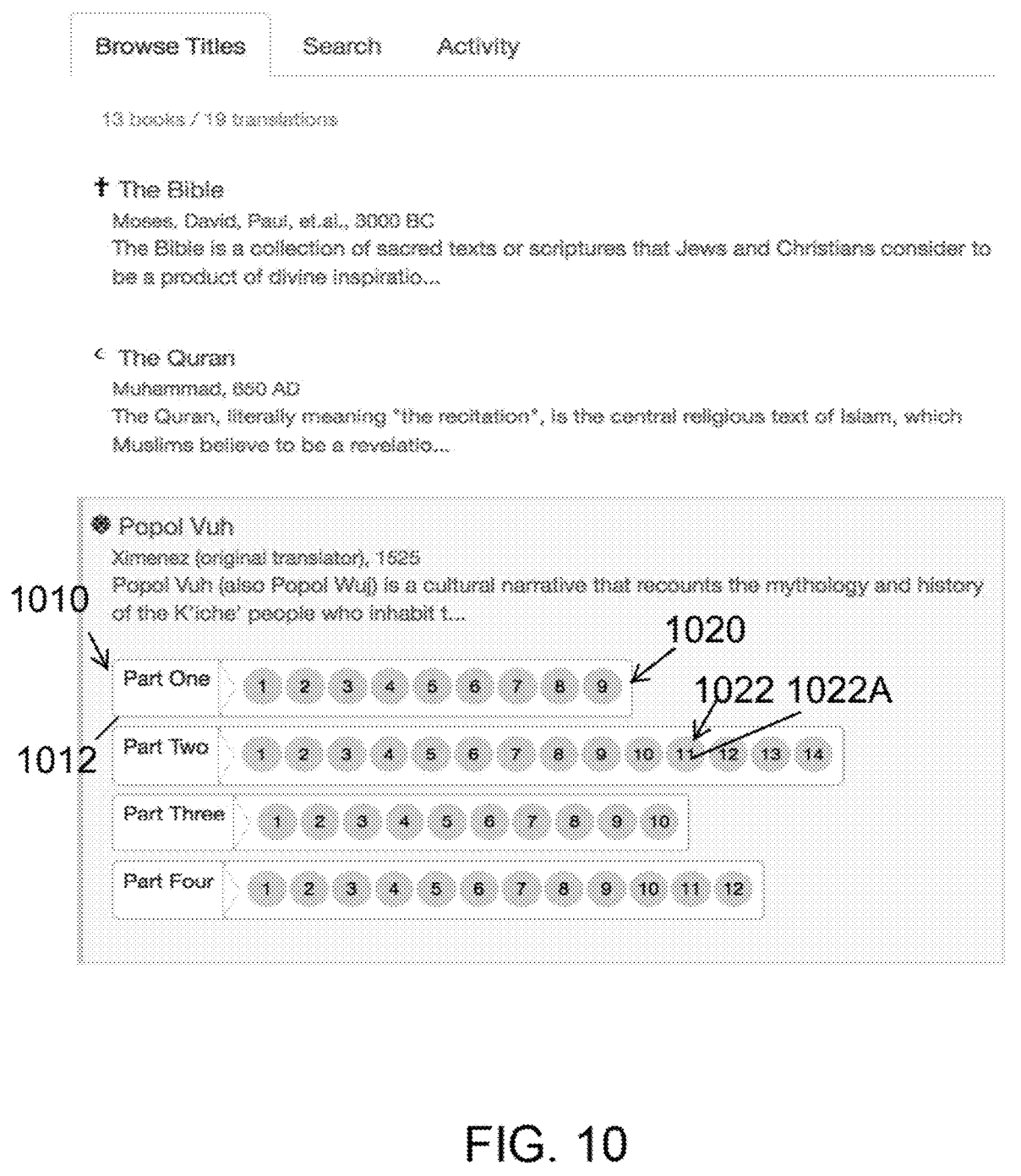

The Bible
Moses, David, Paul, et.al., 3000 BC
The Bible is a collection of sacred texts or scriptures that Jews and Christians consider to be a product of divine inspiratio...

The Quran
Muhammad, 650 AD
The Quran, literally meaning "the recitation", is the central religious text of Islam, which Muslims believe to be a revelatio...

Popol Vuh
Ximenez (original translator), 1525
Popol Vuh (also Popol Wuj) is a cultural narrative that recounts the mythology and history of the K'iche' people who inhabit t...

1010 1012 1020 1022 1022A

Part One 1 2 3 4 5 6 7 8 9
Part Two 1 2 3 4 5 6 7 8 9 10 11 12 13 14
Part Three 1 2 3 4 5 6 7 8 9 10
Part Four 1 2 3 4 5 6 7 8 9 10 11 12

1 In the beginning God created the heaven and the earth.

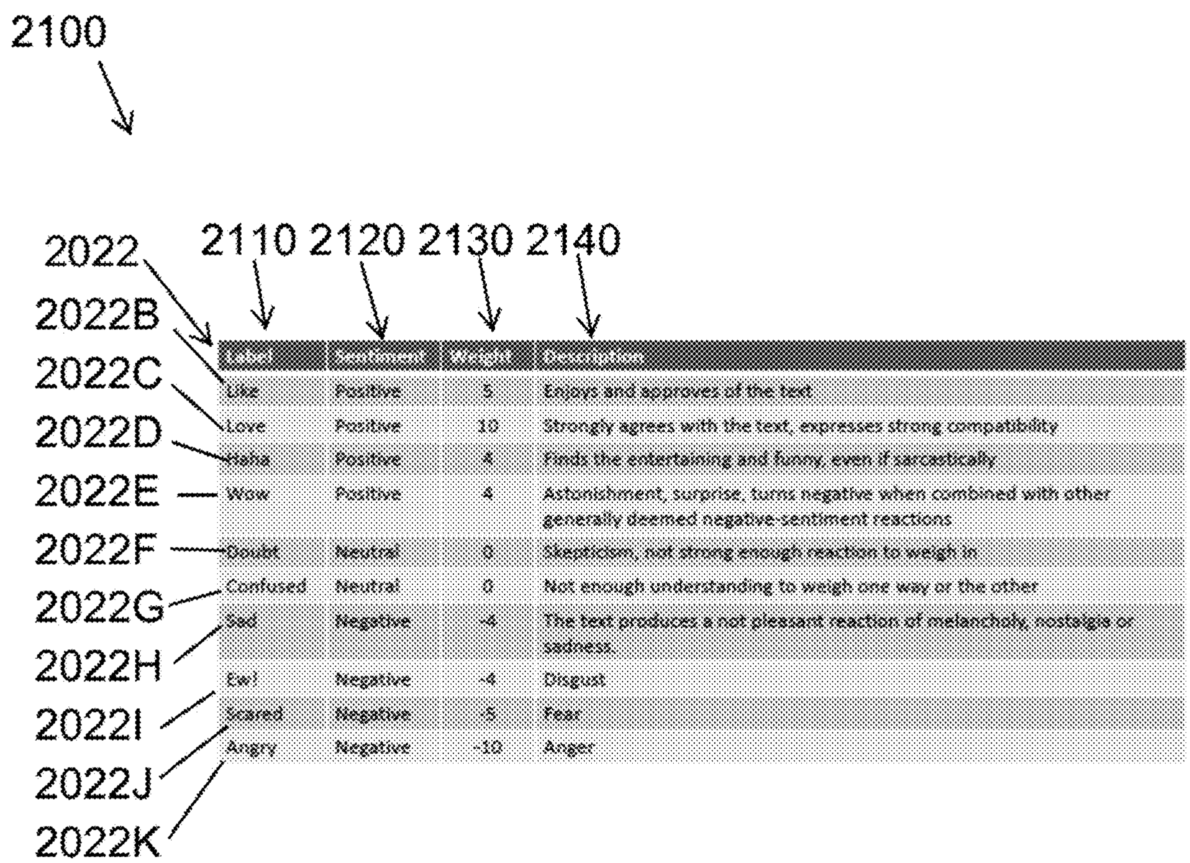

| Label | Sentiment | Weight | Description |
|---|---|---|---|
| Like | Positive | 5 | Enjoys and approves of the text |
| Love | Positive | 10 | Strongly agrees with the text, expresses strong compatibility |
| Haha | Positive | 4 | Finds the entertaining and funny, even if sarcastically |
| Wow | Positive | 4 | Astonishment, surprise, turns negative when combined with other generally deemed negative-sentiment reactions |
| Doubt | Neutral | 0 | Skepticism, not strong enough reaction to weigh in |
| Confused | Neutral | 0 | Not enough understanding to weigh one way or the other |
| Sad | Negative | -4 | The text produces a not pleasant reaction of melancholy, nostalgia or sadness. |
| Ew! | Negative | -4 | Disgust |
| Scared | Negative | -5 | Fear |
| Angry | Negative | -10 | Anger |

FIG. 21

| | Love | Haha | Wow | [illegible] | [illegible] | Sad | Ew! | Scared | Angry |
|---|---|---|---|---|---|---|---|---|---|
| Like | Yes | Yes | Yes | No | No | No | No | No | No |
| Love | | Yes | Yes | No | No | No | No | No | No |
| Haha | | | Yes | No | No | No | Yes | No | No |
| Wow | | | | Yes | Yes | Yes | Yes | Yes | Yes |
| [illegible] | | | | | Yes | Yes | Yes | Yes | Yes |
| [illegible] | | | | | | Yes | Yes | Yes | Yes |
| Sad | | | | | | | Yes | Yes | Yes |
| Ew! | | | | | | | | Yes | Yes |
| Scared | | | | | | | | | Yes |
| Angry | | | | | | | | | |

2700

»« I have forgiven thee once.... Thy sins which are many are forgiven thee for thou hast loved much...,' And he will forgive my Sonia, He will forgive, I know it... I felt it in my heart when I was with her just now!

»« And He will judge and will forgive all, the good and the evil, the wise and the meek.... And when He has done with all of them, then He will summon us.

»« 'You too come forth,' He will say, 'Come forth ye drunkards, come forth, ye weak ones, come forth, ye children of shame!' And we shall all come forth, without shame and shall stand before him.

»« And He will say unto us, 'Ye are swine, made in the Image of the Beast and with his mark;

»« but come ye also!' And the wise ones and those of understanding will say, 'Oh Lord, why dost Thou receive these men?' And He will say, 'This is why I receive them, oh ye wise, this is why I receive them, oh ye of understanding, that not one of them believed himself to be worthy of this.' And He will hold out His hands to us and we shall fall down before him... and we shall weep... and we shall understand all things! Then we shall understand all!... and all will understand, Katerina Ivanovna even... she will understand.... Lord, Thy kingdom come!"

2710 2720 2730 2740 2750 2752

```
<div
    language-id="1"
    title-id="20"
    translation-id="2001"
    volume-number="0"
    book-number="1"
    chapter-number="2"
    chapter-key="2"
    paragraph-number="35"
    verse-key="204100"
    verse-id="1991624"
>
    And He will judge and will forgive all, the good and the evil,
    the wise and the meek....
    And when He has done with all of them, then He will summon us.
</div>
```

```
{
    "_id" : NumberInt(1991624),

    "l" : NumberInt(1),
    "lt" : "english",

    "s" : NumberInt(20),
    "t" : NumberInt(2001),
    "_ts" : [
        NumberInt(2001)
    ],

    "vln" : NumberInt(0),
    "bn" : NumberInt(1),
    "ck" : NumberInt(2),
    "cn" : NumberInt(2),
    "ct" : "Untitled",
    "pn" : NumberInt(05),

    "vk" : NumberInt(204100),
    "vn" : NumberInt(146),
    "vt" : "And He will judge and will forgive all, ...",

    "at" : ISODate("2017-12-02T00:40:00.200-0500"),
    "by" : "7cGCJYnJSK234nsa23zfv"
}
```

Figure 29A:
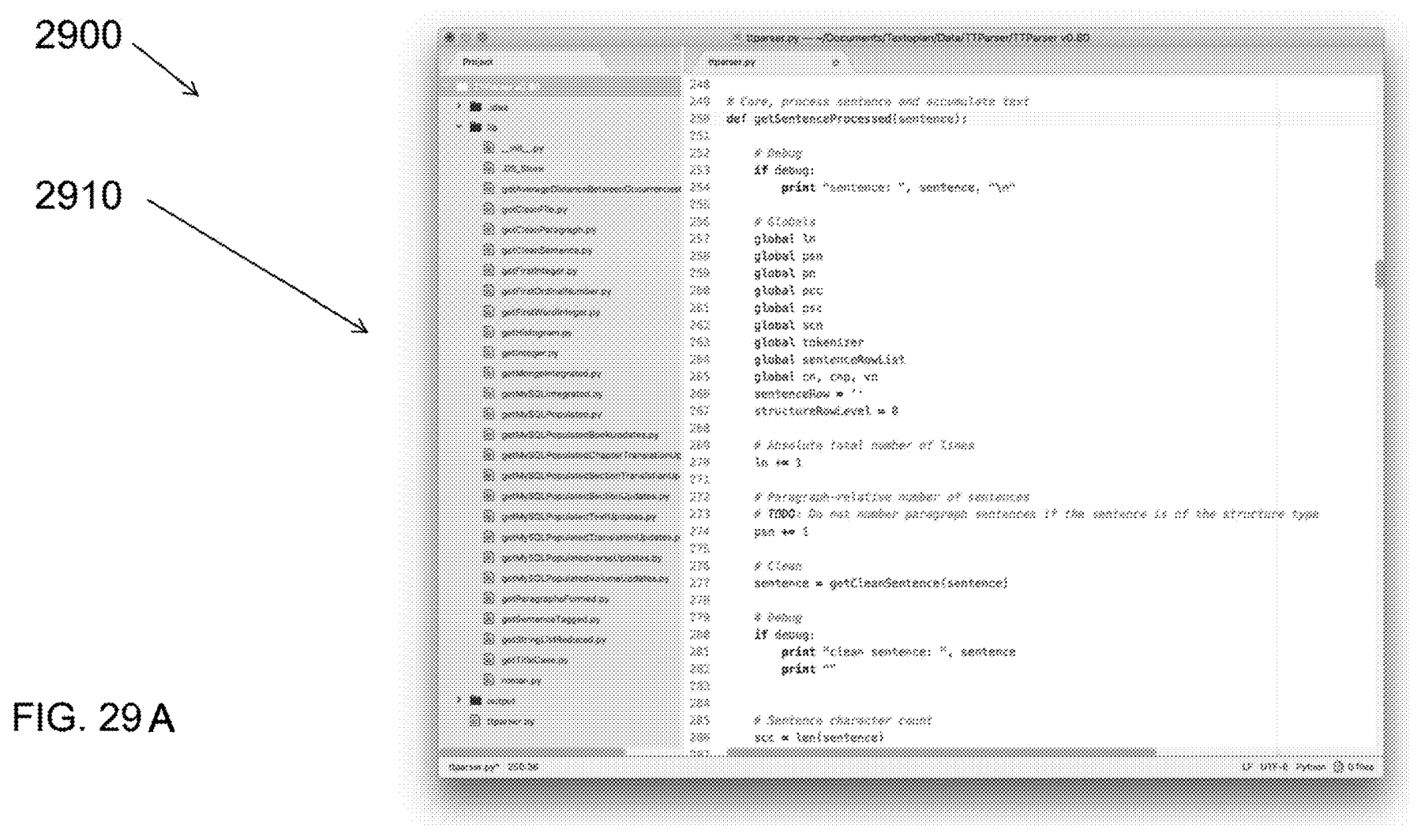

```
# Core, process sentence and accumulate text
def getSentenceProcessed(sentence):

    # Debug
    if debug:
        print "sentence: ", sentence, "\n"

    # Globals
    global ln
    global psn
    global pn
    global scc
    global psc
    global scn
    global tokenizer
    global sentenceRowList
    global cn, cnp, vn
    sentenceRow = ''
    structureRowLevel = 0

    # Absolute total number of lines
    ln += 1

    # Paragraph-relative number of sentences
    # TODO: Do not number paragraph sentences if the sentence is of the structure type
    psn += 1

    # Clean
    sentence = getCleanSentence(sentence)

    # Debug
    if debug:
        print "clean sentence: ", sentence
        print ""


    # Sentence character count
    scc = len(sentence)
```

Figure 29B:
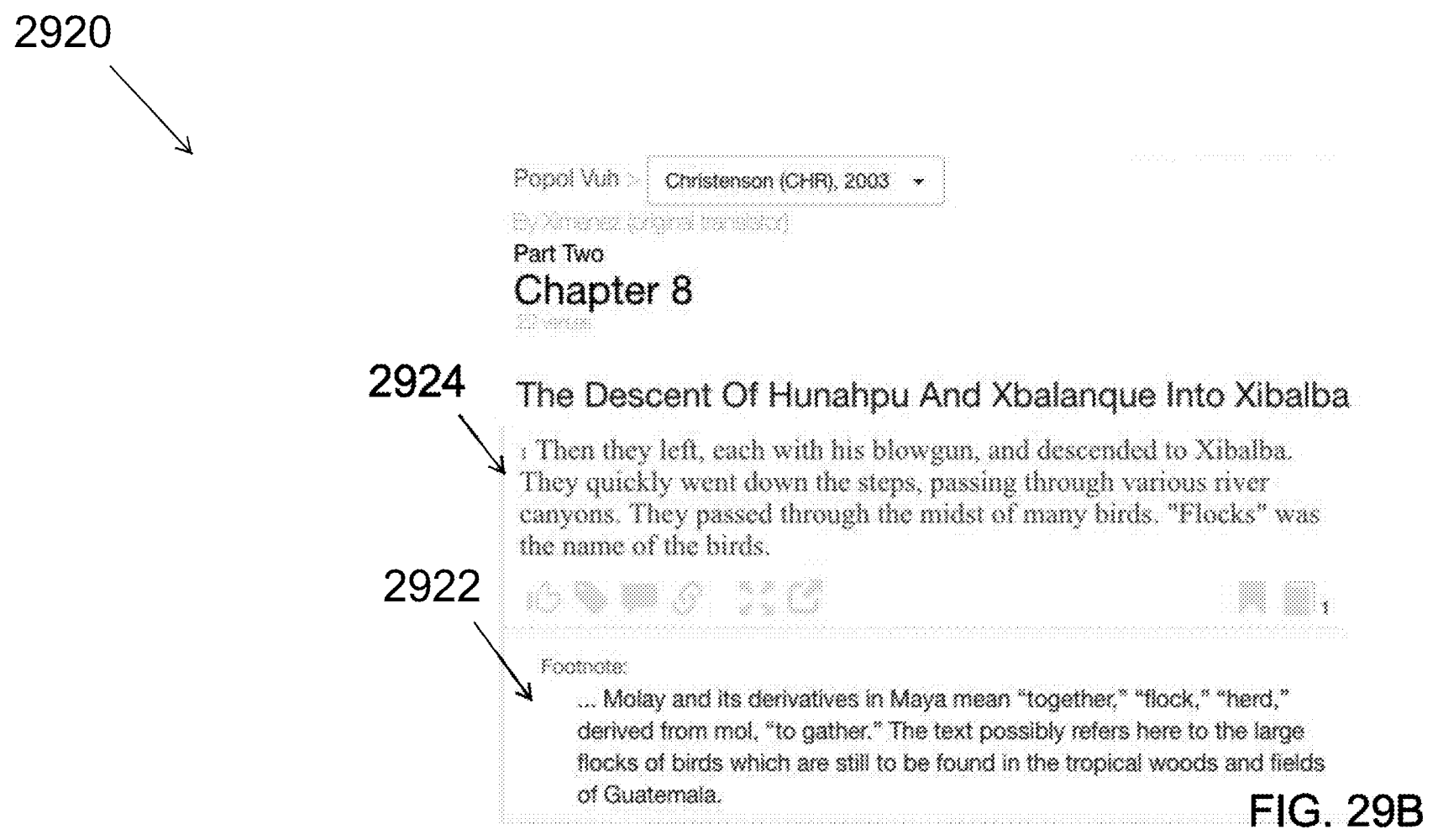

Popol Vuh > Christenson (CHR), 2003

Part Two

Chapter 8

2924

The Descent Of Hunahpu And Xbalanque Into Xibalba

1 Then they left, each with his blowgun, and descended to Xibalba. They quickly went down the steps, passing through various river canyons. They passed through the midst of many birds. "Flocks" was the name of the birds.

2922

Footnote:

... Molay and its derivatives in Maya mean "together," "flock," "herd," derived from mol, "to gather." The text possibly refers here to the large flocks of birds which are still to be found in the tropical woods and fields of Guatemala.

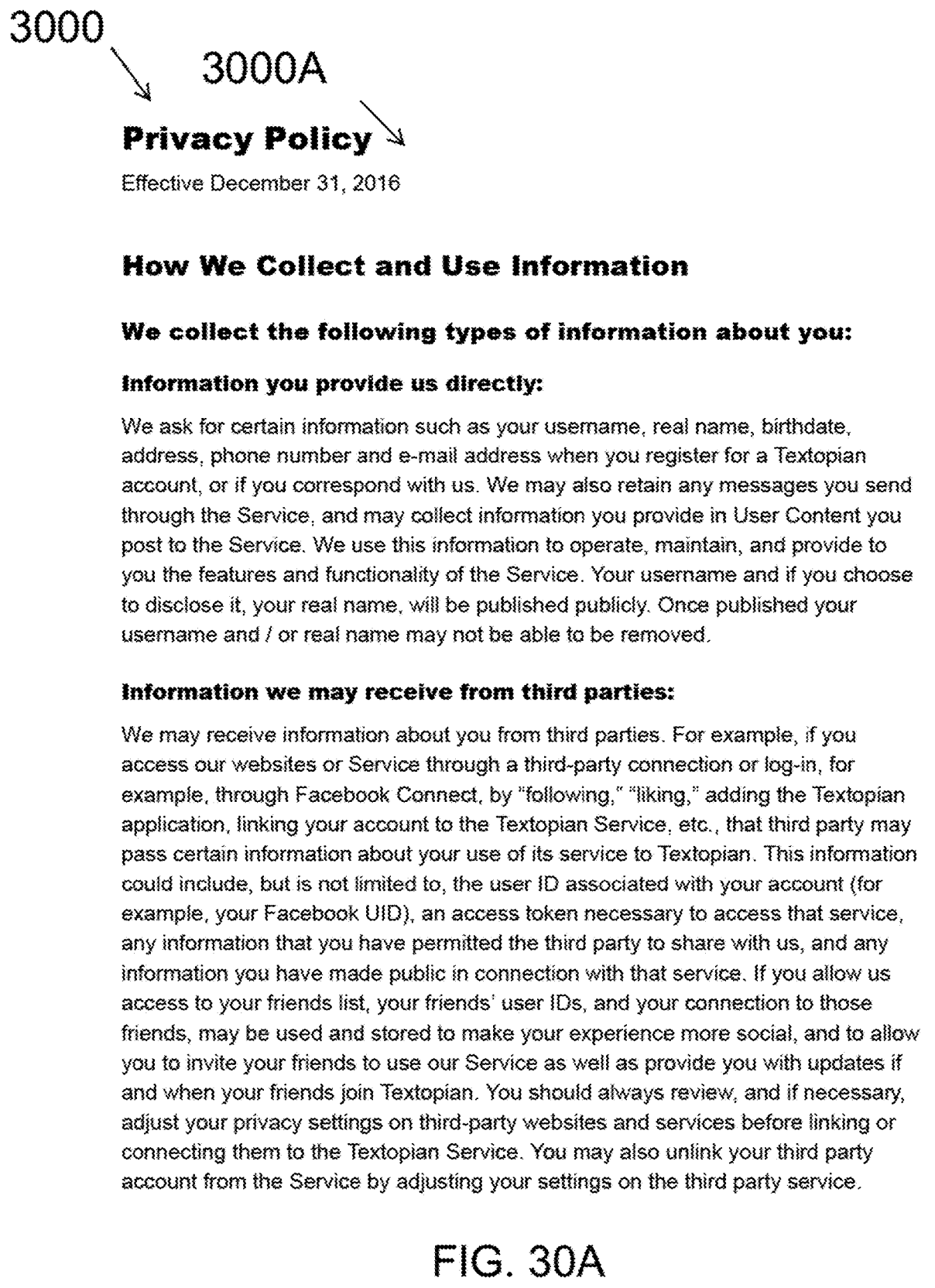

Privacy Policy

Effective December 31, 2016

How We Collect and Use Information

We collect the following types of information about you:

Information you provide us directly:

We ask for certain information such as your username, real name, birthdate, address, phone number and e-mail address when you register for a Textopian account, or if you correspond with us. We may also retain any messages you send through the Service, and may collect information you provide in User Content you post to the Service. We use this information to operate, maintain, and provide to you the features and functionality of the Service. Your username and if you choose to disclose it, your real name, will be published publicly. Once published your username and / or real name may not be able to be removed.

Information we may receive from third parties:

We may receive information about you from third parties. For example, if you access our websites or Service through a third-party connection or log-in, for example, through Facebook Connect, by "following," "liking," adding the Textopian application, linking your account to the Textopian Service, etc., that third party may pass certain information about your use of its service to Textopian. This information could include, but is not limited to, the user ID associated with your account (for example, your Facebook UID), an access token necessary to access that service, any information that you have permitted the third party to share with us, and any information you have made public in connection with that service. If you allow us access to your friends list, your friends' user IDs, and your connection to those friends, may be used and stored to make your experience more social, and to allow you to invite your friends to use our Service as well as provide you with updates if and when your friends join Textopian. You should always review, and if necessary, adjust your privacy settings on third-party websites and services before linking or connecting them to the Textopian Service. You may also unlink your third party account from the Service by adjusting your settings on the third party service.

FIG. 30A

3000B possible. If you believe that we might have any information from or about a child under 13, please contact us at admin@textopian.com.

Figure 30B:
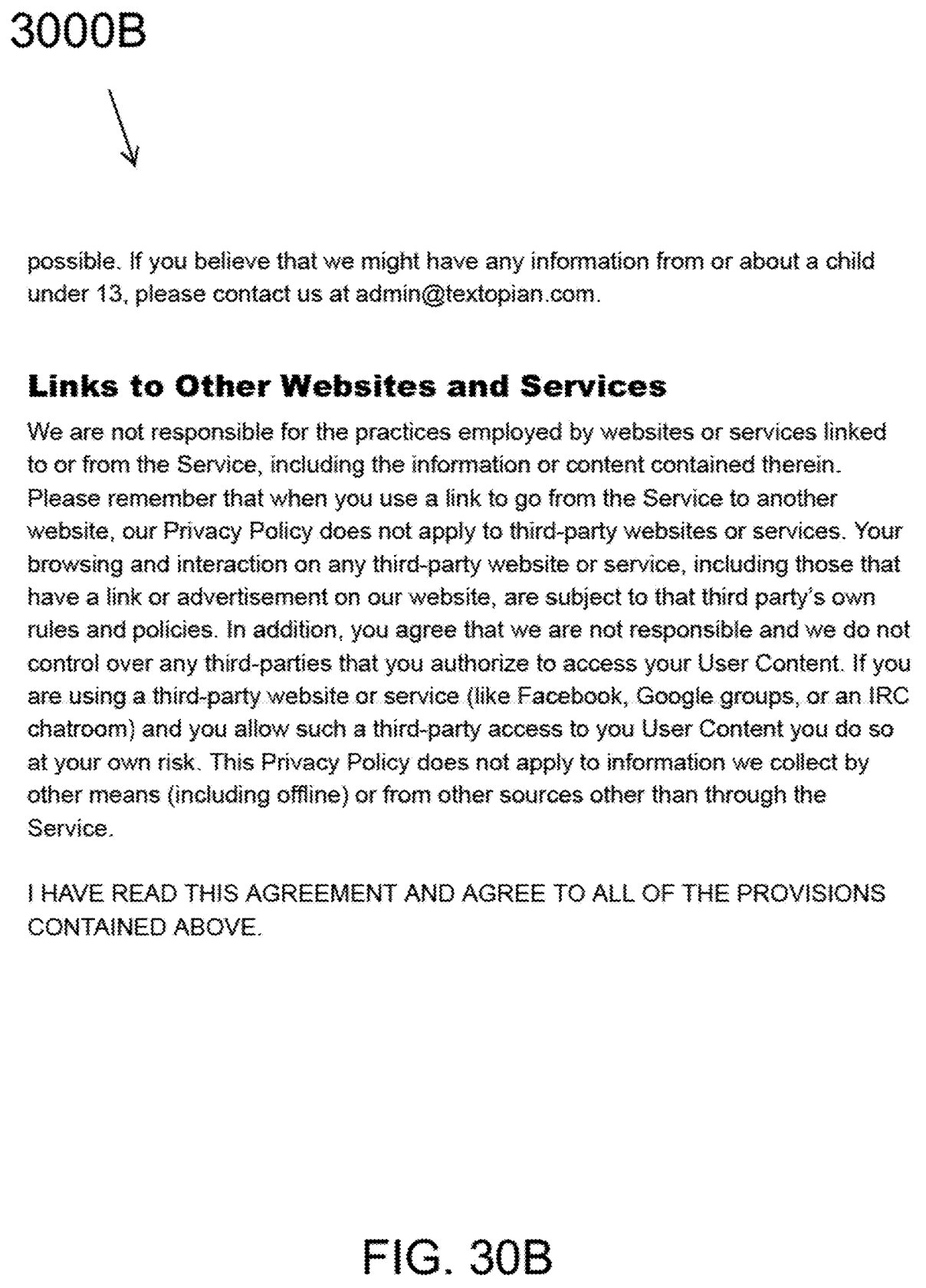

Links to Other Websites and Services

We are not responsible for the practices employed by websites or services linked to or from the Service, including the information or content contained therein. Please remember that when you use a link to go from the Service to another website, our Privacy Policy does not apply to third-party websites or services. Your browsing and interaction on any third-party website or service, including those that have a link or advertisement on our website, are subject to that third party's own rules and policies. In addition, you agree that we are not responsible and we do not control over any third-parties that you authorize to access your User Content. If you are using a third-party website or service (like Facebook, Google groups, or an IRC chatroom) and you allow such a third-party access to you User Content you do so at your own risk. This Privacy Policy does not apply to information we collect by other means (including offline) or from other sources other than through the Service.

I HAVE READ THIS AGREEMENT AND AGREE TO ALL OF THE PROVISIONS CONTAINED ABOVE.

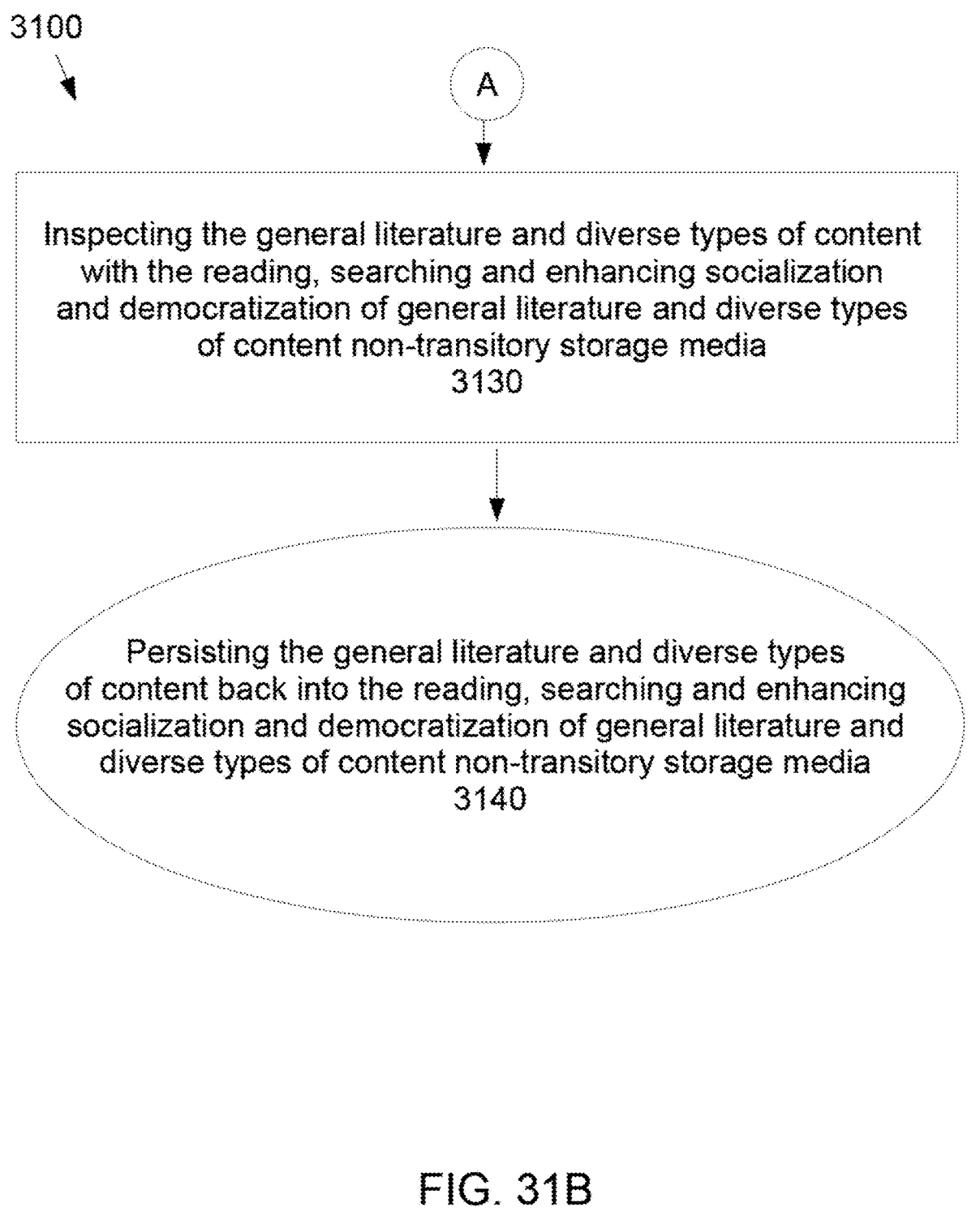

Inspecting the general literature and diverse types of content with the reading, searching and enhancing socialization and democratization of general literature and diverse types of content non-transitory storage media
3130

Persisting the general literature and diverse types of content back into the reading, searching and enhancing socialization and democratization of general literature and diverse types of content non-transitory storage media
3140

FIG. 31B

SYSTEM AND METHOD FOR READING, SEARCHING AND ENHANCING SOCIALIZATION AND DEMOCRATIZATION OF GENERAL LITERATURE AND DIVERSE TYPES OF CONTENT FROM AN ELECTRONIC TEXT REPOSITORY

RELATED APPLICATIONS

None.

FIELD OF THE INVENTION

The present invention generally relates to a system and method for reading, searching and enhancing general literature and diverse types of content. More specifically, the present invention is a system and method for reading, searching and enhancing socialization and democratization of general literature and diverse types of content from an electronic text repository.

BACKGROUND OF THE INVENTION

The Internet has dramatically changed the way people around the world do many things. The Internet also has changed the way people access literature and diverse types of content. Before the Internet, persons would meet in libraries, universities and other academic venues to read, search and enhance their literature experiences.

Some of the intangible experiences of meeting in person, such as meeting and debating salient issues, the smell from old and classic books and manuscripts and experience meeting in famous and hallowed venues, may be missing. However, with the Internet, more persons may be able to meet and interact in an even more intimate fashion while reading, searching and enhancing socialization and democratization of general literature and diverse types of content.

What is needed is a system and method for reading, searching and enhancing socialization and democratization of general literature and diverse types of content from an electronic text repository that allows more persons to be able to meet and interact in a more intimate fashion while utilizing additional capabilities than before the Internet.

SUMMARY OF THE INVENTION

The present invention generally relates to a system and method for reading, searching and enhancing general literature and diverse types of content. More specifically, the present invention is a system and method for reading, searching and enhancing socialization and democratization of general literature and diverse types of content from an electronic text repository.

The system for reading, searching and enhancing socialization and democratization of general literature and diverse types of content from an electronic text repository may include a server system with a processor system, a communications interface, a communications system, an input system and an output system, the server system having access to a communications network; a memory system with an operating system, a communications module, a web browser module, a web server application and a reading, searching and enhancing socialization and democratization of general literature and diverse types of content non-transitory storage media, the electronic text repository residing on the reading, searching and enhancing socialization and democratization of general literature and diverse types of content non-transitory storage media, the memory system is in communication with the server system through the communications network and the electronic text repository includes the general literature and diverse types of content and a website having a plurality of web pages, the web pages reside on the electronic text repository and includes the general literature and diverse types of content.

The method for reading, searching and enhancing socialization and democratization of general literature and diverse types of content from an electronic text repository may include the steps of inputting the general literature and diverse types of content into a system for reading, searching and enhancing socialization and democratization of general literature and diverse types of content from an electronic text repository; cleaning, analyzing and synthesizing the general literature and diverse types of content into one or more volumes, one or more books, one or more chapters, one or more sections, one or more paragraphs, one or more sentences and one or more verses with a reading, searching and enhancing socialization and democratization of general literature and diverse types of content non-transitory storage media of a system for reading, searching and enhancing socialization and democratization of general literature and diverse types of content from an electronic text repository; inspecting the general literature and diverse types of content with the reading, searching and enhancing socialization and democratization of general literature and diverse types of content non-transitory storage media; and persisting the general literature and diverse types of content back into the reading, searching and enhancing socialization and democratization of general literature and diverse types of content non-transitory storage media.

There is a corresponding non-transitory computer storage media having instructions stored thereon which, when executed, execute the overall method comprising the steps of inputting the general literature and diverse types of content into a system for reading, searching and enhancing socialization and democratization of general literature and diverse types of content from an electronic text repository; cleaning, analyzing and synthesizing the general literature and diverse types of content into one or more volumes, one or more books, one or more chapters, one or more sections, one or more paragraphs, one or more sentences and one or more verses with a reading, searching and enhancing socialization and democratization of general literature and diverse types of content non-transitory storage media of a system for reading, searching and enhancing socialization and democratization of general literature and diverse types of content from an electronic text repository; inspecting the general literature and diverse types of content with the reading, searching and enhancing socialization and democratization of general literature and diverse types of content non-transitory storage media; and persisting the general literature and diverse types of content back into the reading, searching and enhancing socialization and democratization of general literature and diverse types of content non-transitory storage media.

It is an object of the present invention to provide a system and method for reading, searching and enhancing socialization and democratization of general literature and diverse types of content from an electronic text repository that provides a text-searchable web-based electronic text repository of general literature and diverse types of content.

It is an object of the present invention to provide a system and method for reading, searching and enhancing socialization and democratization of general literature and diverse types of content from an electronic text repository that allows a user to track his or hers reading activity by automatically logging the text being displayed and enriched (commented-on, bookmarked, tagged, or the like).

It is an object of the present invention to provide a system and method for reading, searching and enhancing socialization and democratization of general literature and diverse types of content from an electronic text repository that every time a person reads, bookmarks, tags, comments, reacts-to and shares content, the overall system is fed and enabled for better searching results.

It is an object of the present invention to provide a system and method for reading, searching and enhancing socialization and democratization of general literature and diverse types of content from an electronic text repository that may search not only over the body of the original content or text, but also on the tags people add to a given text piece.

It is an object of the present invention to provide a system and method for reading, searching and enhancing socialization and democratization of general literature and diverse types of content from an electronic text repository that is the democratization of the interpretation of written content, and the leveraging of such contributions for the identification of topics, keywords and overall for the betterment of the search engine of the overall system.

It is an object of the present invention to provide a system and method for reading, searching and enhancing socialization and democratization of general literature and diverse types of content from an electronic text repository that allows a user to create a reading group and monitor the reading activity of his or her peers and/or subordinates.

It is an object of the present invention to provide a system and method for reading, searching and enhancing socialization and democratization of general literature and diverse types of content from an electronic text repository that allows a user to tag and comment on any fragment of a piece of text.

It is an object of the present invention to provide a system and method for reading, searching and enhancing socialization and democratization of general literature and diverse types of content from an electronic text repository that allows a user to relate any piece of text or to any other piece of text, whether within the same book, document, article or not.

It is an object of the present invention to provide a system and method for reading, searching and enhancing socialization and democratization of general literature and diverse types of content from an electronic text repository that allows a user to react to any piece of text and view how other users react to the same piece of text, where reactions are a classification of human emotions applied to the interpretation and assimilation of a given piece of text such as like, love, anger, disgust, or other human emotions.

It is an object of the present invention to provide a system and method for reading, searching and enhancing socialization and democratization of general literature and diverse types of content from an electronic text repository that provides powerful text-search capabilities over entire bodies of literature such as full books, manuscripts and other documents in plain text, in which the search may optionally extend to user generated content such as tags, comments, and relationships between texts.

It is an object of the present invention to provide a system and method for reading, searching and enhancing socialization and democratization of general literature and diverse types of content from an electronic text repository that provide precise partition or presentation of the exact same piece of text from different translations of a given body of literary work, regardless of whether the text was originally split-up by the author into verses.

It is an object of the present invention to provide a system and method for reading, searching and enhancing socialization and democratization of general literature and diverse types of content from an electronic text repository that calculates an average reaction to a given text.

It is an object of the present invention to provide a system and method for reading, searching and enhancing socialization and democratization of general literature and diverse types of content from an electronic text repository that creates a universally unique ID for every piece of text in a body of literature (such as a book, an article, or the like), which will always point to the exact same piece of text.

It is an object of the present invention to provide a system and method for reading, searching and enhancing socialization and democratization of general literature and diverse types of content from an electronic text repository that has an ability to share a direct button to either a book, a volume, a chapter, a section, a paragraph, a verse or a sentence of any piece of literature.

It is an object of the present invention to provide a system and method for reading, searching and enhancing socialization and democratization of general literature and diverse types of content from an electronic text repository that provides tracking and gamification of a user's reading progress and habits.

BRIEF DESCRIPTION OF THE DRAWINGS

The present invention will be described by way of exemplary embodiments, but not limitations, illustrated in the accompanying drawings in which like references denote similar elements.

FIG. 10 illustrates a screenshot of a browse titles page, in accordance with one embodiment of the present invention.

FIG. 12 illustrates a screenshot of a user-generated content page, in accordance with one embodiment of the present invention.

FIG. 19 illustrates a screenshot of a verse translation page, in accordance with one embodiment of the present invention.

FIG. 20 illustrates a screenshot of a plurality of reactions page, in accordance with one embodiment of the present invention.

FIG. 21 illustrates a listing of a plurality of available reactions, in accordance with one embodiment of the present invention.

FIG. 27 illustrates a pair of screenshots of a verse anatomy page, in accordance with one embodiment of the present invention.

FIG. 28 illustrates a screenshot of a verse database back-end, in accordance with one embodiment of the present invention.

FIG. 29A illustrates a screenshot of a text processing engine, in accordance with one embodiment of the present invention.

FIG. 29B illustrates a screenshot of a footnotes page, in accordance with one embodiment of the present invention.

FIG. 30A and FIG. 30B illustrate a plurality of terms and conditions, in accordance with one embodiment of the present invention.

FIG. 31A and FIG. 31B illustrate a flowchart of a method for data processing for a system for reading, searching and enhancing socialization and democratization of general literature and diverse types of content from an electronic text repository, in accordance with one embodiment of the present invention.

DESCRIPTION OF THE INVENTION

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention however the order of description should not be construed as to imply that these operations are necessarily order dependent. In particular these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
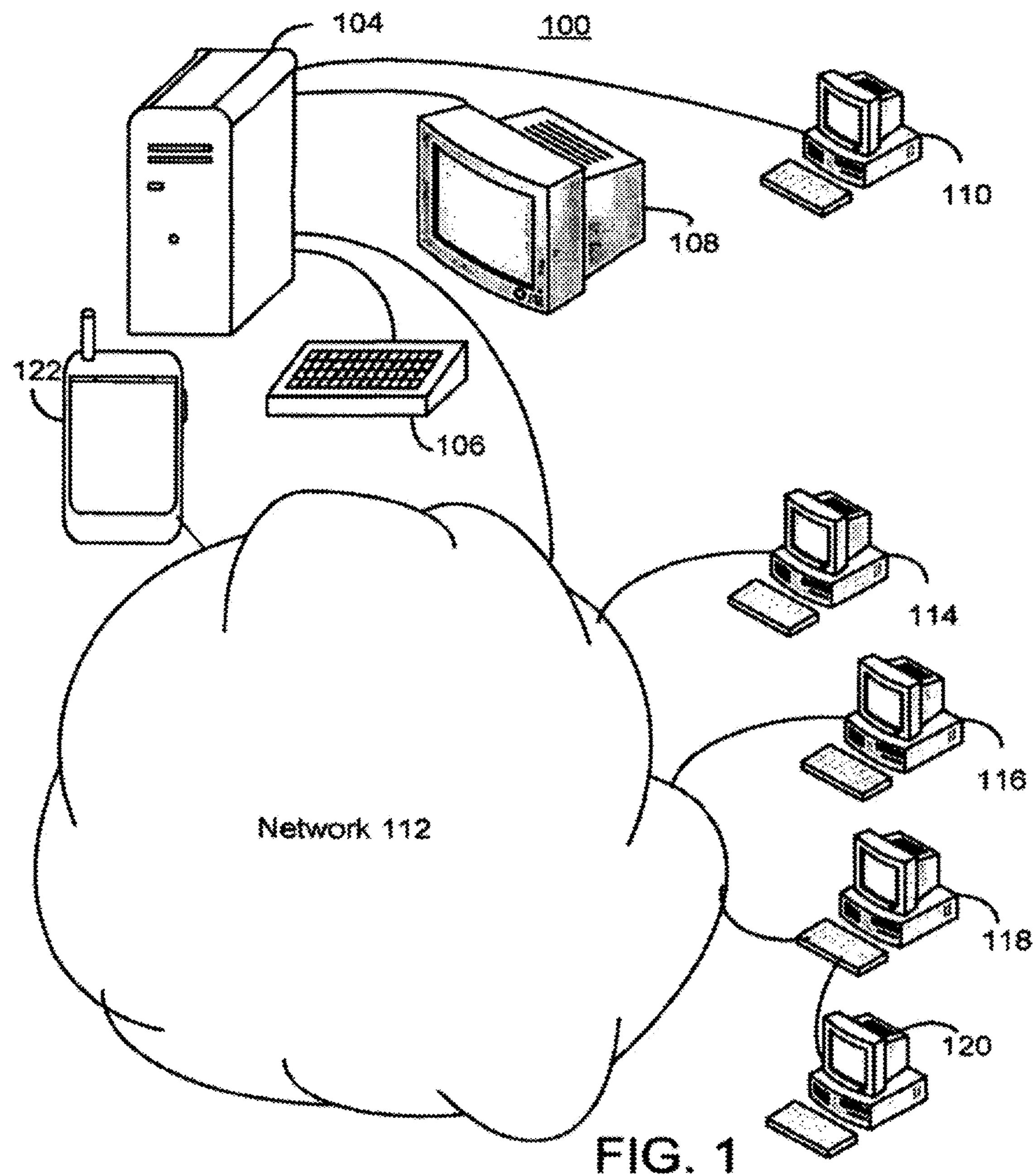
FIG. 1 illustrates a system overview of a system for reading, searching and enhancing socialization and democratization of general literature and diverse types of content from an electronic text repository, in accordance with one embodiment of the present invention.

FIG. 1 illustrates a system overview of a system for reading, searching and enhancing socialization and democratization of general literature and diverse types of content from an electronic text repository 100, in accordance with one embodiment of the present invention.

The overall system 100 includes a server system 104, an input system 106, an output system 108, a plurality of client systems 110, 114, 116, 118 and 120, a communications network 112 and a hand-held device 122. In other embodiments, the overall system 100 may include additional components and/or may not include all of the components listed above.

The server system 104 may include one or more servers. One server 104 may be the property of the distributor of any related software or non-transitory storage media. In other embodiments, the overall system 100 may include additional components and/or may not include all of the components listed above.

The input system 106 may be used for entering input into the server system 104, and may include any one of, some of, any combination of, or all of a keyboard system, a mouse system, a track ball system, a track pad system, a plurality of buttons on a handheld system, a scanner system, a wireless receiver, a microphone system, a connection to a sound system, and/or a connection and/or an interface system to a computer system, an intranet, and/or the Internet (i.e., IrDA, USB), for example.

The output system 108 may be used for receiving output from the server system 104, and may include any one of, some of, any combination of or all of a monitor system, a wireless transmitter, a handheld display system, a printer system, a speaker system, a connection or an interface system to a sound system, an interface system to one or more peripheral devices and/or a connection and/or an interface system to a computer system, an intranet, and/or the Internet, for example.

The overall system 100 illustrates some of the variations of the manners of connecting to the server system 104, which may be an information providing website (not shown). The server system 104 may be directly connected and/or wirelessly connected to the plurality of client systems 110, 114, 116, 118 and 120 and are connected via the communications network 112. Client systems 120 may be connected to the server system 104 via the client system 118. The communications network 112 may be any one of, or any combination of, one or more local area networks or LANs, wide area networks or WANs, wireless networks, telephone networks, the Internet and/or other networks. The communications network 112 may include one or more wireless portals (not shown). The client systems 110, 114, 116, 118 and 120 are any system that an end user may use to access the server system 104. For example, the client systems 110, 114, 116, 118 and 120 may be personal computers, workstations, laptop computers, game consoles, handheld network enabled audio/video players and/or any other network appliance.

The client system 120 accesses the server system 104 via the combination of the communications network 112 and another system, which in this example is the client system 118. The client system 120 is an example of a handheld wireless device 122, such as a mobile phone or a handheld network enabled audio/music player or the like, which may also be used for accessing network content.

Figure 2A:
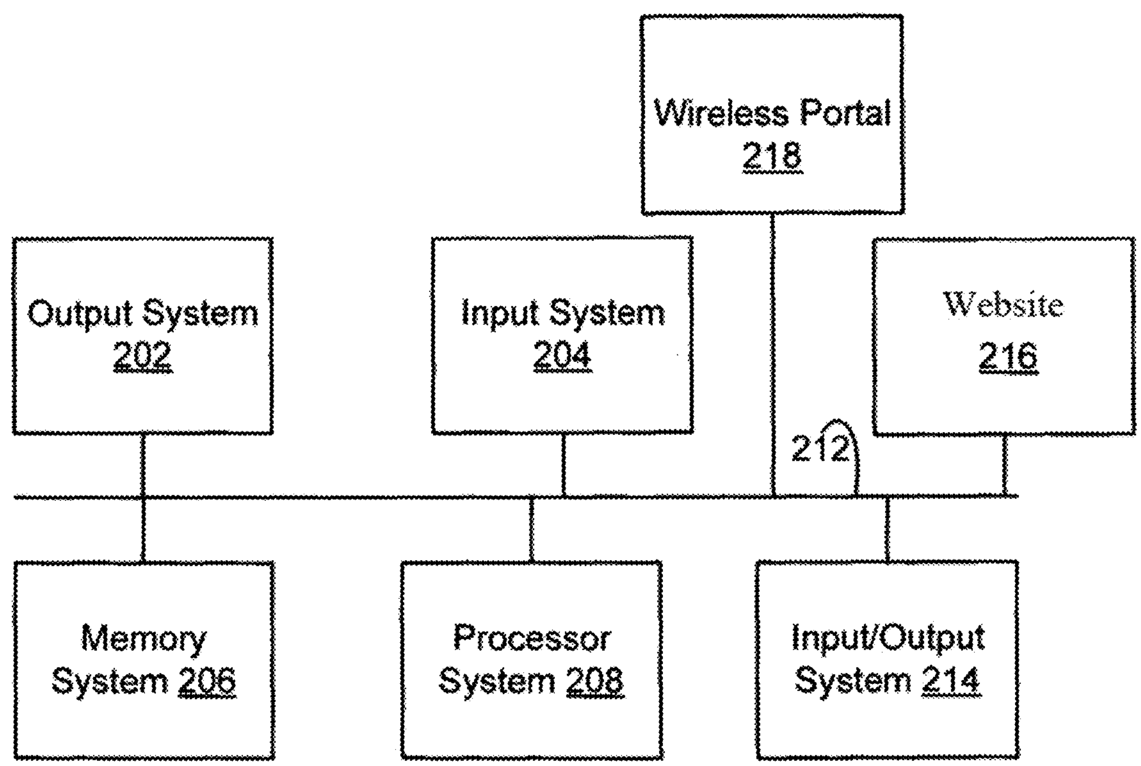
FIG. 2A illustrates a block diagram of a client system, in accordance with one embodiment of the present invention.

FIG. 2A illustrates a block diagram of a client system 200 that may be used as one of the system units for reading, searching and enhancing socialization and democratization of general literature and diverse types of content from an electronic text repository, in accordance with one embodiment of the present invention.

The client system 200 may include an output system 202, an input system 204, a memory system 206, a processor system 208, a communications system 212, an input/output system 214, a website 216 and a wireless portal 218. Other embodiments of the client system 200 may not have all of the components and/or may have other embodiments in addition to or instead of the components listed above.

The client system 200 may be any one of the client systems 110, 114, 116, 118, 120, and/or handheld wireless device 122 that may be used as one of the network devices of FIG. 1. In other embodiments, the client system 200 may include additional components and/or may not include all of the components listed above. The output system 202 may include any one of, some of, any combination of or all of a monitor system, a wireless transmitter, a handheld display system, a printer system, a speaker system, a connection or an interface system to a sound system, an interface system to peripheral devices and/or a connection and/or an interface system to a computer system, an intranet, and/or the Internet, for example.

The input system 204 may include any one of, some of, any combination of or all of a keyboard system, a mouse system, a track ball system, a track pad system, one or more buttons on a handheld system, a scanner system, a wireless receiver, a microphone system, a connection to a sound system, and/or a connection and/or an interface system to a computer system, an intranet, and/or the Internet (i.e., Infrared Data Association or IrDA, Universal Serial Bus or USB), for example. The memory system 206 may include, for example, any one of, some of, any combination of or all of a long-term storage system, such as a hard drive, a short-term storage system, such as a random-access memory; a removable storage system, such as a floppy drive or a removable drive, and/or a flash memory. The memory system 206 may include one or more machine-readable mediums that may store a variety of different types of information. The term machine-readable medium is used to refer to any medium that is structurally configured for carrying information in a format that is readable by a machine. One example of a machine-readable medium is a computer-readable medium. The memory system 206 also stores a non-transitory storage media for reading, searching and enhancing socialization and democratization of general literature and diverse types of content from an electronic text repository.

The processor system 208 may include any one of, some of, any combination of, or all of multiple parallel processors, a single processor, a system of processors having one or more central processors and/or one or more specialized processors dedicated to specific tasks. The processor system 208 implements the programs stored in the memory system 206. The communications system 212 communicatively buttons the output system 202, the input system 204, the memory system 206, the processor system 208, and/or the input/output system 214 to each other. The communications system 212 may include any one of, some of, any combination of, or all of one or more electrical cables, fiber optic cables, and/or means for sending signals through air or water (i.e., wireless communications), or the like. Some examples of means for sending signals through air and/or water include systems for transmitting electromagnetic waves such as infrared and/or radio waves and/or systems for sending sound waves The input/output system 214 may include devices that have the dual function as input and output devices. For example, the input/output system 214 may include one or more touch sensitive screens, which display an image and therefore are an output device and accept input when the screens are pressed by a finger or a stylus, for example. The touch sensitive screens may be sensitive to heat, capacitance and/or pressure. One or more of the input/output devices may be sensitive to a voltage or a current produced by a stylus, for example. The input/output system 214 is optional and may be used in addition to or in place of the output system 202 and/or the input device 204.

The client systems 110, 114, 116, 118, 120 and the handheld wireless device 122 may also be tied into a website 216 or a wireless portal 218 which is also tied directly into the communications system 212. Any website 216 or wireless portal 218 would also include software and a website module (no number) to maintain, allow access to and run the website as well.

Figure 2B:
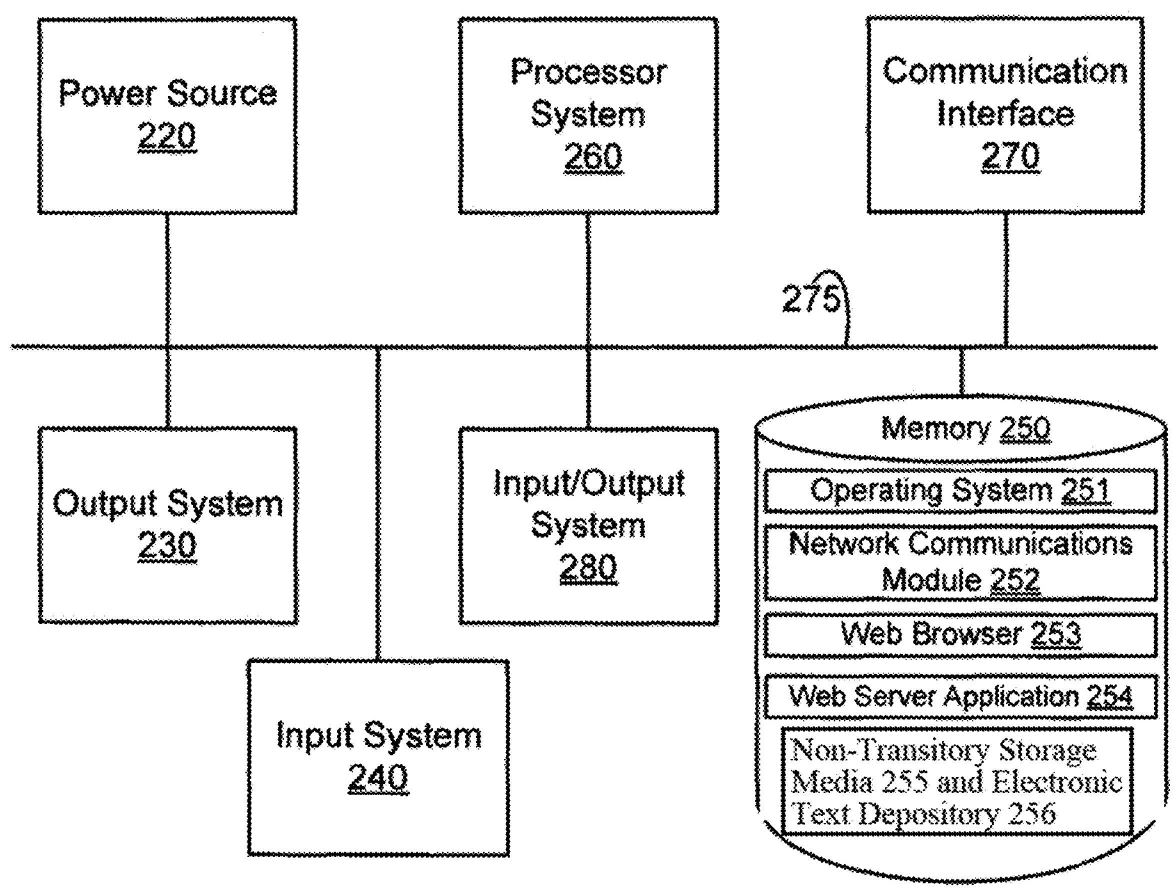
FIG. 2B illustrates a block diagram of a server system, in accordance with one embodiment of the present invention.

FIG. 2B illustrates a block diagram of a server system 104 that may be used for reading, searching and enhancing socialization and democratization of general literature and diverse types of content from an electronic text repository, in accordance with one embodiment of the present invention.

The server system 104 may include a power source 220, an output system 230, an input system 240, a memory system 250, which may store an operating system 251, a communications module 252, a web browser module 253, a web server application 254, a non-transitory storage media for reading, searching and enhancing socialization and democratization of general literature and diverse types of content from an electronic text repository 255 and an electronic text repository 256. The server system 104 may also include a processor system 260, a communications interface 270, a communications system 275 and an input/output system 280. In other embodiments, the server system 104 may include additional components and/or may not include all of the components listed above.

The output system 230 may include any one of, some of, any combination of, or all of a monitor system, a handheld display system, a printer system, a speaker system, a connection or interface system to a sound system, an interface system to one or more peripheral devices and/or a connection and/or interface system to a computer system, an intranet, and/or the Internet, for example.

The input system 240 may include any one of, some of, any combination of, or all of a keyboard system, a mouse system, a track ball system, a track pad system, one or more buttons on a handheld system, a scanner system, a microphone system, a connection to a sound system, and/or a connection and/or an interface system to a computer system, an intranet, and/or the Internet (i.e., IrDA, USB), for example.

The memory system 250 may include, for example, any one of, some of, any combination of, or all of a long-term storage system, such as a hard drive; a short-term storage system, such as random-access memory; a removable storage system, such as a floppy drive or a removable drive and/or a flash memory. The memory system 250 may include one or more machine-readable mediums that may store a variety of different types of information. The term machine-readable medium is used to refer to any medium capable of carrying information that is readable by a machine. One example of a machine-readable medium is a computer-readable medium. The memory system 250 may store one or more machine instructions for reading, searching and enhancing socialization and democratization of general literature and diverse types of content from an electronic text repository. The operating system 251 controls all software or non-transitory storage media and hardware of the overall system 100. The communications module 252 may enable the server system 104 to communicate on the communications network 112. The web browser module 253 allows for browsing the Internet. The web server application 254 serves a plurality of web pages to client systems that request the webpages, thereby facilitating browsing on the Internet.

The processor system 260 may include any one of, some of, any combination of, or all of multiple parallel processors, a single processor, a system of processors having one or more central processors and/or one or more specialized processors dedicated to specific tasks. The processor system 260 may implement the machine instructions stored in the memory system 250.

In an alternative embodiment, the communication interface 270 allows the server system 104 to interface with the network 112. In this embodiment, the output system 230 sends communications to the communication interface 270. The communications system 275 communicatively buttons the output system 230, the input system 240, the memory system 250, the processor system 260 and/or the input/output system 280 to each other. The communications system 275 may include any one of, some of, any combination of, or all of one or more electrical cables, fiber optic cables, and/or sending signals through air or water (i.e., wireless communications), or the like. Some examples of sending signals through air and/or water include systems for transmitting electromagnetic waves such as infrared and/or radio waves and/or systems for sending sound waves.

The input/output system 280 may include devices that have the dual function as the input and output devices. For example, the input/output system 280 may include one or more touch sensitive screens, which display an image and therefore are an output device and accept input when the screens are pressed by a finger or a stylus, for example. The touch sensitive screens may be sensitive to heat and/or pressure. One or more of the input/output devices may be sensitive to a voltage or a current produced by a stylus, for example. The input/output system 280 is optional and may be used in addition to or in place of the output system 230 and/or the input device 240.

Figure 3:
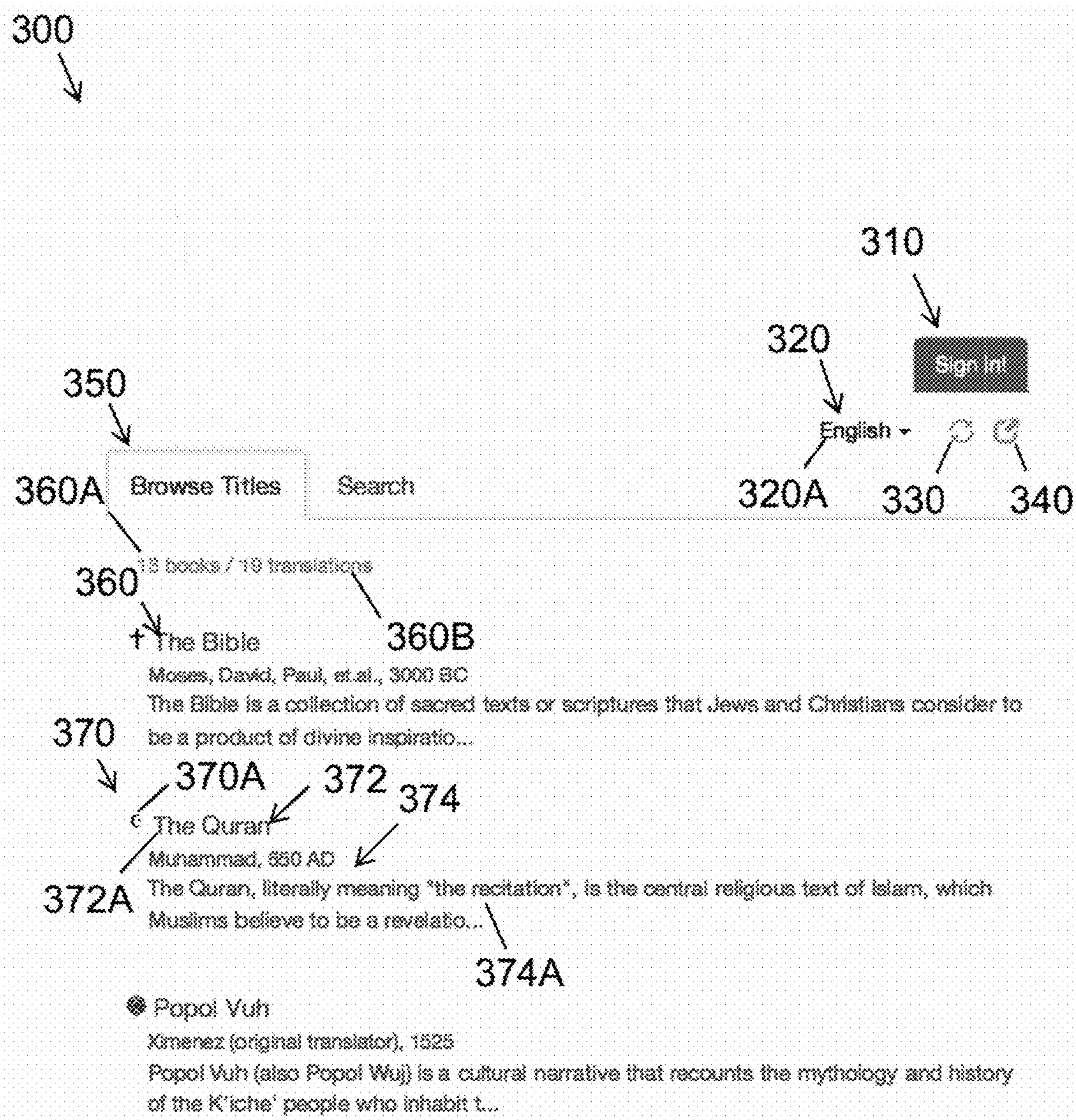
FIG. 3 illustrates a screenshot of a home page, in accordance with one embodiment of the present invention.

FIG. 3 illustrates a screenshot of a home page 300, in accordance with one embodiment of the present invention. More specifically, the home page 300 may be before a user signs-in to register with the overall system (FIG. 1, 100).

The home page 300 may include a Sign-in! button 310, a local language dropdown 320, a reload button 330, a share button 340, a Browse Titles tab 350, one or more available titles 360, and an identifying button 370.

The Sign-in! button 310 may allow a user to sign-in to register a user in the overall system (FIG. 1, 100). The local language dropdown 320 may indicate the user's browser's local language by default and may be changed as desired. FIG. 3 illustrates the local language dropdown 320 is English 320A. The reload button 330 may be depressed to reload or refresh the latest changes made by the user's browser. The share button 340 may be depressed to share one or more websites, one or more videos, one or more songs and one or more search results and the like with other users on one or more social media sites such as Facebook, Twitter and the like. The Browse Titles tab 350 may be depressed to display one or more available titles 360 residing on the overall system 100. The one or more available titles 360 may indicate the number of one or more available titles 360 in the local language dropdown 320. FIG. 3 illustrates that there are 13 one or more available titles 360A and 19 translations 360B. The identifying button 370 may represent one of the one or more available titles 360 and may additionally include a title 372 and a synopsis 374. FIG. 3 illustrates the identifying button 370 is a moon and star 370A, which is a representative symbol of the Islam religion for The Quran. FIG. 3 illustrates the title 372 is "The Quran" 372A and the synopsis 374 is, "The Quran, literally meaning "the recitation", is the central religious text of Islam, which Muslims believe to be a revelation . . . 374A".

Figure 4:
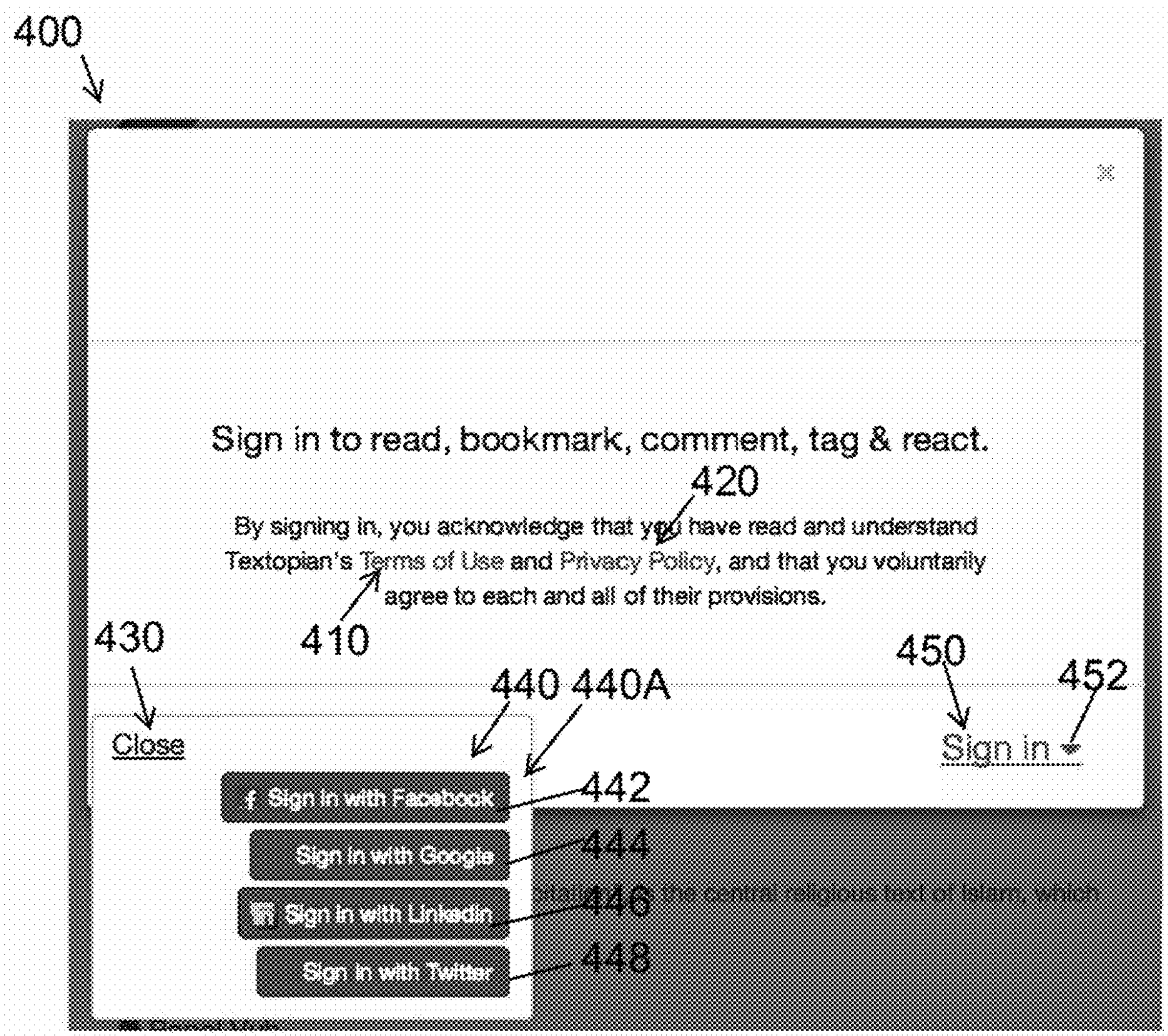
FIG. 4 illustrates a screenshot of a sign-up page, in accordance with one embodiment of the present invention.

FIG. 4 illustrates a screenshot of a sign-up page 400, in accordance with one embodiment of the present invention.

The sign-up page 400 may include a Terms of Use button 410, a Privacy Policy button 420, a Close button 430, a plurality of social media sign-in buttons 440 and a Sign-In dropdown arrow 450.

The Terms of Use button 410 may be depressed to access and display a plurality of terms and conditions information (FIG. 32A, 3200). The Privacy Policy button 420 may be depressed to access and display a plurality of privacy policy information (not shown). The Close button 430 may be depressed to close the sign-up page 400. The social media sign-in buttons 440 may be depressed to sign-into a plurality of social media platforms 440A. The social media platforms 440A may include a Facebook sign-in button 442, a Google sign-in button 444, a LinkedIn sign-in button 446 and a Twitter sign-in button 448. The sign-in button 450 may include a dropdown arrow 452 that may be depressed to sign-into the overall system (FIG. 1, 100).

Figure 5:
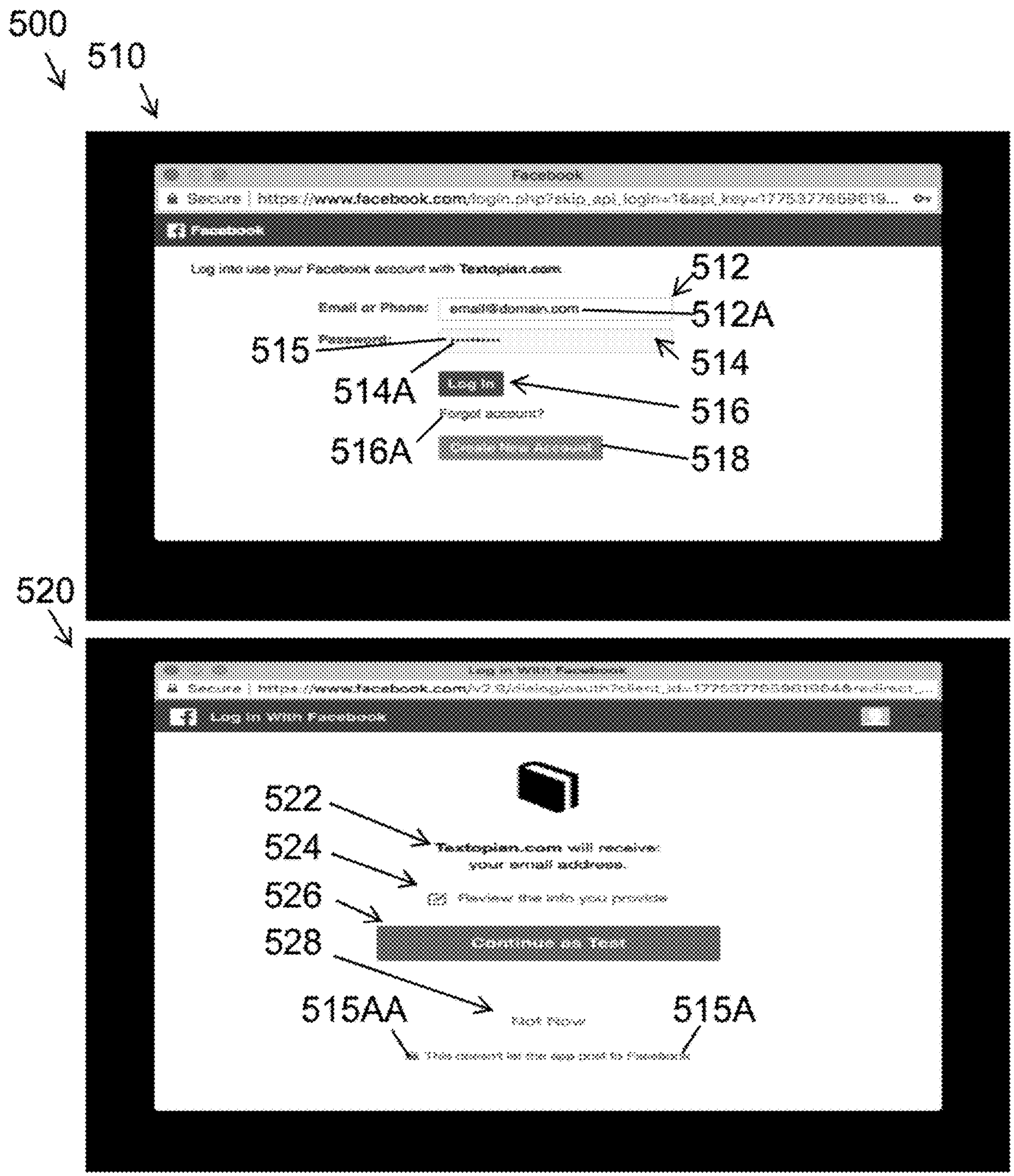
FIG. 5 illustrates a screenshot of a pair of Facebook authentication pages, in accordance with one embodiment of the present invention.

FIG. 5 illustrates a screenshot of a pair of Facebook authentication pages 500, in accordance with one embodiment of the present invention.

The pair of Facebook authentication pages 500 may include a first Facebook authentication page 510 and a second Facebook authentication page 520.

The first Facebook authentication page 510 may include an E-mail or Phone textbox 512, a Password textbox 514, a Log-in button 516 and a Create New Account button 518. The E-mail or Phone textbox 512 may receive an e-mail or phone number 512A to authenticate a user's Facebook account. The Password textbox 514 may receive a specific user's designated password 514A to authenticate a user's Facebook account and may be undisclosed with a plurality of horizontal dots 515 for increased security. The Log-in button 516 may be depressed to log-in a user's Facebook account and have a Forget account button 516A. The Create New Account button 518 may be depressed to allow a user to reset their designated password and disclose a specific user's designated e-mail or phone number 512A.

The second Facebook authentication page 520 may include a confirmation e-mail address 522, a Review the info you provide button 524, a Continue as user button 526 and a Not Now button 528. The confirmation e-mail address 522 may confirm the e-mail was properly logged-in. The Review the info you provide button 524 may be depressed to access the specific user's designated e-mail or phone number 512A and the specific user's designated password 514A. The Continue as user button 526 may be depressed to continue logging-into the second Facebook authentication page 520. The Not Now button 528 may be visible to indicate that the specific user's designated e-mail or phone number 512A and the specific user's designated password 514A was not properly logged-in. There may also be a note 515 and a functional lock button 515A indicating that, "This doesn't let the app post to Facebook." The functional lock button 515A may be a locked padlock 515AA indicating the app post is locked out of Facebook.

Figure 6:
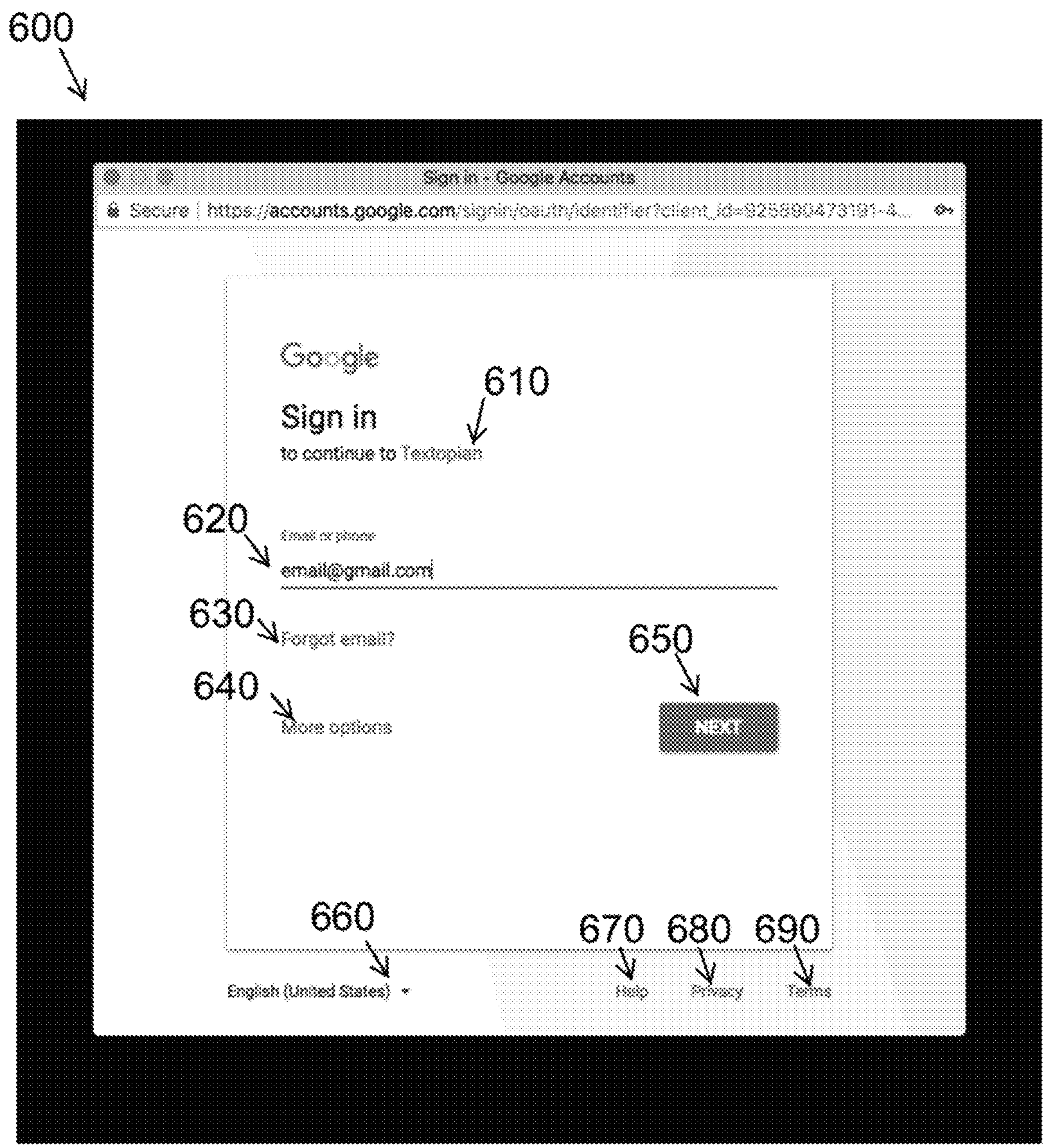
FIG. 6 illustrates a screenshot of a Google authentication page, in accordance with one embodiment of the present invention.

FIG. 6 illustrates a screenshot of a Google authentication page 600, in accordance with one embodiment of the present invention.

The Google authentication page 600 may include a company name button 610, an E-mail or phone textbox 620, a Forget e-mail button 630, a More options button 640, a NEXT button 650, a language dropdown arrow 660, a Help button 670, a Privacy button 680, and a Terms button 690.

The company name button 610 may be depressed to send the user to the company's website (not shown). FIG. 6 illustrates the company name button 610 is Textopian. The E-mail or phone textbox 620 may receive the user's e-mail address to use to sign into the user's Google account. The Forget e-mail button 630 may be depressed to recover the e-mail address of the user. The More options button 640 may provide more options to perform relating to the Google authentication page 600. The NEXT button 650 may be depressed to lead the user to a subsequent action. The language dropdown arrow 660 may be depressed to select a desired language for the Google authentication page 600. The Help button 670 may be depressed to direct the user to help provided by the Google authentication page 600. The Privacy button 680 may be depressed to direct the user to the privacy information regarding the Google authentication page 600. The Terms button 690 may be depressed to direct the user to the Terms and Conditions page (FIG. 31A and FIG. 31B, 3100) regarding the Google authentication page 600.

Figure 7:
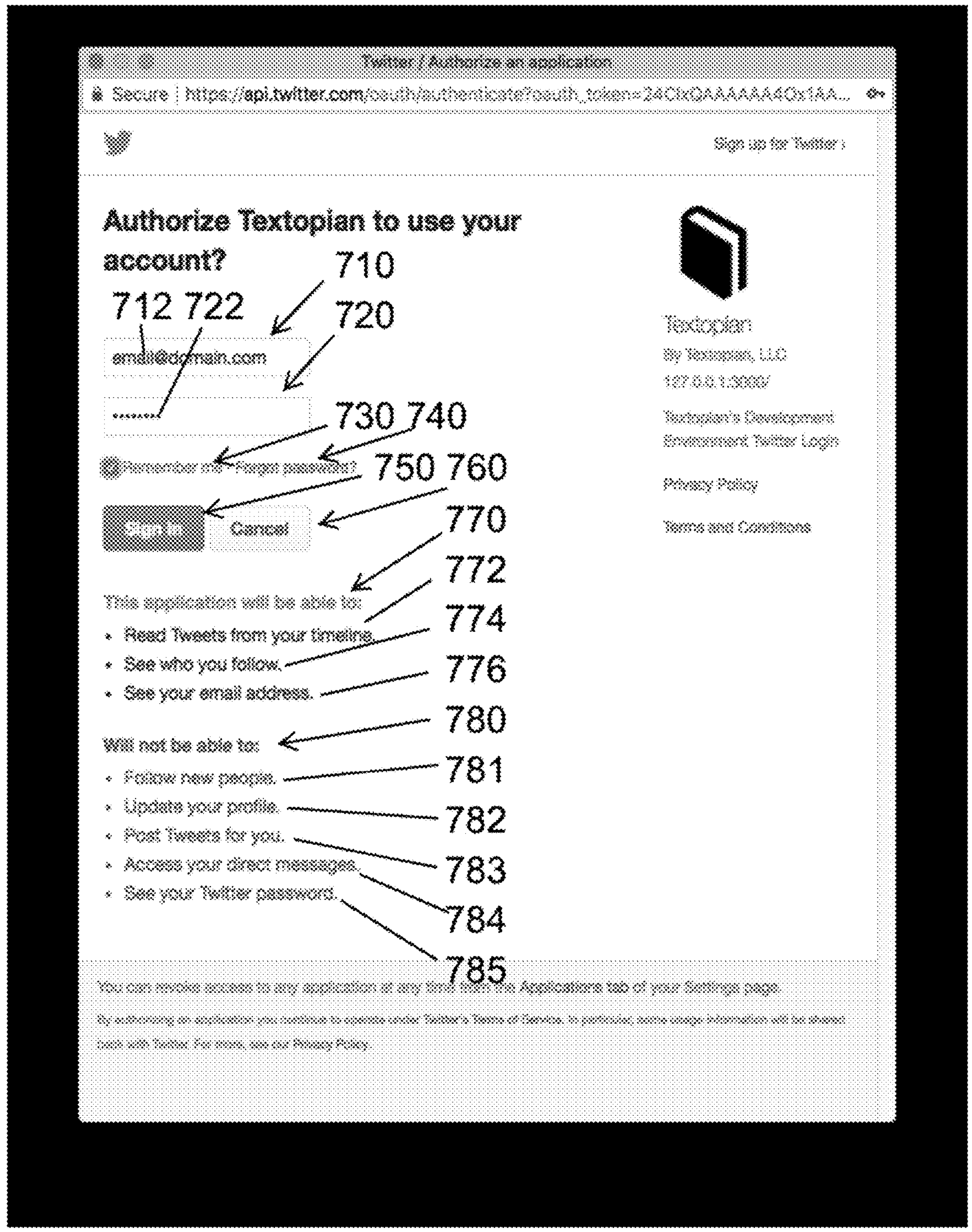
FIG. 7 illustrates a screenshot of a Twitter authentication page, in accordance with one embodiment of the present invention.

FIG. 7 illustrates a screenshot of a Twitter authentication page 700, in accordance with one embodiment of the present invention.

The Twitter authentication page 700 may include an e-mail address textbox 710, a password textbox 720, a Remember me box 730, a Forgot password button 740, a Sign-In tab 750, a Cancel tab 760, a plurality of "This application will be able to do" information 770 and a plurality of "Will not be able to:" information 780.

The e-mail address textbox 710 may receive a user's e-mail address 712 to log-in to the user's Twitter account. The password textbox 720 may receive a user's password 722 to log-in to the user's Twitter account. The Remember me box 730 may be checked to indicate that the user's e-mail address 712 and the user's password 722 will be automatically entered when the user subsequently logs into the user's Twitter account. The Remember me box 730 may not be checked to indicate that the user's e-mail address 712 and the user's password 722 will not be automatically entered when the user subsequently logs into the user's Twitter account and will be left unchecked. The Forgot password button 740 may direct a user to change the user's password 722 or the like. The Sign-In tab 750 may be depressed to sign-in to the user's Twitter account. The Cancel tab 760 may be adjacent to the Sign-In tab 750 and may be depressed to cancel sign-in to the user's Twitter account. The "This application will be able to do" information 770 may be listed underneath the Sign-In tab 750 and the Cancel tab 760 and includes a plurality of "Read Tweets from your timeline" information 772, a plurality of "See who you follow" information 774 and a plurality of "See your e-mail address" information 776. The "Will not be able to:" information 780 may be listed underneath the Sign-In tab 750 and the Cancel tab 760 and includes a plurality of "Follow new people" information 781, a plurality of "Update your profile" information 782, a plurality of "Post Tweets for you" information 783, a plurality of "Access your direct messages" information 784 and a plurality of "See your Twitter password" information 785.

Figure 8:
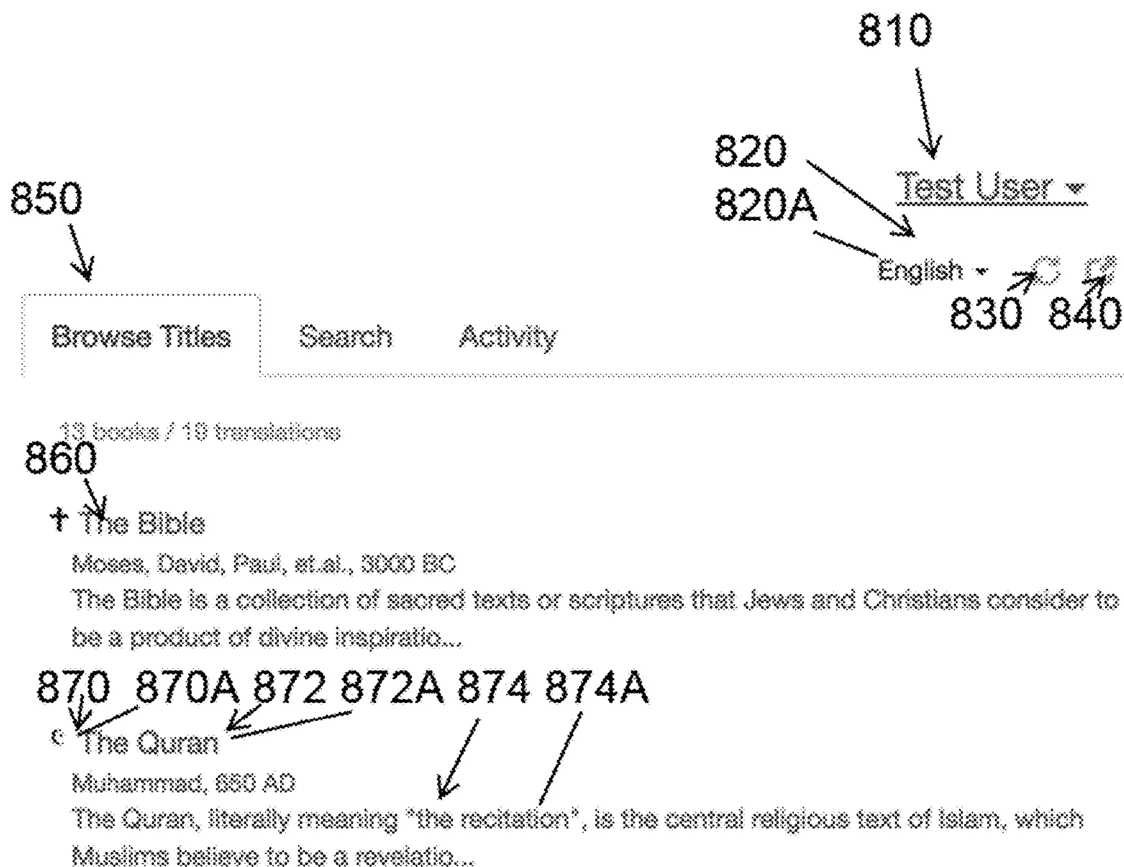
FIG. 8 illustrates a screenshot of an authenticated home page, in accordance with one embodiment of the present invention.

FIG. 8 illustrates a screenshot of an authenticated home page 800, in accordance with one embodiment of the present invention.

The authenticated home page 800 may include a user dropdown 810, a local language dropdown 820, a reload button 830, a share button 840, a Browse Titles tab 850, one or more available titles 860, and an identifying button 870.

The user dropdown 810 may be for a logged-in user name or the like. The local language dropdown 820 may indicate the user's browser's local language by default and may be changed as desired. FIG. 8 illustrates the local language dropdown 820 is English 820A but may be any suitable language. The local language dropdown 820 may switch the current book's text to the selected language. This is only when the corresponding text is available in such language. For example, if you are reading "Genesis 1" in English (any translation), then selecting "Spanish" under the local language dropdown 820 will display "Genesis 1", but from the most popular Spanish Bible translation. The reload button 830 may be depressed to reload or refresh the latest changes made by the user's browser. The share button 840 may be depressed for the user to share one or more websites, one or more videos, one or more songs and one or more search results and the like with other users on social media sites and the like. The Browse Titles tab 850 may be depressed to display one or more available titles residing on the overall system (FIG. 1, 100). The one or more available titles 860 may indicate the number of available titles in the selected browser local language 820. FIG. 8 illustrates that there are 13 book titles and 19 translations. The identifying button 870 may represent the available title 860 and may additionally include a title 872 and a synopsis 874. FIG. 8 illustrates the identifying button 870 is a moon and star 870A, which is a representative symbol of the Islam religion for The Quran, the title 872 is "The Quran" 872A and the synopsis 874 is, "The Quran, literally meaning "the recitation", is the central religious text of Islam, which Muslims believe to be a revelation . . . " 874A.

Figure 9:
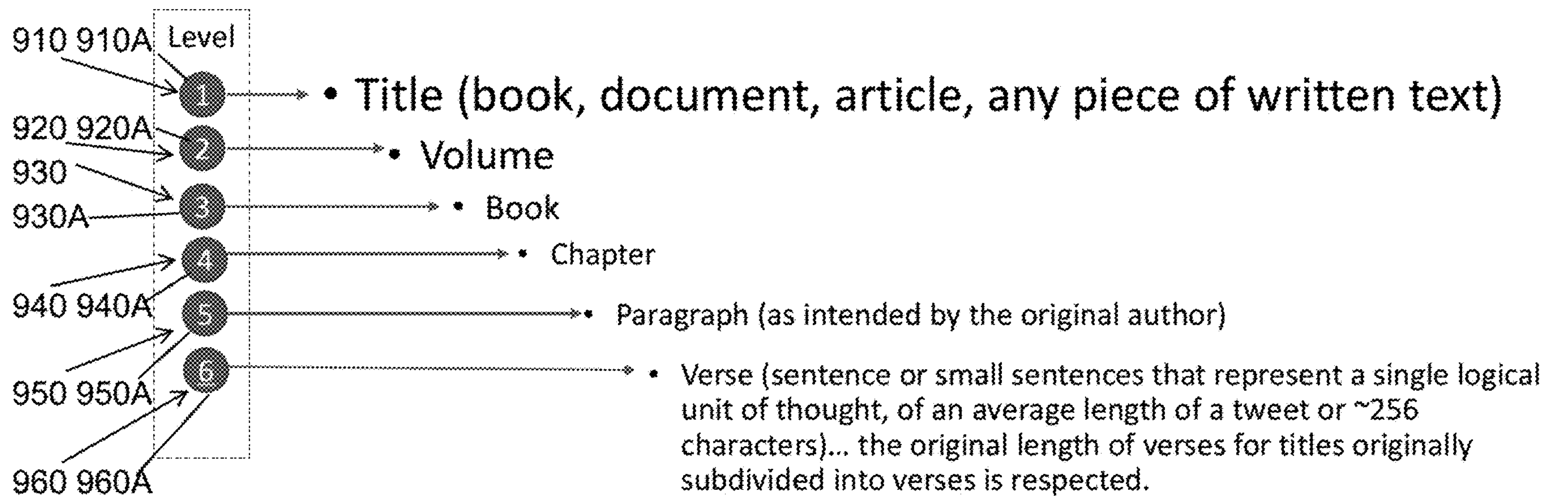
FIG. 9 illustrates a plurality of Title hierarchical subdivisions, in accordance with one embodiment of the present invention.

FIG. 9 illustrates a plurality of Title hierarchical subdivisions 900, in accordance with one embodiment of the present invention.

The Title hierarchical sub-divisions 900 may include a Title 910, a Volume 920, a Book 930, a Chapter 940, a Paragraph 950, and a Verse 960.

The Title 910 may represent a Level 1 910A of the Title hierarchical sub-divisions 900, which is the broadest of the Title hierarchical sub-divisions 900, which increase in narrowness as the Title hierarchical sub-divisions 900 increase in number. The Volume 920 may represent a Level 2 920A of the Title hierarchical sub-divisions 900. The Book 930 may represent a Level 3 930A of the Title hierarchical sub-divisions 900. The Chapter 940 may represent a Level 4 940A of the Title hierarchical sub-divisions 900. The Paragraph 950 may represent a Level 5 950A of the Title hierarchical sub-divisions 900 and may be described as intended by the original author. The Verse 960 may represent a Level 6 960A of the Title hierarchical sub-divisions 900. The Verse 960 may be a sentence or a plurality of small sentences that represent a single logical unit of thought of an average length of a Tweet or approximately 256 characters.

More specifically, each Title 910 (for a book, a document, an article, or the like) is sub-divided to enable an exact and unambiguous identification of every section of the Title 910. Not every level is applicable to every Title 910 as some titles, for example, are divided into the Book 930, but not into the Volume 920, or are divided into the chapters 940, but not into either the Volume 920 or the Book 930.

FIG. 10 illustrates a screenshot of a Browse Titles page 1000, in accordance with one embodiment of the present invention.

The Browse Titles page 1000 may include a plurality of Parts 1010 and a plurality of chapters 1020.

The Parts 1010 may each be represented by a horizontal bar 1012 and are displayed as "Part One", "Part Two", "Part Three", etc. The chapters 1020 may each be represented by a circle 1022 with a number 1022A within the circle 1022 indicating the number of each of the chapters 1020 for direct and easy navigation in order to start reading as soon as possible. The chapters 1020 may be sequentially aligned within the horizontal bar 1012.

Figure 11A:
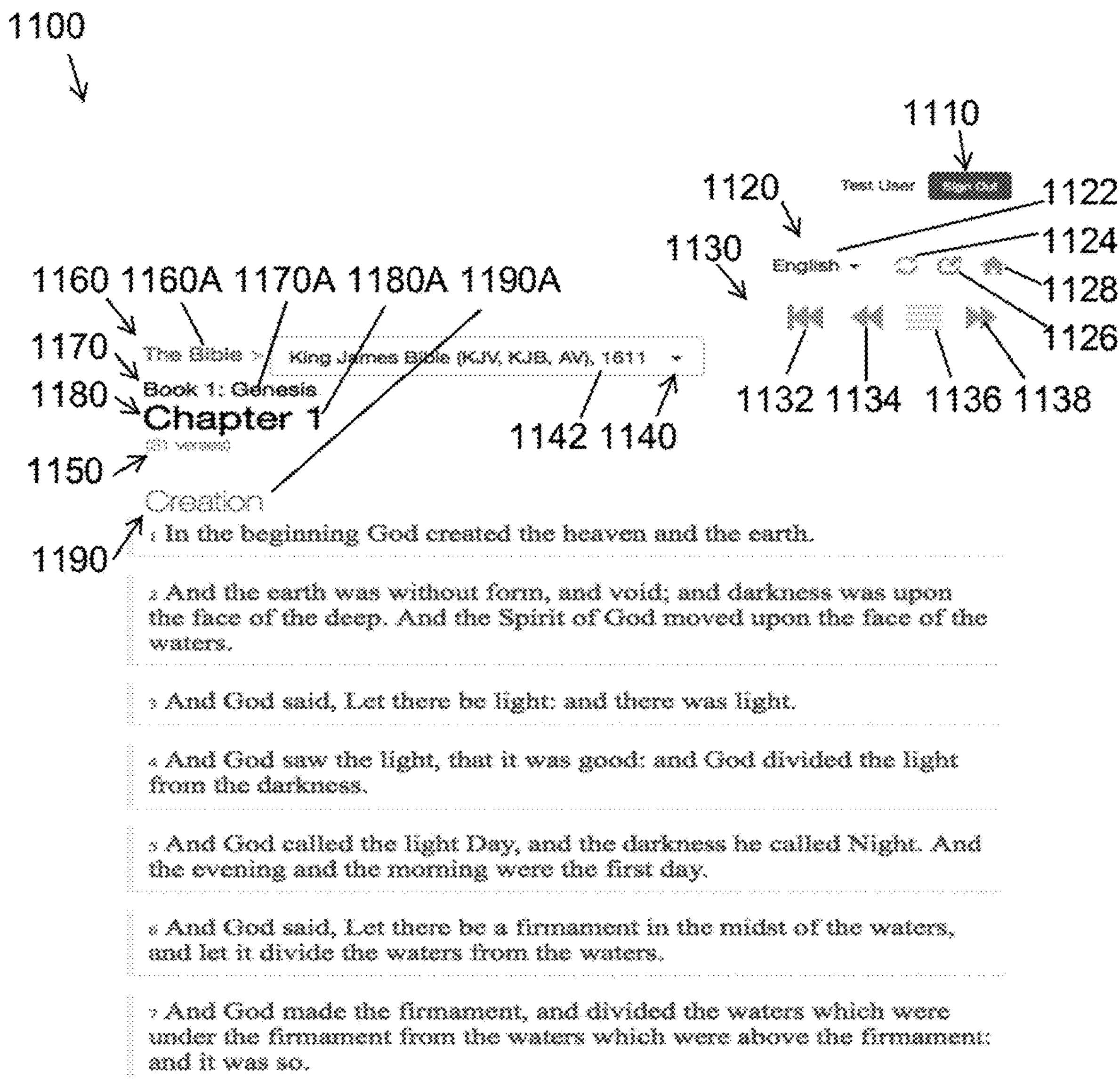
FIG. 11A illustrates a screenshot of a passage display page, in accordance with one embodiment of the present invention.

FIG. 11A illustrates a screenshot of a Passage display page 1100, in accordance with one embodiment of the present invention.

The Passage display page 1100 may include a Sign-Out button 1110, a plurality of page navigation buttons 1120, a plurality of passage navigation buttons 1130, a translation toggle arrow 1140, a number of verses 1150, a name of a title 1160, a part 1170, a chapter 1180, and a subdivision of the chapter 1190.

The Sign-Out button 1110 may be depressed to sign-out a logged-in user to leave the Passage display page 1100. The page navigation buttons 1120 may include a local language dropdown 1122, a reload button 1124, a share button 1126 and a home button 1128. The home button 1128 may be depressed to direct the user to the authenticated home page (FIG. 8, 800). The passage navigation buttons 1130 may include a return to beginning button 1132, a return to previous chapter button 1134, a display entire chapter button 1136 and a next chapter button 1138. The translation toggle arrow 1140 may dropdown and display a plurality of different literary translations (not shown). FIG. 11 illustrates the King James Bible literary translation 1142. The number of verses 1150 may be the number of verses 1150 in the title. FIG. 11 illustrates 31 verses on the Passage display page 1100 1240. The name of a title 1160 in FIG. 11 illustrates "The Bible" 1160A. The part 1170 in FIG. 11 illustrates "Book 1: Genesis" 1170A. The chapter 1180 in FIG. 11 illustrates "Chapter 1" 1180A. The subdivision of the chapter 1190 in FIG. 11 illustrates "Creation" 1190A.

Figure 11B:
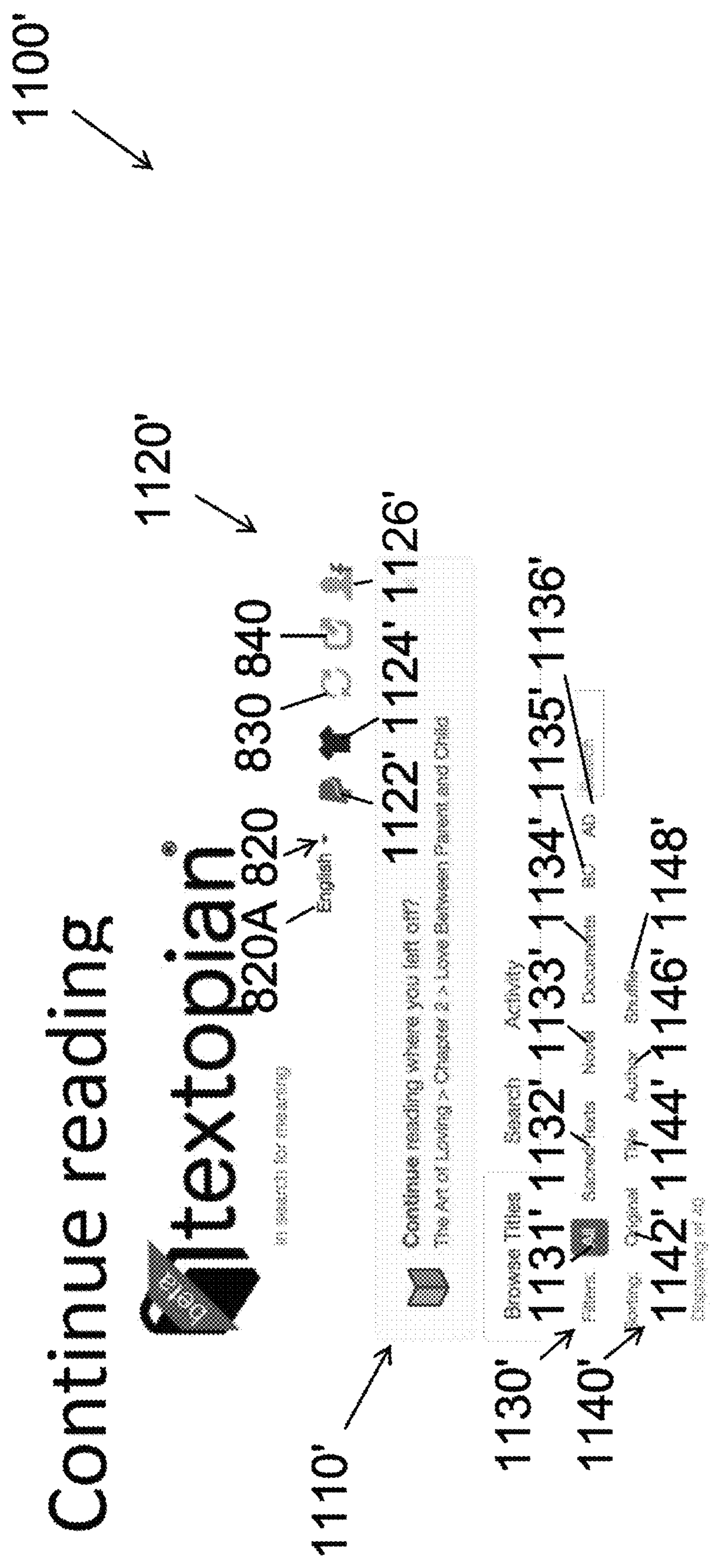
FIG. 11B illustrates a screenshot of a continue reading page, in accordance with one embodiment of the present invention.

FIG. 11B illustrates a screenshot of a continue reading page 1100', in accordance with one embodiment of the present invention.

The continue reading link page 1100' may include a continue reading link 1110', a plurality of social media buttons 1120', a plurality of filters 1130' and a plurality of sorting categories 1140'.

The continue reading link 1110' may be a link to continue reading their last displayed passage. The social media buttons 1120' may include a computer software for processing electronic payments and for transferring funds or donations to and from others or PAYPAL® link 1122', an eBay link 1124', a Facebook link 1126' or the like. The filters 1130' may include all filters 1131', a sacred texts filter 1132', a novel filter 1133', a documents filter 1134', a BC or Before Christ text filters 1135', an After Death or AD filter 1136' or the like. The sorting categories 1140' may include being sorted by an original name 1142', a title 1144', an author 1146', a shuffle 1148' or the like.

The continue reading link page 1100' may also include the local language dropdown 820, which as displayed in FIG. 11 is English 820A or the like. The continue reading link page 1100' may also include the reload button 830, which may be depressed to reload or refresh the latest changes made by the user's browser. The continue reading link page 1100' may also include the share button 840, which may be depressed for the user to share one or more websites, one or more videos, one or more songs and one or more search results and the like with other users on social media sites and the like.

Figure 12:
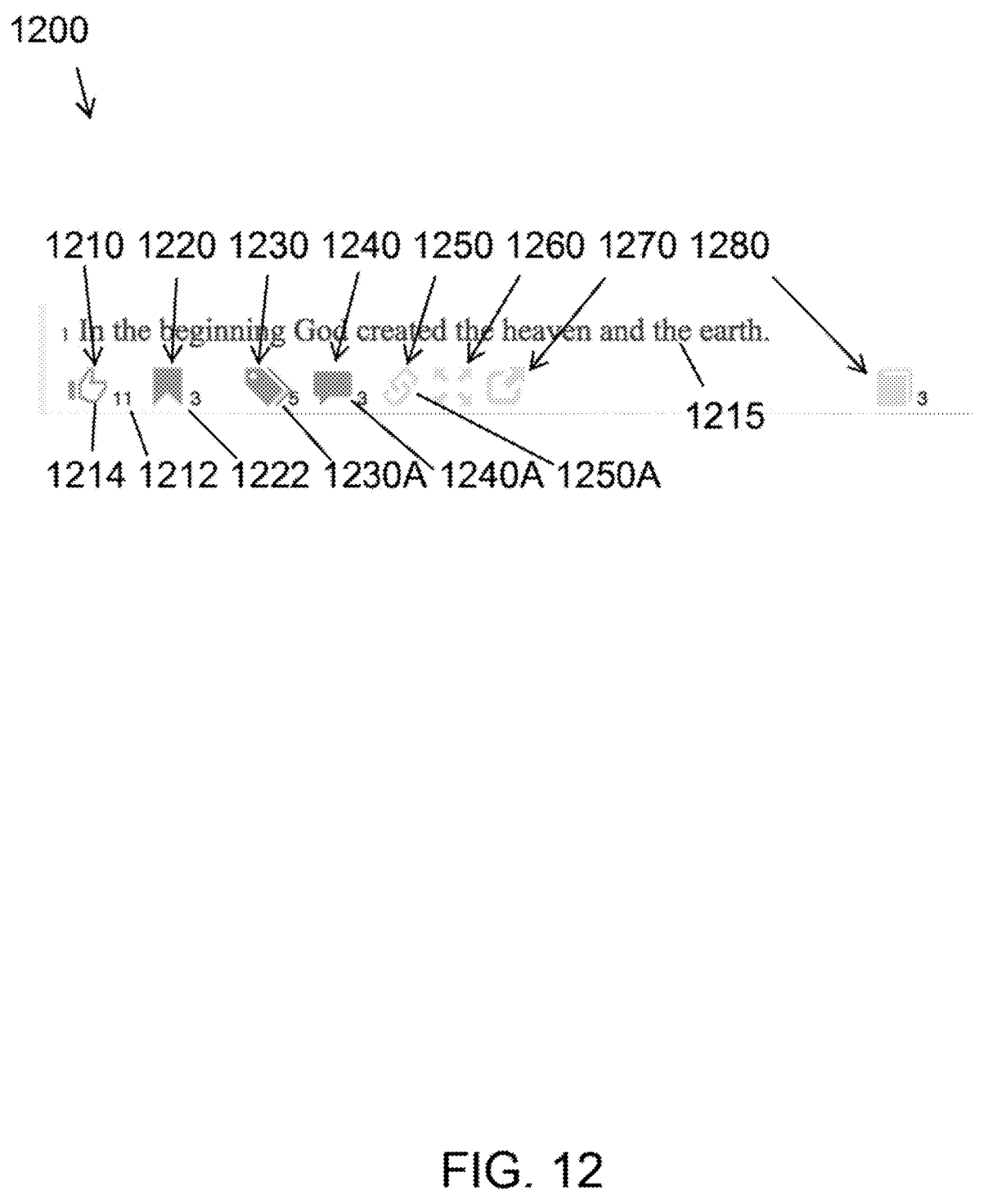

FIG. 12 illustrates a screenshot of a user-generated content page 1200, in accordance with one embodiment of the present invention.

The user-generated content page 1200 may include a Reaction's button 1210, a bookmark button 1220, a tag button 1230, a comment button 1240, a relationships button 1250, a maximization button 1260, a sharing button 1270 and a text comment button 1280.

The Reaction's button 1210 may allow a user to express multiple combined reactions to the text 1215 placed above the text 1215. The Reaction's button 1210 may include a Reaction's count 1212 to the user-generated content page 1200. FIG. 12 illustrates the Reaction's button 1210 is a thumbs-up shape 1214 with 11 user reactions. The bookmark button 1220 may allow for a user to record the text 1215 with the bookmark button 1220 that may be recalled at any time through the activity log page (FIG. 27, 2700). FIG. 12 illustrates the bookmark button 1220 as a ribbon or a bookmarker shape 1222 with 3 user bookmarks. The tag button 1230 may allow a user to tag or classify with a short free-form text (up to approximately 50 characters) any text within the overall system (FIG. 1, 100). FIG. 12 illustrates the tag button 1230 as a tag shape 1230A with 5 user tags. The comment button 1240 may allow a user to opine or enter information about the text 1215 being read (for freeform text up to approximately 2,000 characters). FIG. 12 illustrates the comment button 1240 as a comment caption shape 1240A with 3 comment buttons. The relationships button 1250 may allow a user to select from recently bookmarked content or to paste a company's unique web-address (not shown) to express a relationship of any kind to the displayed text. FIG. 12 illustrates the relationships button 1250 as a pair of interlinked chain links 1250A. The maximization button 1260 may allow a user to display the text 1215 in isolation to facilitate sharing of a specific piece of text through generation of a company's unique web-address. The sharing button 1270 may allow a user to copy a restful URL (FIG. 13, 1310) that represents the selected verse. The text comment button 1280 may allow a user to opine or enter information about the text, where the text is a free-form text up to approximately 2,000 characters.

Figure 13:
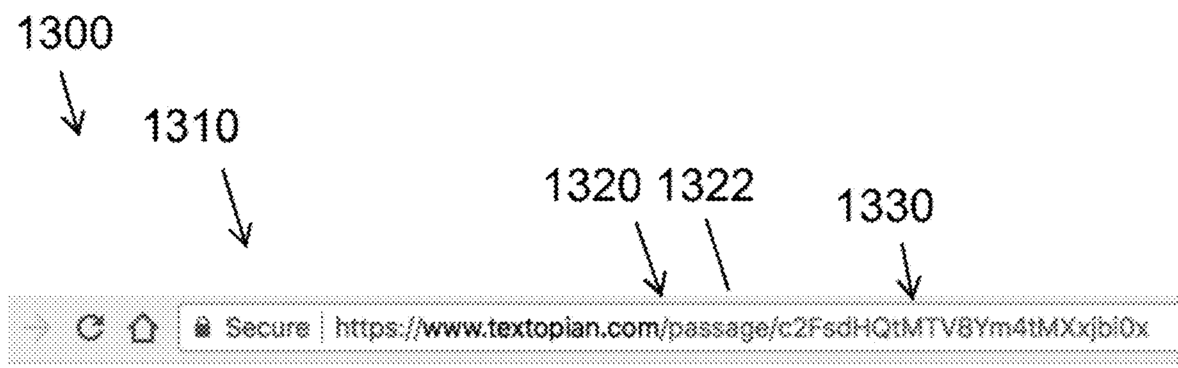
FIG. 13 illustrates a screenshot of a universal identifier and web-address page, in accordance with one embodiment of the present invention.

FIG. 13 illustrates a screenshot of a universal identifier and web-address page 1300, in accordance with one embodiment of the present invention.

The universal identifier and web-address page 1300 may include a restful Universal Resource Locator or URL 1310, a type of content 1320, and a machine-readable universal identifier 1330.

The restful URL 1310 may include any content displayed that will yield an exact same passage. The type of content 1320 may include a passage 1322 which could be a chapter, a part of a chapter, a book, a paragraph, or a verse. The machine-readable universal identifier 1330 may be for the passage and be disposed at the end of the type of content 1320.

Figure 14:
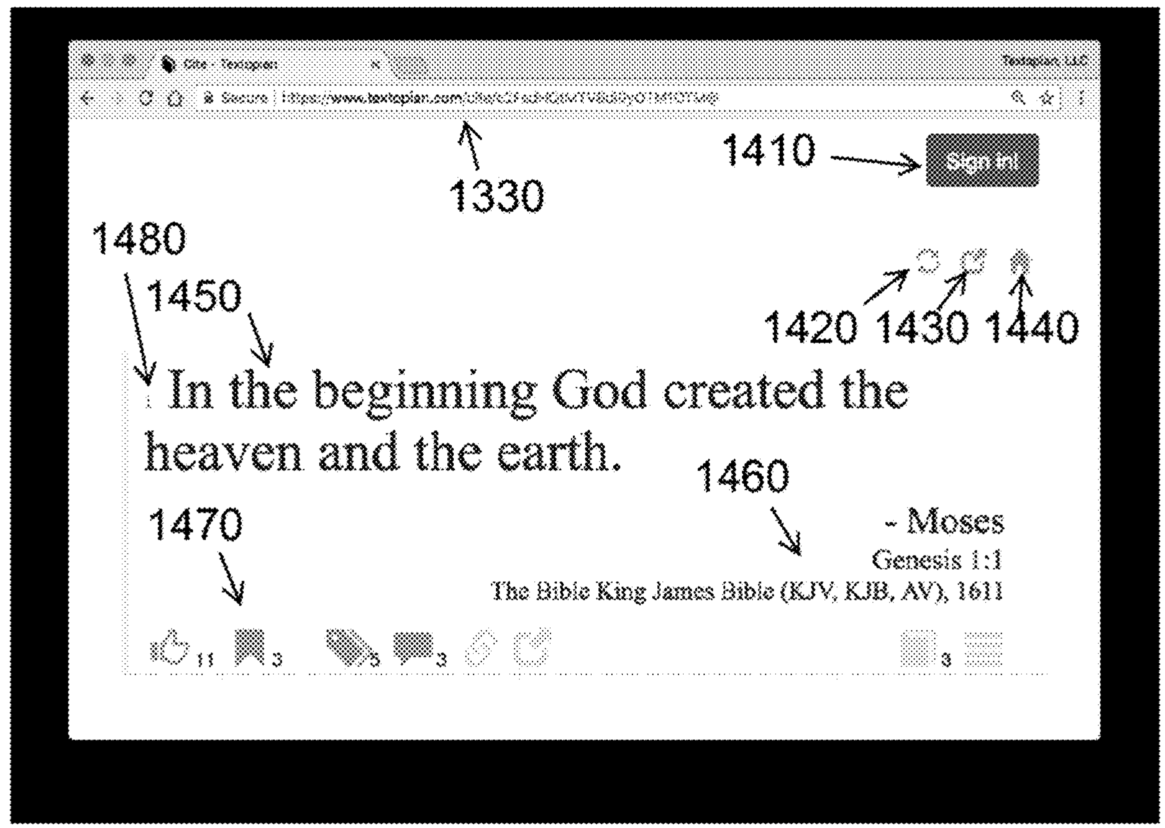
FIG. 14 illustrates a screenshot of a given cite page, in accordance with one embodiment of the present invention.

FIG. 14 illustrates a screenshot of a given cite page 1400, in accordance with one embodiment of the present invention.

The given cite page 1400 may include a Sign-in button 1410, a reload button 1420, a share button 1430, a home button 1440, a main text 1450, a plurality of metadata 1460, a plurality of site-wide options 1470, a paragraph or a verse number 1480 and a machine-readable universal identifier (FIG. 13, 1330).

The Sign-in button 1410 may include all content available to the general public without the need to sign-up or sign-in to the overall system (FIG. 1, 100), except for some user-generated content. The reload button 1420 may be depressed to reload or refresh the latest changes made by the user's browser. The share button 1430 may be depressed to share one or more websites, one or more videos, one or more songs and one or more search results and the like with other users on social media sites such as Facebook, Twitter and the like. The home button 1440 may be depressed to direct the user to the authenticated home page (FIG. 8, 800). The main text 1450 may be a paragraph, a verse, a sentence or a customer quote selected by the user. The metadata 1460 may include data regarding the text, the author, the volume, the book, the chapter number, the paragraph or the verse number and the specific translation of the text references. The site-wide options 1470 may include a Reaction's button (FIG. 12, 1210), a bookmark button (FIG. 12, 1220), a tag button (FIG. 12, 1230), a comment button (FIG. 12, 1240), a relationships button (FIG. 12, 1250), a maximization button (FIG. 12, 1260), a sharing button (FIG. 12, 1270) and a text comment button (FIG. 12, 1280). The paragraph or a verse number 1480 may display a verse number count 1482 but may also be depressed to display and close the site-wide options 1470. The machine-readable universal identifier 1330 may be assigned to the main text 1450.

Figure 15:
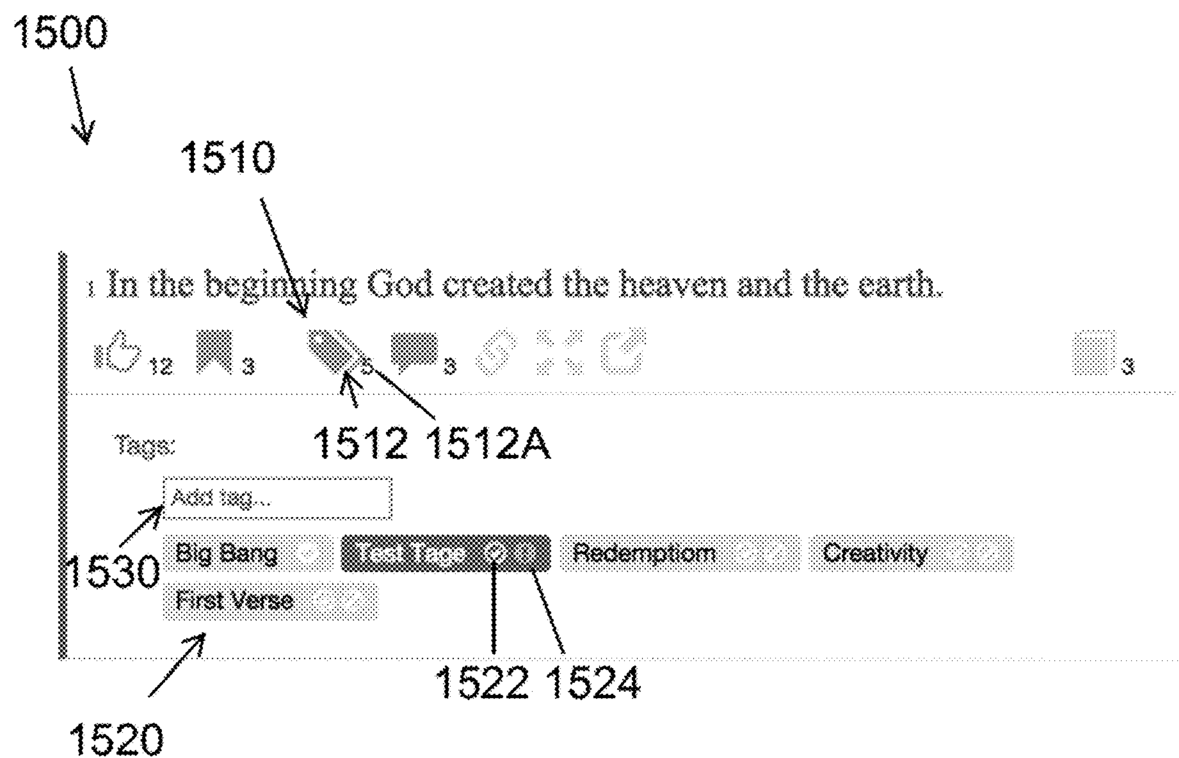
FIG. 15 illustrates a screenshot of a plurality of tags page, in accordance with one embodiment of the present invention.

FIG. 15 illustrates a screenshot of a plurality of tags page 1500, in accordance with one embodiment of the present invention.

The tags page 1500 may include a tags toggle button 1510, one or more named tags 1520, and a new Tag free-form placeholder 1530.

The tags toggle button 1510 may include a tags count 1512 adjacent to the tags toggle button 1510 that indicates a total Tag count 1512A for the main text (FIG. 14, 1450). The one or more named tags 1520 may each have a positive button 1522 and a negative button 1524 to express support or disapproval. The tags toggle button 1510 may be toggled to activate lighter shading to indicate the user has not contributed to any of the one or more named tags 1520. The new tag free-form placeholder 1530 may allow the user to enter customized text to name the one or more named tags 1520.

Figure 16A:
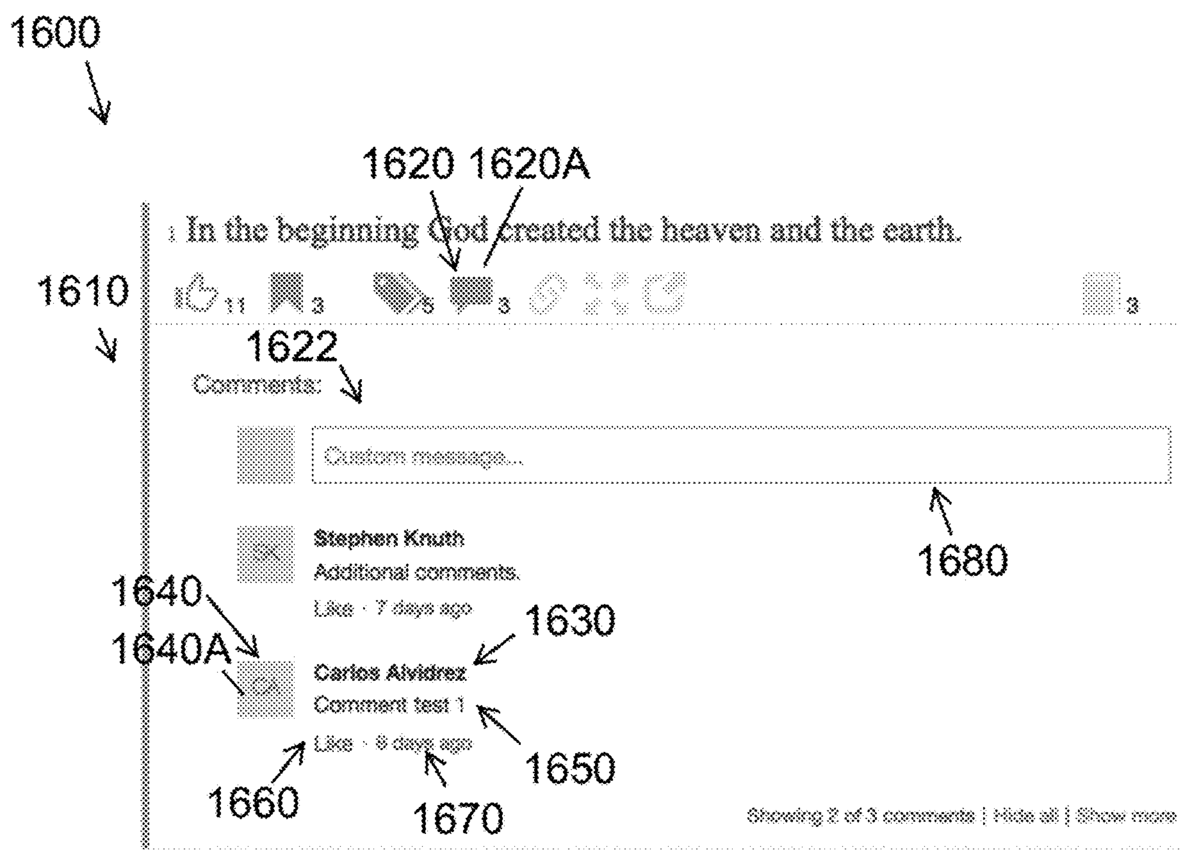
FIG. 16A illustrates a screenshot of a plurality of comments page, in accordance with one embodiment of the present invention.

FIG. 16A illustrates a screenshot of a plurality of comments page 1600, in accordance with one embodiment of the present invention.

The comments page 1600 may include one or more comments 1610, a comments button 1620, a comment user's name 1630, a comment user's photo 1640, a user's comment entry 1650, a comment user's reaction 1660, a timestamp 1670 and a text box 1680.

Figure 20:
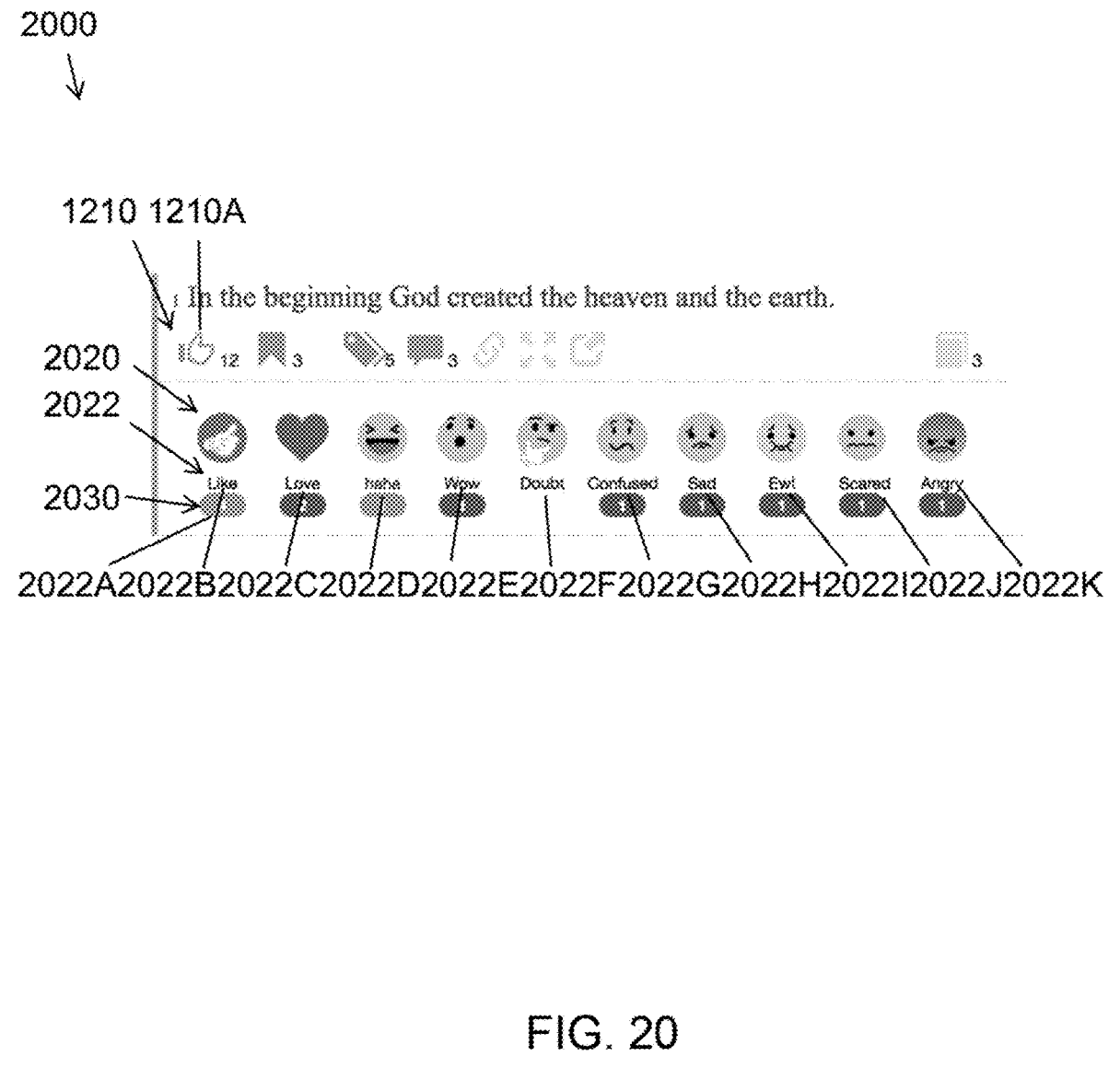

The one or more comments 1610 may be from any registered user or the like. The comments button 1620 may be a comments toggle button 1620A that may be depressed to display or hide a comments pane 1622. The comment user's name 1630 may be an author of the comment from one of the user's social media accounts (not shown) such as Twitter, Facebook, or the like. The comment user's photo 1640 may display a digital photo 1640A of the user making the comment or the like adjacent to the comment user's name 1630. The user's comment entry 1650 may be disposed underneath the comment user's name 1630. The comment user's reaction 1660 may utilize one or more reaction emotes (FIG. 20, 2120). FIG. 16 illustrates a "Like" (FIG. 20, 2120A) as one or more of the Reaction emotes (FIG. 20, 2120). The timestamp 1670 may be expressed in one or more years, months, days, hours, minutes or "Now". The text box 1680 may be utilized to enter the user's comment entry 1650. The comments pane 1622 may include the comment user's name 1630, the comment user's photo 1640, the comment user's comment 1650, the comment user's reaction 1660 utilizing the reaction emotes, the timestamp 1670, and the text box 1680.

Figure 16B:
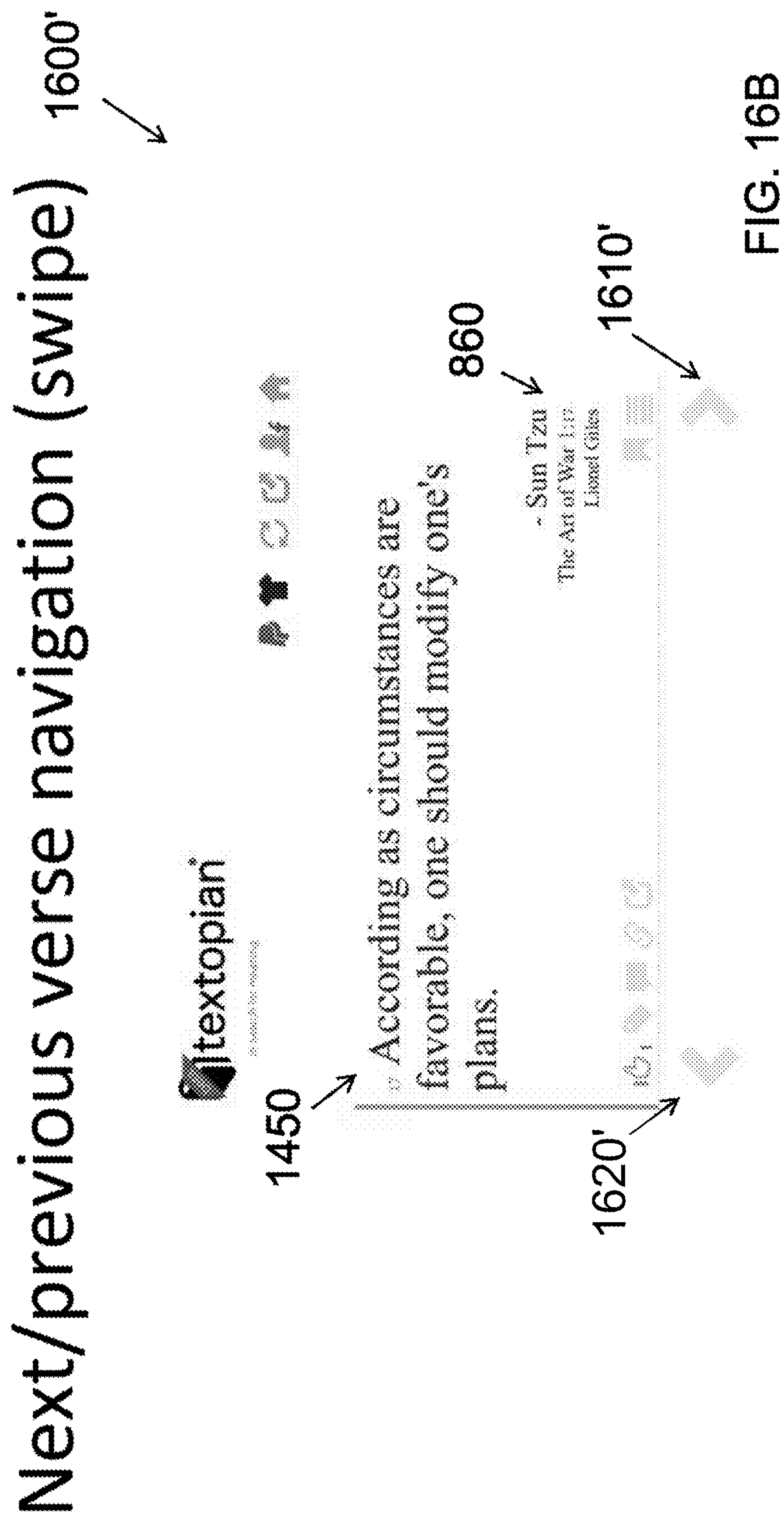
FIG. 16B illustrates a screenshot of a relationships page, in accordance with one embodiment of the present invention.

FIG. 16B illustrates a screenshot of a relationships page 1600', in accordance with one embodiment of the present invention.

The relationships page 1600' may include a main text (FIG. 14, 1450), a forward text arrow 1610' and a backward text arrow 1620'.

The main text 1450 may be contacted and swiped over in a left direction or right direction to display a previous verse and a following verse. The main text 1450 may be contacted and swiped over by a user's finger or the like while displayed on a display screen or the like. The forward text arrow 1610' may be depressed to move the main text 1450 in a forward direction. The backward text arrow 1620' may be depressed to move the main text 1450 in a backward direction.

The relationships page 1600' may allow a single left finger swipe or a single right finger swipe that changes the text's page when paginated, a double-finger swipe that moves to a next chapter, a triple-finger swipe that moves to a next book, volume or part in the overall system (For example, a triple-finger swipe on "Luke Chapter 18" will take the user to the Book of Acts, the next book in The Bible.) and a four-finger swipe moves the user to a next text or title in the system. For example, swiping in this fashion over "Pride in Prejudice" will take the reader to "Mansfield Park". The sorting of the titles is determined by the last sort criteria used by the user when browsing the list of texts or titles.

Figure 16C:
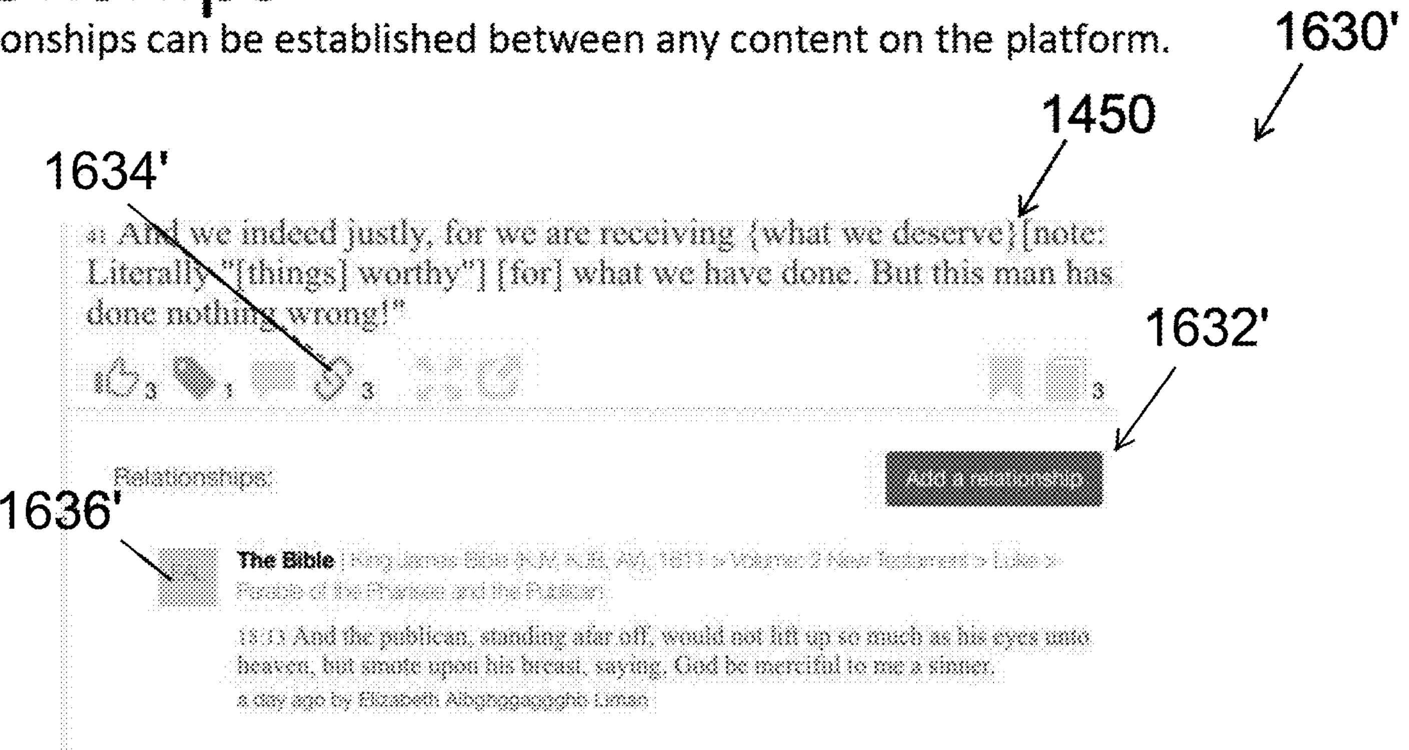
FIG. 16C illustrates a screenshot of a selecting new relationship page, in accordance with one embodiment of the present invention.

FIG. 16C illustrates a screenshot of a selecting new relationship page 1630', in accordance with one embodiment of the present invention.

The selecting new relationship page 1630' may include an add a relationship button 1632', a user contributed indicia 1634', and a user contributed tab 1636'.

The add a relationship button 1632' may allow any user to contribute one or more links or relationships to the main text 1450. The user contributed indicia 1634' may serve as a functional indicia shaped like a pair of interlocking chains 1634" or the like. The user contributed indicia 1634' may indicate a number of users 1634". FIG. 16C illustrates the number of users 1634" is 3. The user contributed tab 1636' may include the user's initials 1636" and may be positioned adjacent to one of the one or more available titles (FIG. 8, 860).

Figure 16D:
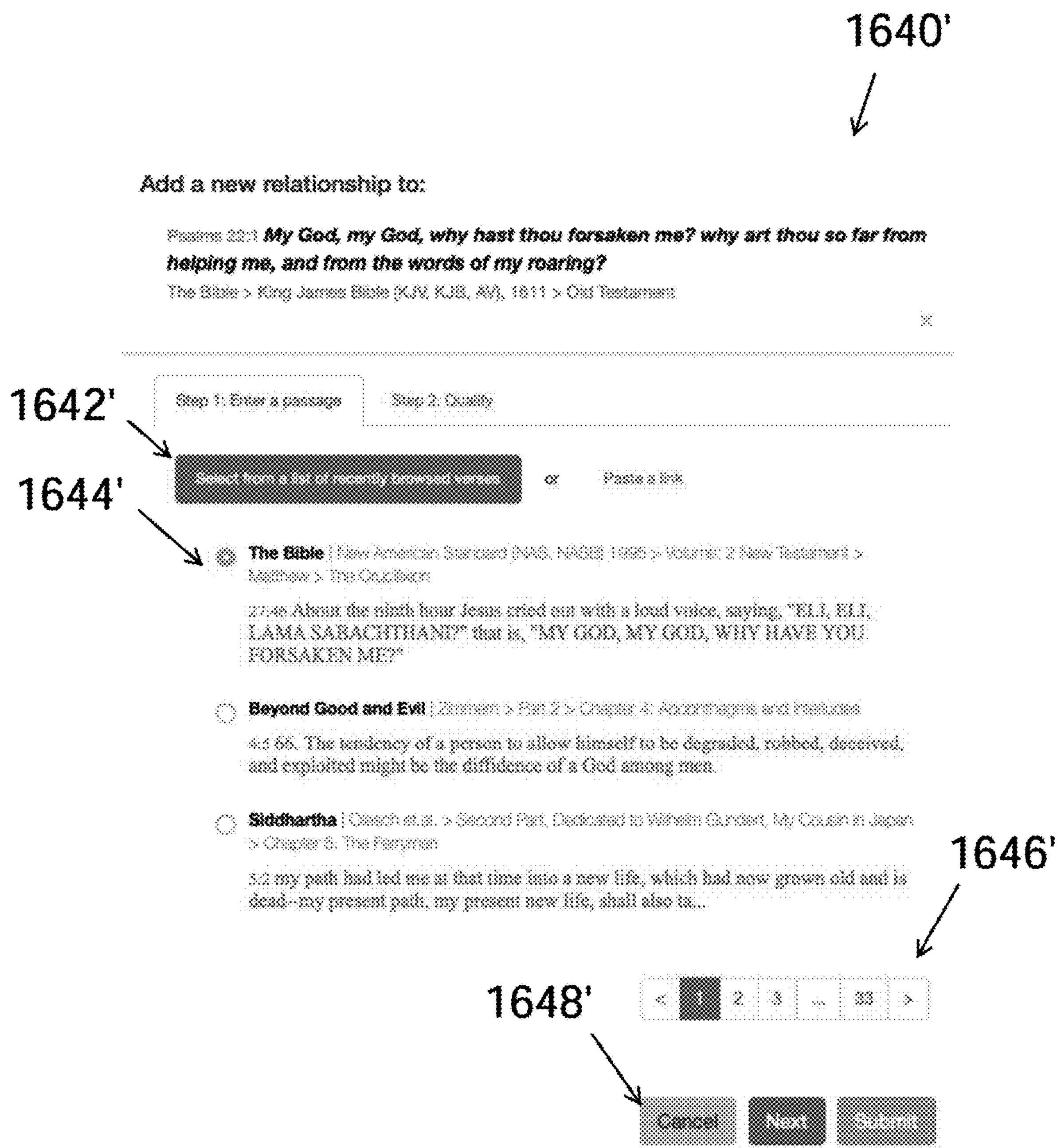
FIG. 16D illustrates a screenshot of a pasting new relationship page, in accordance with one embodiment of the present invention.

FIG. 16D illustrates a screenshot of a pasting new relationship page 1640', in accordance with one embodiment of the present invention.

The pasting new relationship page 1640' may include a select button 1642', a text selection button 1644', a pagination feature 1646', and a cancel button 1648'.

The select button 1642' may allow a user to select from a list of recently browsed verses or passages. The text selection button 1644' may select a given text by clicking on the text or on a corresponding radio button (not shown). The pagination feature 1646' may be available if the user needs to refer to a text read or visited in the past. More specifically, the pagination feature 1646' may be a numbered horizontal bar to refer the user back to a text read or visited in the past. FIG. 16D illustrates a numbered horizontal bar from 1 to 22. The cancel button 1648' may allow the user to cancel the pasting new relationship page 1640' at any time.

Figure 16E:
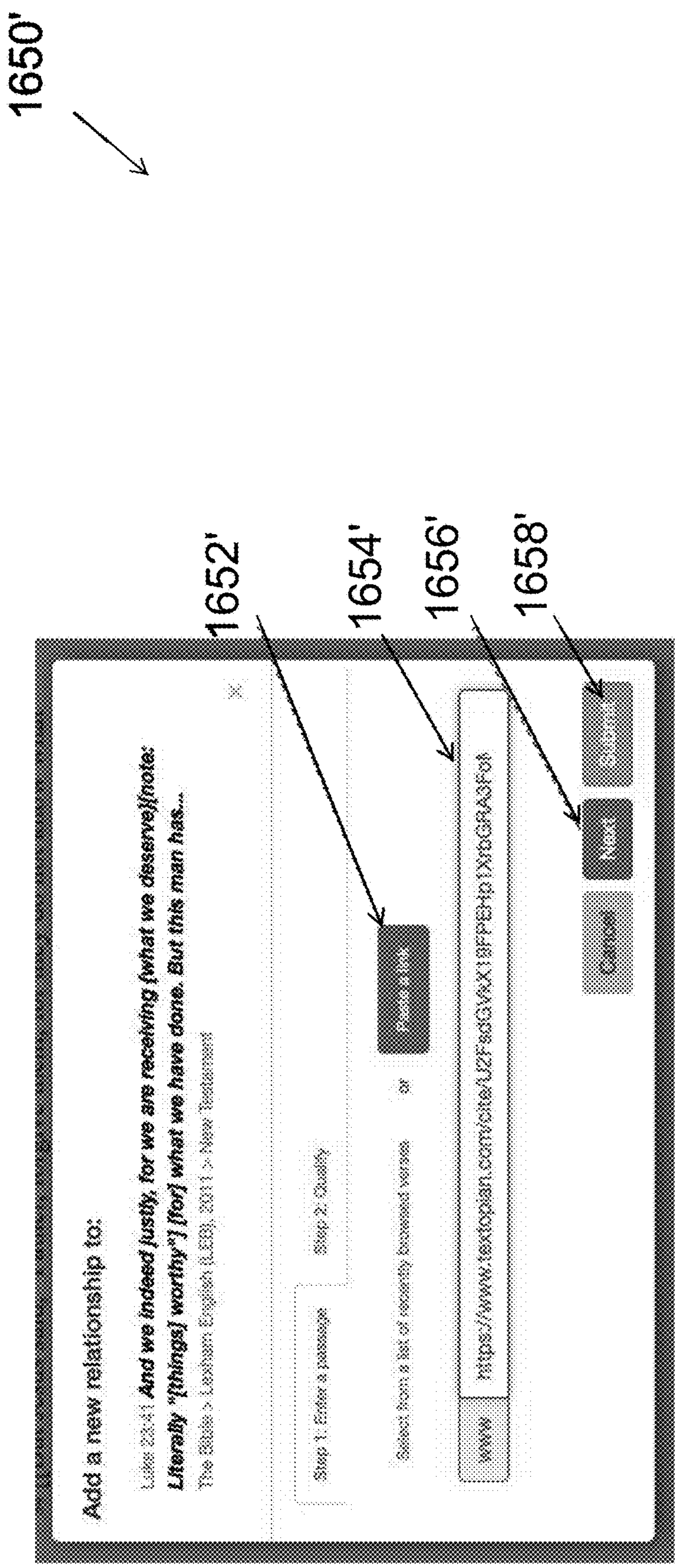
FIG. 16E illustrates a screenshot of an enter a passage page, in accordance with one embodiment of the present invention.

FIG. 16E illustrates a screenshot of an enter a passage page 1650', in accordance with one embodiment of the present invention.

The selecting new relationship-type page 1650' may include a paste a link button 1652', a website name box 1654', a next button 1656', and a submit button 1658'.

The paste a link button 1652' may paste another verse or passage within the overall system (FIG. 1, 100). The website name box 1654' may receive a Uniform Resource Locator or URL to transmit the verse or passage associated with the pasted link button 1652' to outside of the overall system 100. The next button 1656' may be activated to continue to qualify the pasted link button 1652'. The submit button 1658' may be activated to submit and save the verse or passage within or outside of the overall system 100.

Figure 16F:
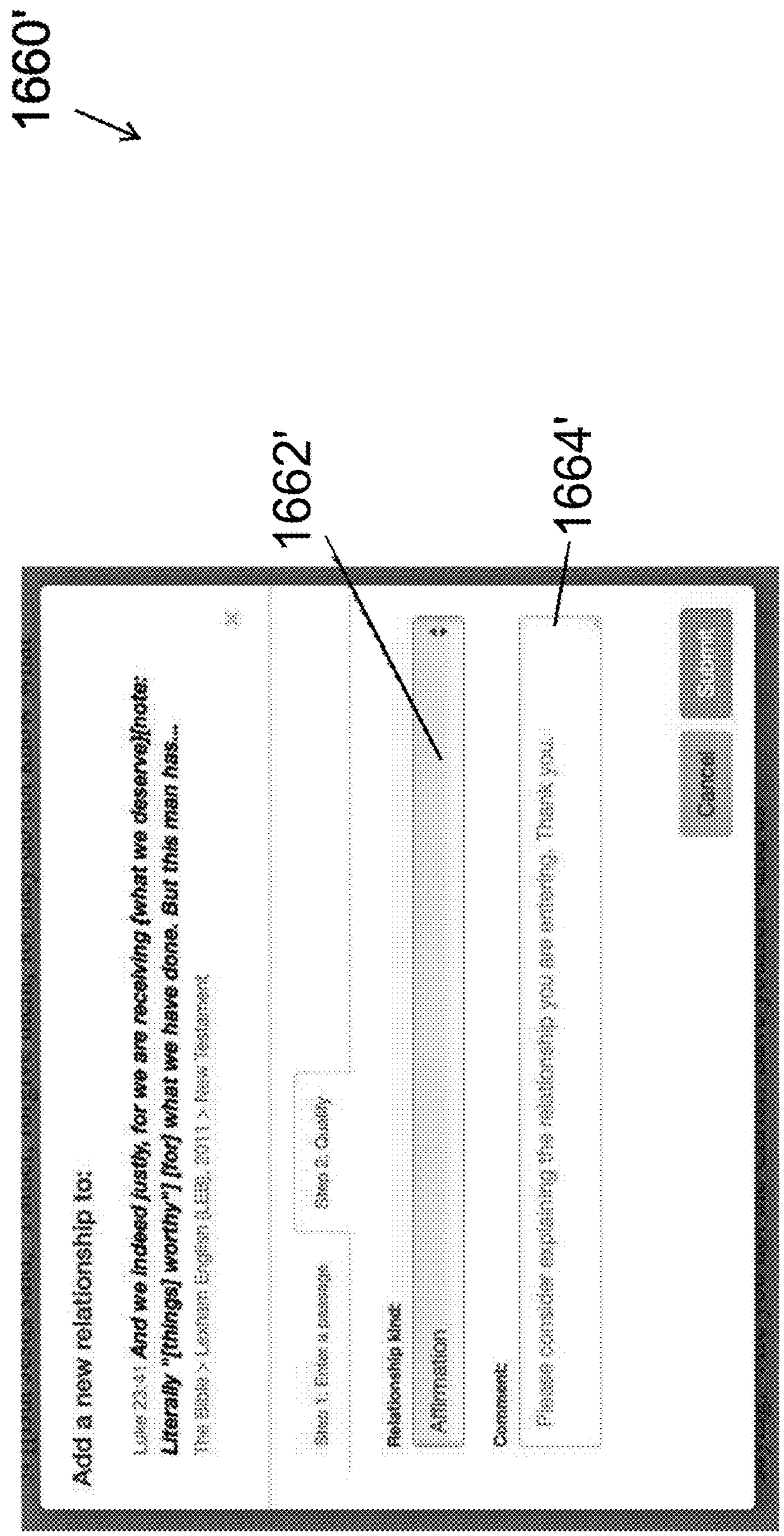
FIG. 16F illustrates a screenshot of a qualify page, in accordance with one embodiment of the present invention.

FIG. 16F illustrates a screenshot of a qualify page 1660', in accordance with one embodiment of the present invention.

The second selecting new relationship-type page 1660' may include a relationship kind dropdown 1662' and a comment section 1664'.

The relationship kind dropdown 1662' may select from a number of different relationship types (e.g., affirmation, negation, causality, character, place, time). The comment section 1664' may optionally explain and further elaborate on the relationship being established. The relationships page 1600', the selecting new relationship page 1630', and the pasting new relationship page 1640' may relate pieces of text content to each other.

Figure 17:
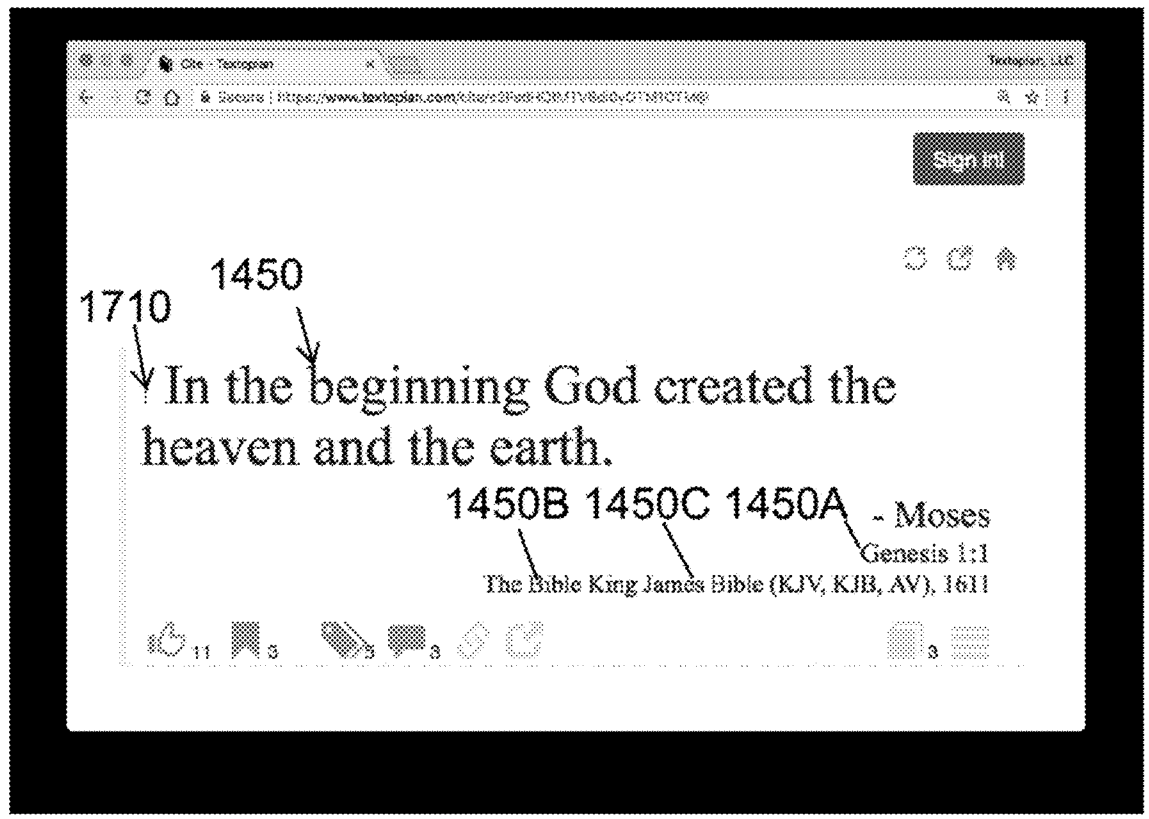
FIG. 17 illustrates a screenshot of a verse maximization page, in accordance with one embodiment of the present invention.

FIG. 17 illustrates a screenshot of a verse maximization page 1700, in accordance with one embodiment of the present invention.

The verse maximization page 1700 may include a maximization button (FIG. 12, 1260) and a context button 1710.

The maximization button 1260 may open the main text (FIG. 14, 1450) in isolation in a separate screen 1262. FIG. 17 illustrates a maximization button 1260 that is ghosted-out without a count (not shown) since the main text 1450 has never been maximized. The context button 1710 may display the main text 1450 in context when depressed. FIG. 17 illustrates a main text 1450 in context that is "Genesis 1:1" 1450A, from "The Bible" 1450B and more specifically the "King James Bible, 1611" 1450C.

Figure 18:
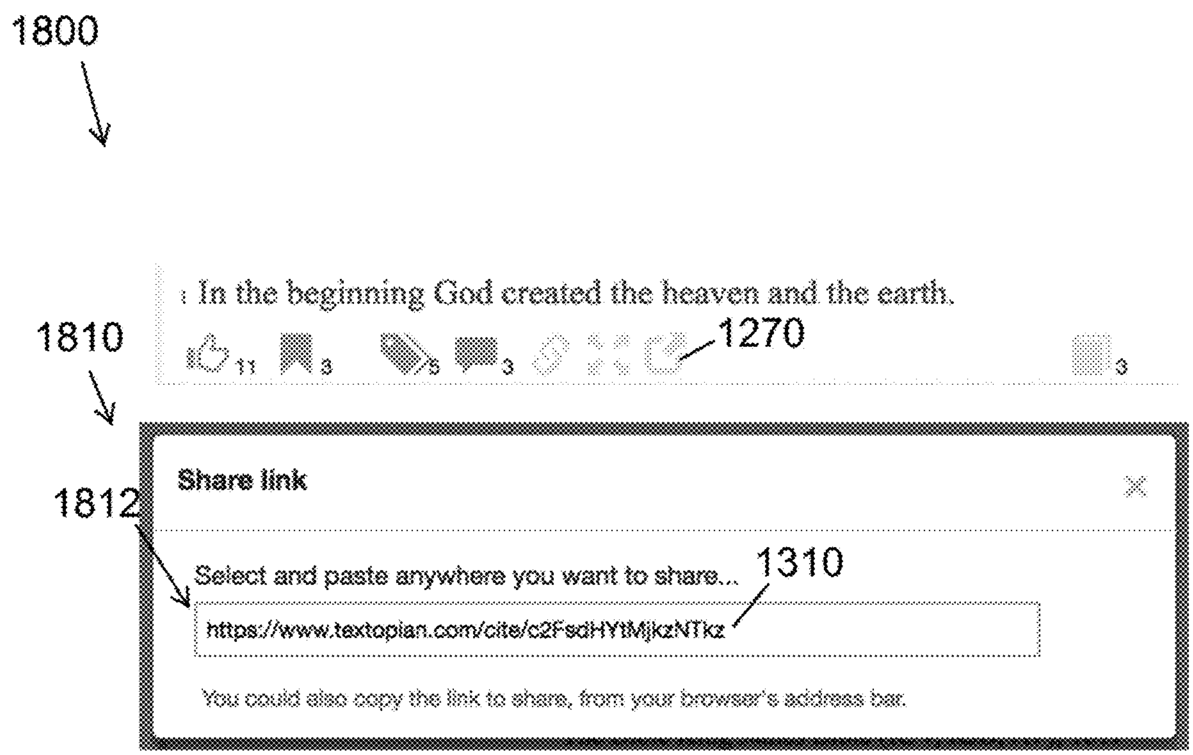
FIG. 18 illustrates a screenshot of a share button page, in accordance with one embodiment of the present invention.

FIG. 18 illustrates a screenshot of a share button page 1800, in accordance with one embodiment of the present invention.

The share button page 1800 may include a sharing button (FIG. 12, 1270) and a share button box 1810.

The sharing button 1270 may display a restful URL (FIG. 13, 1310) when depressed that is always associated with a unique main text (FIG. 14, 1450). The share button box 1810 may include a browser address bar 1812 with the restful URL 1310 disposed in the browser address bar 1812. The restful URL 1310 may be associated with a registered user or an unregistered user of the overall system (FIG. 1, 100). The users may cut and paste the restful URL 1310 into the browser address bar 1812.

Figure 19:
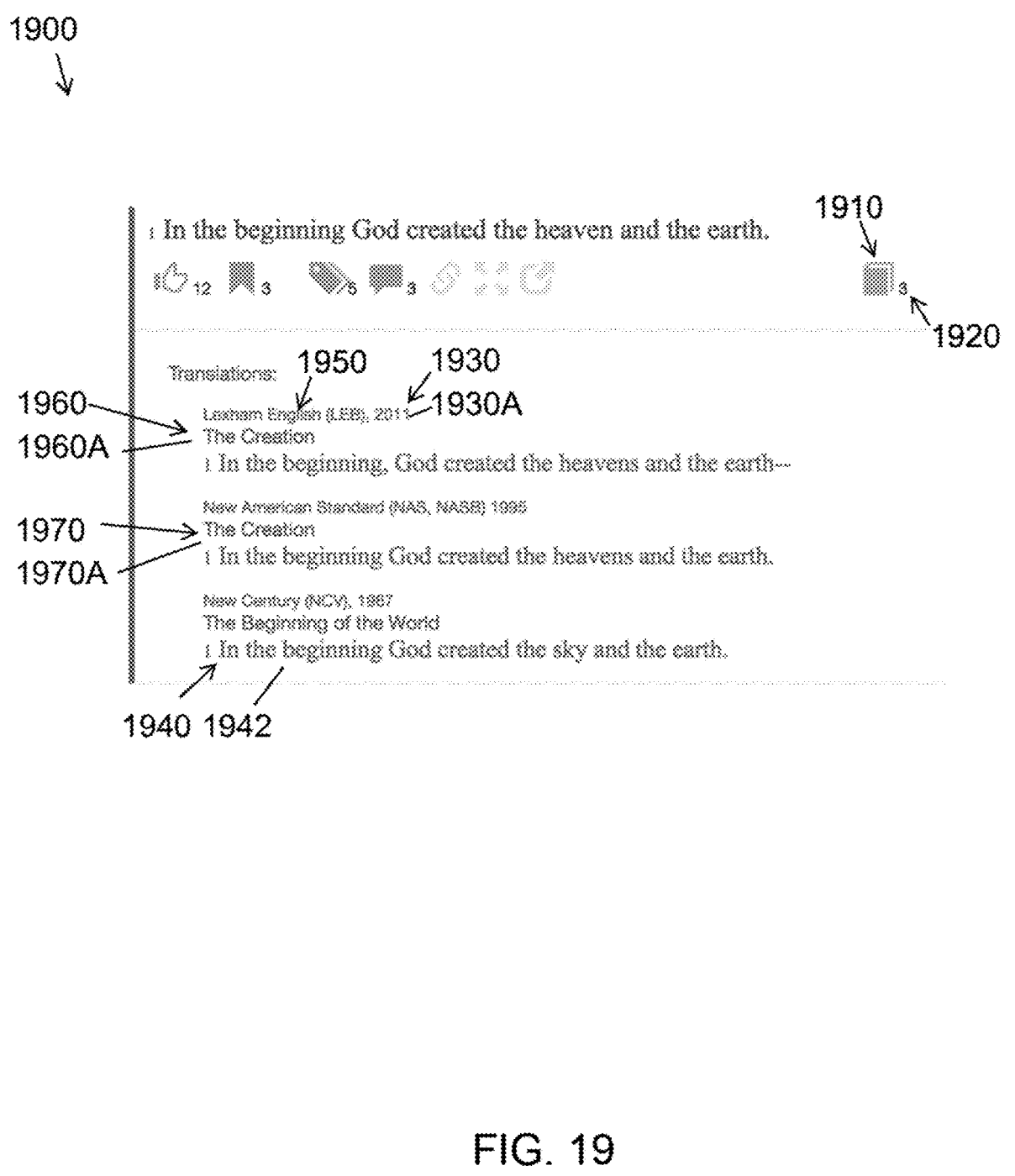

FIG. 19 illustrates a screenshot of a verse translation page 1900, in accordance with one embodiment of the present invention. The verse translation page 1900 allows for simultaneous display of other translations or interpretations (FIG. 19, 1940) of the same main text (FIG. 14, 1450).

The verse translation page 1900 may include a translation toggle button 1910, a translation count 1920, a translation publication date 1930, one or more equivalent translated texts 1940, a translation author 1950, a main text title 1960 and a main text count 1970.

The translation toggle button 1910 may be ghosted-out if there aren't any translations available. The translation count 1920 may indicate the number of translations available. The translation toggle button 1910 may be double clicked to toggle displaying translations in the same language or a default language or the like. The translation publication date 1930 may indicate a translation's original publication year 1930A. The one or more equivalent translated texts 1940 may be an available alternate translation 1942. The translation author 1950 may author the available alternate translation 1942. FIG. 19 illustrates "Lexham English" 1942A as the available alternate translation 1942. The main text title 1960 may be for each one of the equivalent translated texts 1940. FIG. 19 illustrates "The Creation" 1960A as the main text title 1960. The main text count 1970 may be the main text or verse number 1940. FIG. 19 illustrates "1" 1970A as the main text count 1970.

FIG. 20 illustrates a screenshot of a plurality of reactions page 2000, in accordance with one embodiment of the present invention.

The Reactions page 2000 may include a Reaction's button (FIG. 12, 1210), a plurality of Reaction emotes 2020, and a Reaction's count 2030.

The Reaction's button 1210 may be a Reaction's toggle button 1210A that may be depressed to disclose or close the Reaction emotes 2020. The Reaction emotes 2020 may each express one of a plurality of emotes reactions 2022. The emotes reactions 2022 may be provided with a lighter shading 2022A to indicate one or more current user's reactions. The emotes reactions 2022 may include "Like" 2022B, "Love" 2022C, "Haha" 2022D, "Wow" 2022E, "Doubt" 2022F, "Confused" 2022G, "Sad" 2022H, "Ew!" 2022I, "Scared" 2022J and "Angry" 2022K. The Reaction's count 2030 may be a total count of any registered user's matching emotes reactions 2022. FIG. 20 illustrates a "Like" emotes reaction 2022B with a "4" reaction's count.

The overall system (FIG. 1, 100) may generate aggregate charts of reaction frequencies at the verse, the paragraph, the chapter, the book, the volume and the title levels (not shown). The overall system 100 may also calculate an average reaction based on the frequency of reactions from registered users, at any available level in the overall system 100.

FIG. 21 illustrates a chart of available reactions 2100, in accordance with one embodiment of the present invention.

The chart of available reactions 2100 may include a Label column 2110, a Sentiment column 2120, a Weight column 2130 and a Description column 2140.

The Label column 2110 may correspond to the emotes reactions (FIG. 20, 2022) that may include "Like" (FIG. 20, 2022B), "Love" (FIG. 20, 2022C), "Haha" (FIG. 20, 2022D), "Wow" (FIG. 20, 2022E), "Doubt" (FIG. 20, 2022F), "Confused" (FIG. 20, 2022G), "Sad" (FIG. 20, 2022H), "Ew!" (FIG. 20, 2022I), "Scared" (FIG. 20, 2022J) and "Angry" (FIG. 20, 2022K). The Sentiment column 2120 may be "Positive" or "Negative" for each of the emotes reactions 2022 in the label column 2110. The Weight column 2130 may assign a positive or a negative quantitative weighted value in the approximate range between 10 and −10 or the like for each of the emotes reactions 2022 in the label column 2110. The Description column 2140 may provide a description for each of the emotes reactions 2022 in the label column 2110.

Figure 22:
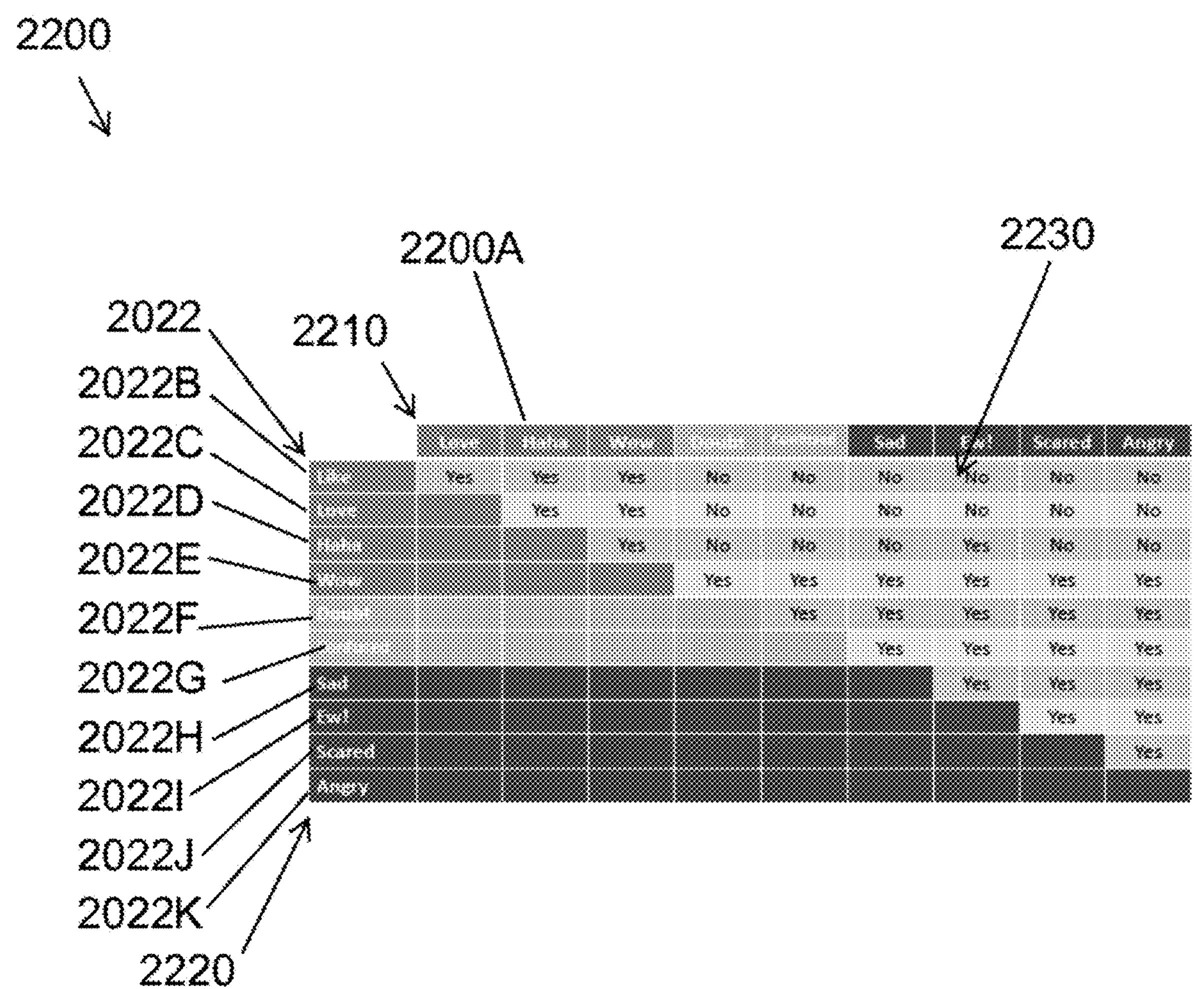
FIG. 22 illustrates a chart of a reaction compatibility, in accordance with one embodiment of the present invention.

FIG. 22 illustrates a chart of a reaction compatibility 2200, in accordance with one embodiment of the present invention.

The chart of a reaction compatibility 2200 may include an X-axis 2210, a Y-axis 2220 and a plurality of corresponding matrixes 2230.

The X-axis 2210 may be disposed along a top edge 2200A of the chart of a reaction compatibility 2200. The Y-axis 2220 may also correspond to the emotes reactions (FIG. 22, 2022) that may include "Like" 2022B, "Love" 2022C, "Haha" 2022D, "Wow" 2022E, "Doubt" 2022F, "Confused" 2022G, "Sad" 2022H, "Ew!" 2022I, "Scared" 2022J and "Angry" 2022K. The emotes reactions 2022 may generally be interpreted as positive, neutral or negative moving from top to bottom along the Y-axis 2220. The corresponding matrixes 2230 may indicate compatibility between the X-axis 2210 emotes reactions 2022 and the Y-axis 2220 emotes reactions 2022 with "Yes" or "No".

Figure 23:
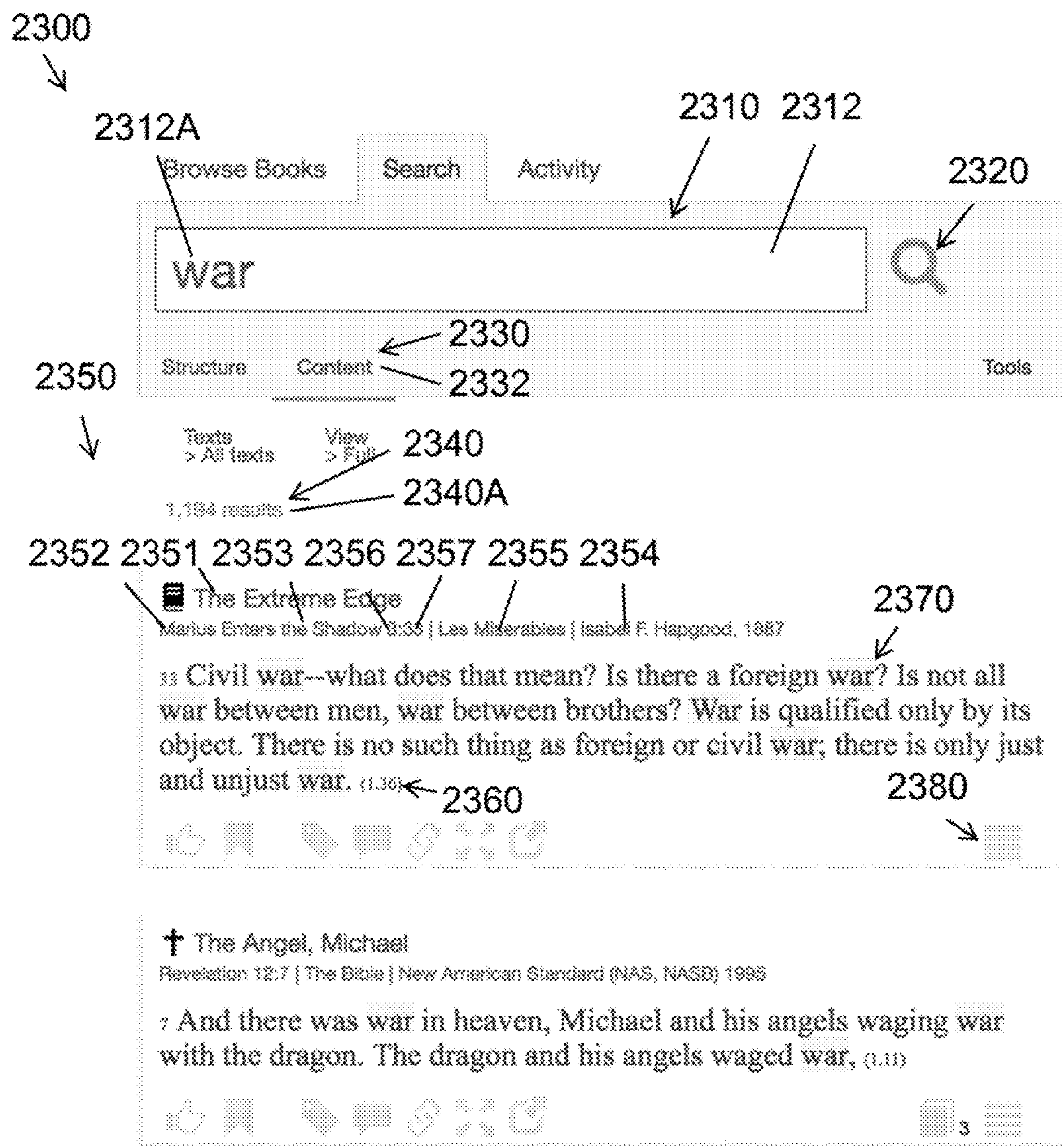
FIG. 23 illustrates a screenshot of a search page, in accordance with one embodiment of the present invention.

FIG. 23 illustrates a screenshot of a search page 2300, in accordance with one embodiment of the present invention.

The search page 2300 may include a search textbox 2310, a search trigger button 2320, a content button 2330, a matching verse count 2340, a plurality of search results 2350, a relative matching score 2360, a word highlighting feature 2370 and a content button 2380.

The search textbox 2310 may allow for an exact phrase or word 2312 searching. FIG. 23 illustrates an exact phrase or word 2312 being the word "war" 2312A. The search trigger button 2320 may be depressed to activate the search textbox 2310 to search the exact phrase or word 2312. The content button 2330 may open-up a chapter or sub-section 2332 the exact phrase or word belongs to. The matching verses count 2340 may indicate the number of search results. FIG. 23 illustrates a matching verse count 2340 of 1,194 results 2340A. The search results 2350 may display a title 2351 of the chapter or sub-section 2352 a verse 2353 belongs in, a name 2354 of a volume or book 2355, a chapter number 2356 and a verse number 2357. The overall system 100 creates and casts verse numbers 2357 for the title 2351 or the book 2355 that were not originally written and separated into the verse 2353. The relative matching score 2360 may be for text-based searching using a documents-based NoSQL database (FIG. 29, 2900). The word highlighting feature 2370 may include automatically highlighting the exact phrase or word 2312 in the chapter or sub-section 2352 the verse 2353 belongs in. The content button 2380 opens-up the chapter or sub-section 2352 the verse 2353 belongs in.

Figure 24:
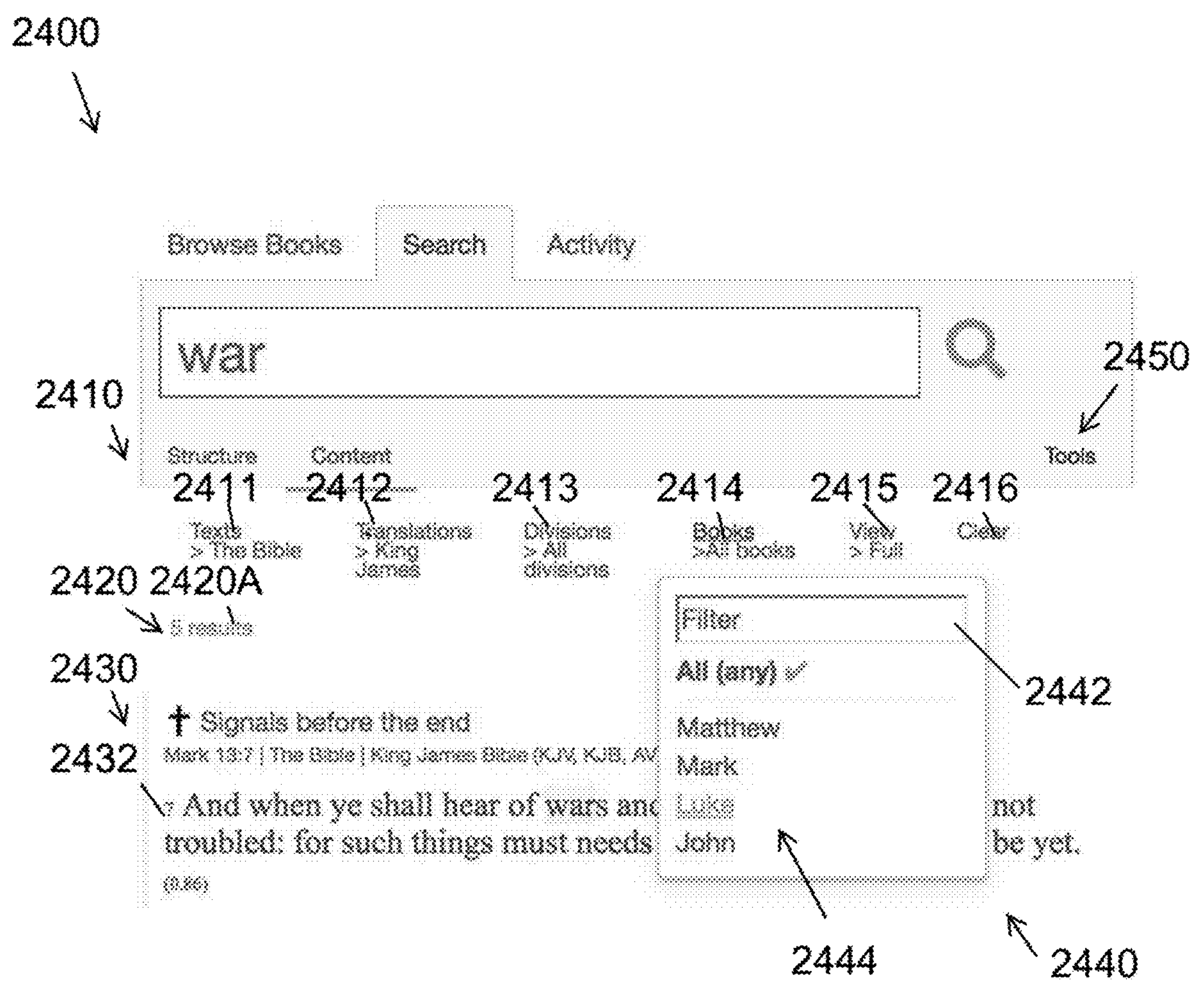
FIG. 24 illustrates a screenshot of a plurality of search tools page, in accordance with one embodiment of the present invention.

FIG. 24 illustrates a screenshot of a plurality of search tools page 2400, in accordance with one embodiment of the present invention.

The search tools page 2400 may include a plurality of hierarchical filters 2410, a match displayed count 2420, a search results pane 2430, a menu options filter 2440, and a search refinements button 2450.

The hierarchical filters 2410 may include a texts toggle button 2411, a translation toggle button 2412, a divisions toggle button 2413, a books toggle button 2414, a view toggle button 2415, and a clear toggle button 2416. The view toggle button 2415 may toggle between the verbosity of each match found in the search results pane 2430. The clear toggle button 2416 may reset the hierarchical filters 2410 and go back to searching every part of every available title. The match displayed count 2420 may indicate the number of found matches from the search. FIG. 24 illustrates 5 results 2420A or 5 match displayed count 2420. The search results pane 2430 may display the hierarchical filters 2410, the match displayed count 2420 and one or more search results 2432. The menu options filter 2440 may facilitate browsing when the number of hierarchical filters 2410 are too numerous and too relatively easy to quickly browse through. The menu options filter 2440 may include an additional search textbox 2442 having a plurality of books 2444 for the selected title or text disposed underneath the additional search textbox 2442. The search refinements button 2450 may be depressed to go back to searching every part of every available title.

Figure 25:
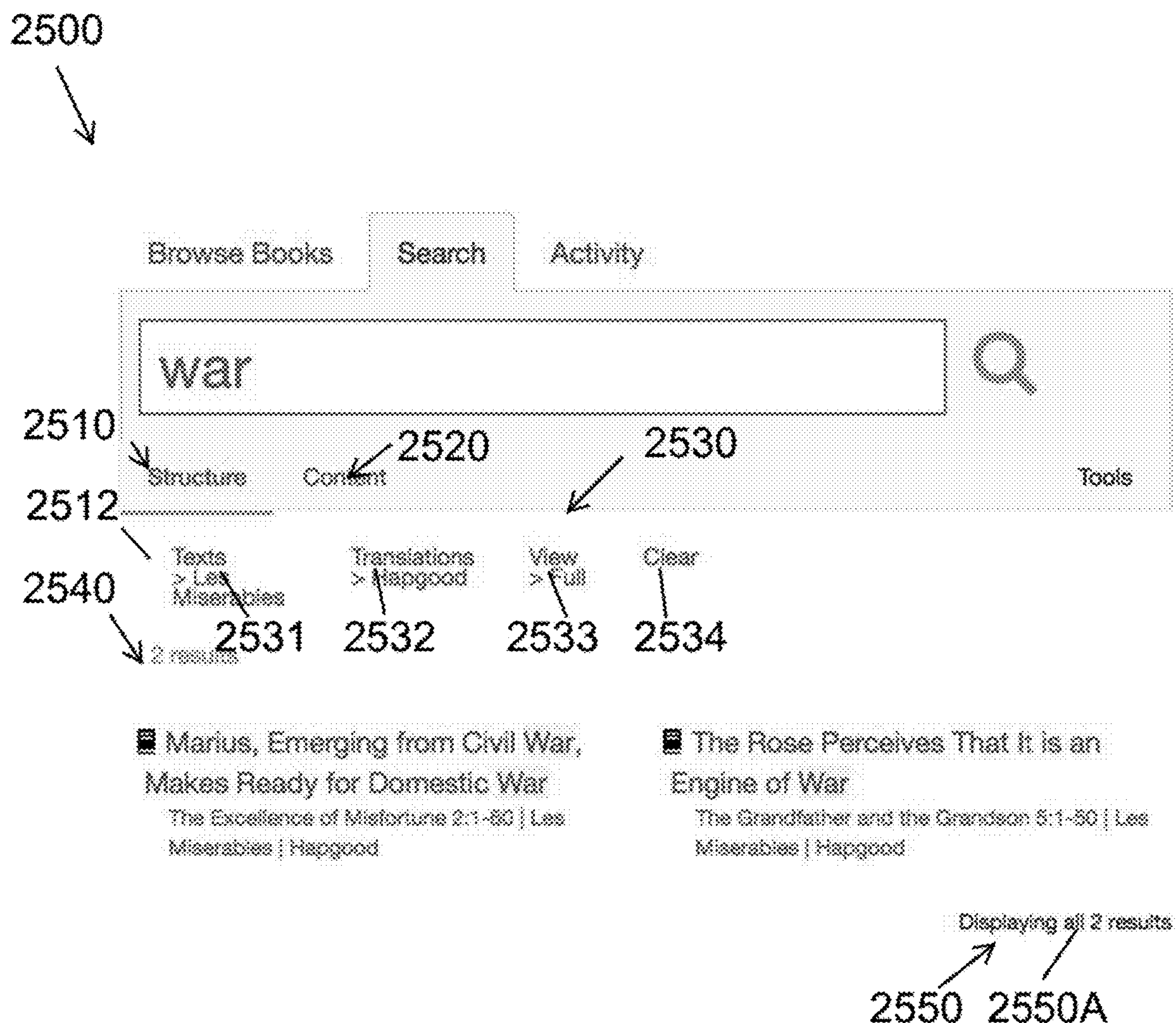
FIG. 25 illustrates a screenshot of a structure search page, in accordance with one embodiment of the present invention.

FIG. 25 illustrates a screenshot of a structured search page 2500, in accordance with one embodiment of the present invention.

The structured search page 2500 may include a structure button 2510, a content button 2520, a plurality of hierarchical filters 2530, one or more search results 2540 and a total match count 2550.

The structure button 2510 may be depressed to toggle a structure search pane 2512 to display or close the structure search pane 2512. The content button 2520 may toggle back and forth between the structure button 2510. The hierarchical filters 2530 may have a texts button 2531, a translation button 2532, a view button 2533 and a clear button 2534 or the like. The one or more search results 2540 may include the volume title, the book title, the chapter title or the chapter subtitle that matches a search term. The total match count 2550 may confirm that all matches are now being displayed. FIG. 25 illustrates a total match count 2550 "Displaying all 2 results" 2550A.

Figure 26A:
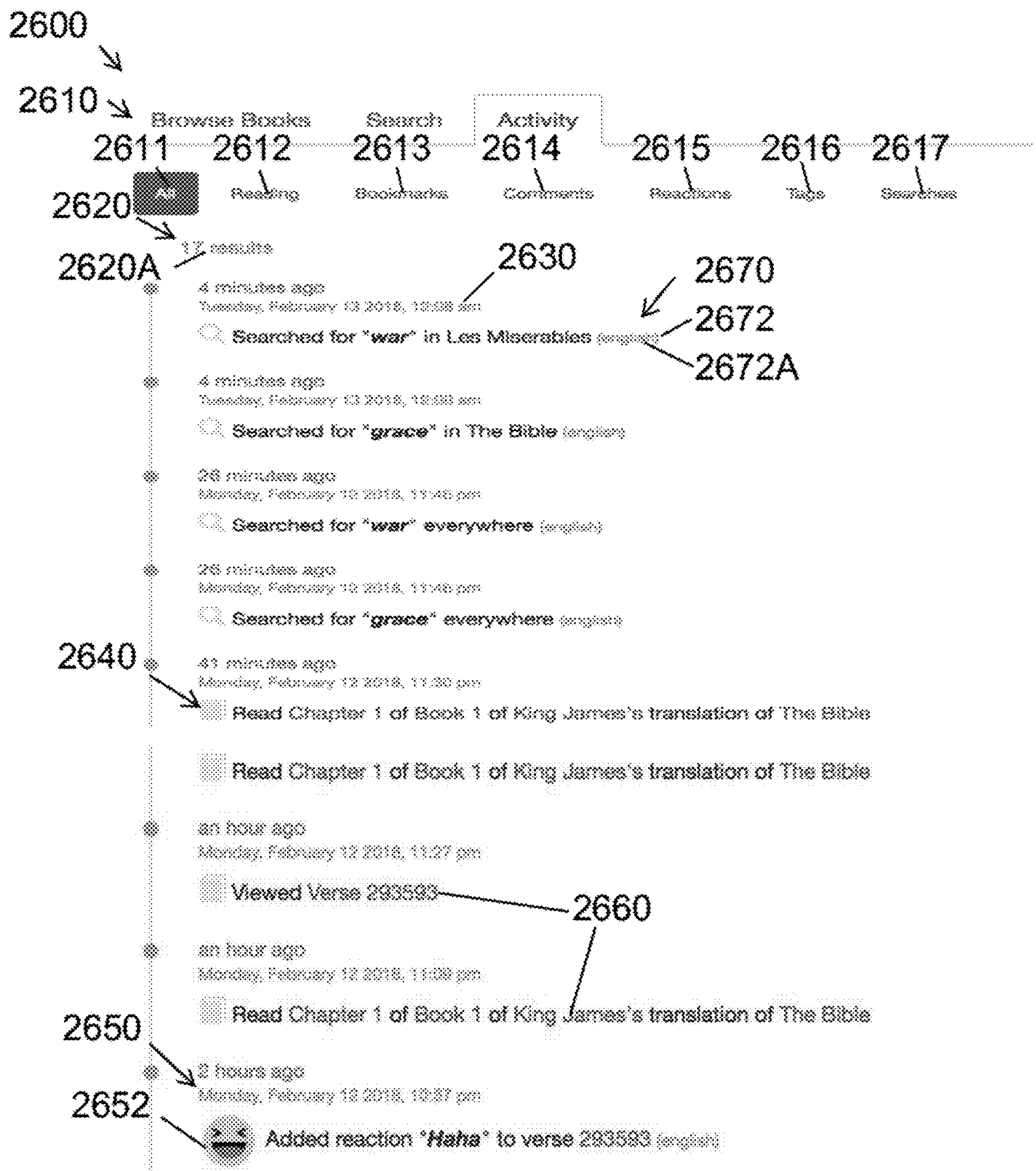
FIG. 26A illustrates a screenshot of an activity log page, in accordance with one embodiment of the present invention.

FIG. 26A illustrates a screenshot of an activity log page 2600, in accordance with one embodiment of the present invention.

The activity log page 2600 may include a plurality of activity type filters 2610, a number of actions or activities logged 2620, a timestamp 2630, an indicia 2640, one or more reactions 2650, one or more actionable buttons 2660 and a description of the action taken by the user 2670.

The activity type filters 2610 may include an "All" filter 2611, a "Reading" filter 2612, a "Bookmarks" filter 2613, a "Comments" filter 2614, a "Reactions" filter 2615, a "Tags" filter 2616 and a "Searches" filter 2617. The number of actions or activities logged 2620 may be for the selected activity type of filter. FIG. 26 illustrates 17 results 2620A as the number of actions or activities logged 2620. The timestamp 2630 may be a time at which the activity took place, displaying the time with the user's local browser time zone. The indicia 2640 may indicate an action that took place. The one or more reactions 2650 may be logged and listed utilizing the indicia 2640. The one or more reactions 2650 may have an emote 2652. The one or more actionable buttons 2660 may take the user to the text the activity refers to which facilitate revisiting content. The description of an action taken by the user 2670 may include a language 2672 of the action. FIG. 26 illustrates the language 2672 being English 2672A.

Figure 26B:
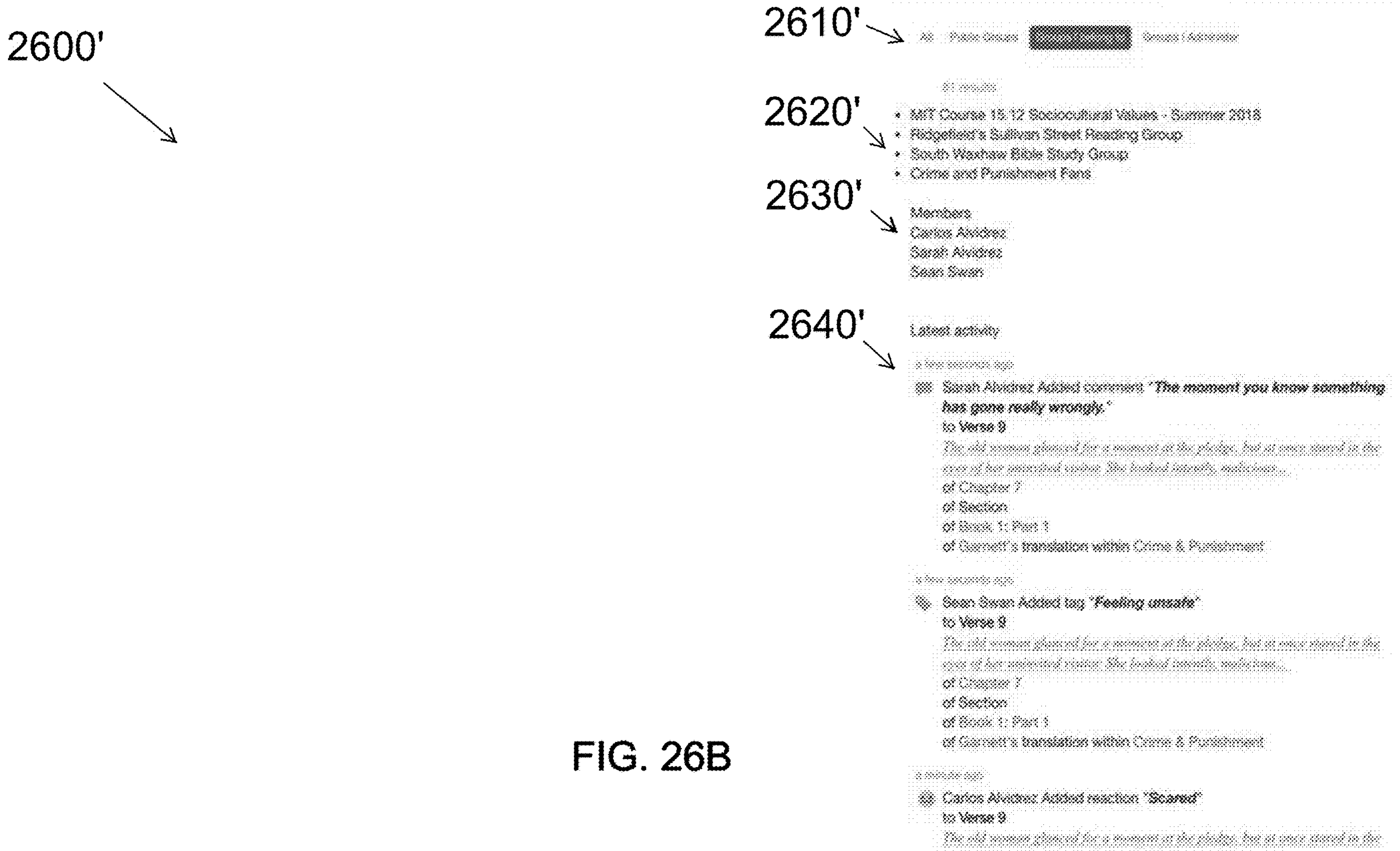
FIG. 26B illustrates a screenshot of a groups page, in accordance with one embodiment of the present invention.

FIG. 26B illustrates a screenshot of a groups page 2600', in accordance with one embodiment of the present invention.

The groups page 2600' may include a plurality of filter groups 2610', a plurality of user desired filters 2620', a plurality of non-anonymous users 2630', and a chronological listing of user activities 2640'.

The filter groups link 2610' may include all groups, public groups, groups I belong to and groups that I administer and the like. The user desired filters 2620' may display the groups according to the user desired filter. The non-anonymous users 2630' may include members of the group who have chosen to not be anonymous. The chronological listing of user activities 2640' may include a list of all member activity is presented from most recent to oldest.

Figure 26C:
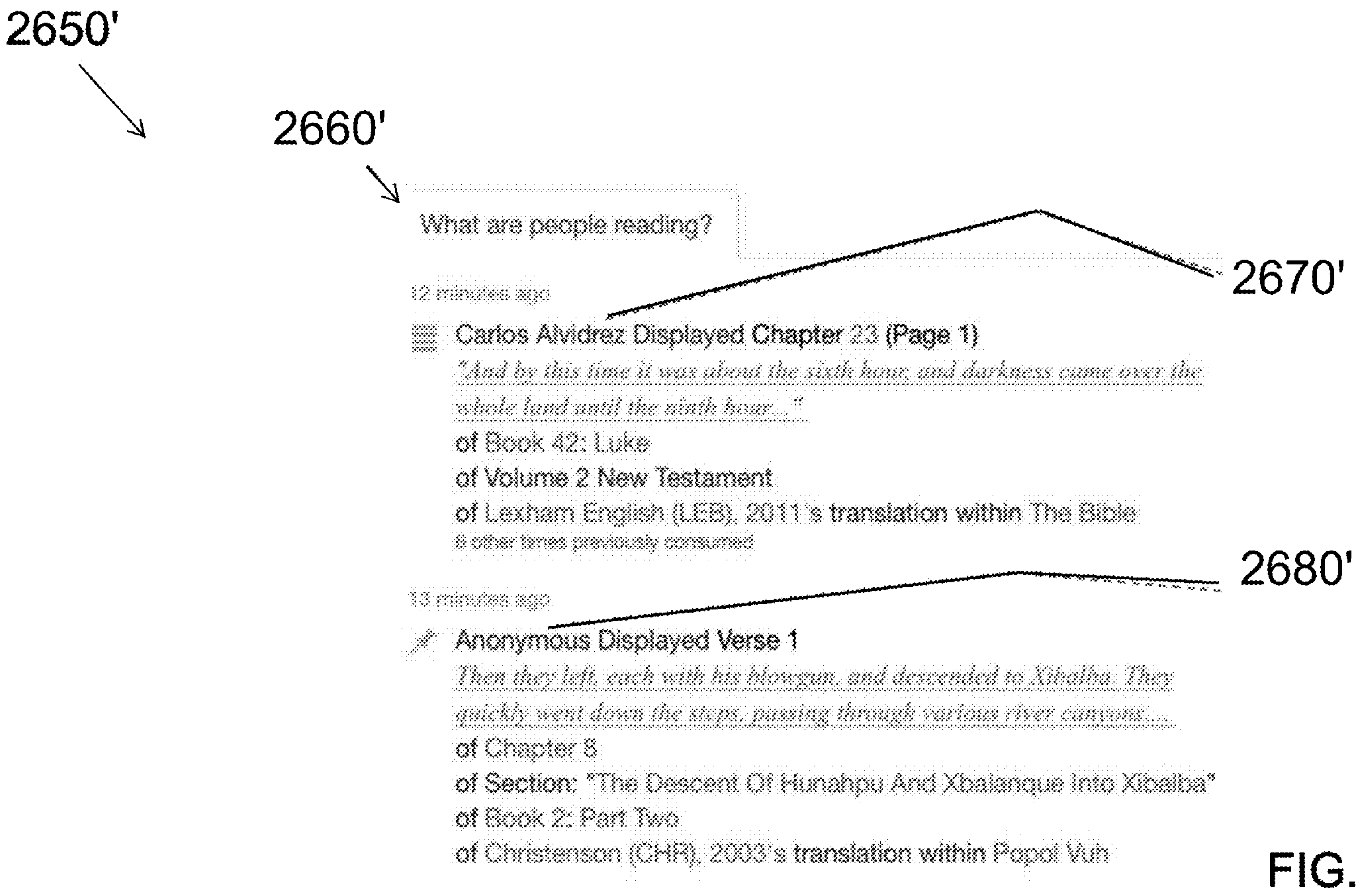
FIG. 26C illustrates a screenshot of a "What People Are Reading" page, in accordance with one embodiment of the present invention.

FIG. 26C illustrates a screenshot of a "What People Are Reading" page 2650', in accordance with one embodiment of the present invention.

The "What People Are Reading" page 2650' may include a home page 2660', a plurality of shared public information 2670' and one or more anonymous displays 2680'.

The home page 2660' may allow a user to see a live running list of other user's activity (e.g., what they are reading, their one or more reactions, one or more bookmarks, one or more tags, one or more comments, etc.). The shared public information 2670' may allow the user to share their activity publicly or not, according to user name or pseudonym. The one or more anonymous displays 2680' may share the user's activity anonymously or not.

FIG. 27 illustrates a pair of screenshots of a verse anatomy page 2700, in accordance with one embodiment of the present invention.

The verse anatomy page 2700 may include a unique title identifier 2710, a unique translation identifier 2720, one or more hierarchical classification levels 2730, a verse key attribute 2740, a universal immutable identification or ID 2750, and a plurality of system groupings 2760.

The unique title identifier 2710 may be a book (not shown), an article (not shown), a document (not shown) or the like. The unique translation identifier 2720 may be a title (not shown) or a book (not shown) that could have one or more multiple translations. The one or more hierarchical classification levels 2730 may include a title (not shown), a volume (not shown), a book (not shown), a chapter (not shown), a paragraph (not shown), and a verse (not shown). The verse key attribute 2740 may allow for mapping of the verse amongst one or more translations. The universal immutable ID 2750 may be a universal, immutable and constant verse identification or ID 2752. The system groupings 2760 may group one or more short sentences into one or more of the verses and decomposes one or more of the verses into one or more individual sentences on the server side.

FIG. 28 illustrates a screenshot of a verse database back-end 2800, in accordance with one embodiment of the present invention.

The verse database back-end 2800 may include a universal immutable identification or ID 2810, a language 2820, one or more hierarchical verse classifications 2830, a relative verse number 2840, a plurality of verse text content 2850, a registration date and time 2860 and a depositor's ID 2870.

The universal immutable ID 2810 may be a universal, immutable and constant verse identification or ID 2812. The language 2820 may be the language the title is written in. The one or more hierarchical verse classifications 2830 may be for a verse, which may be a volume, a book, a chapter, a paragraph, a title or a translation (all not shown).

The relative verse number 2840 may be for the title (not shown) and the chapter (not shown). The verse text content 2850 may include the verbatim content of the verse text content 2850. The registration date and time 2860 may be the time that the verse (not shown) is officially registered in the overall system (FIG. 1, 100). The depositor's ID 2870 may be for the person that performed ingestion of the verse (not shown) into the electronic text repository (FIG. 2B, 256).

FIG. 29A illustrates a screenshot of a text processing engine 2900, in accordance with one embodiment of the present invention.

The text processing engine 2900 may include a plurality of modularized components 2910.

The modularized components 2910 may be processed by a parser (not shown) that receives a plurality of raw text, cleans the raw text, and splits the title of the raw text into one or more volumes, one or more books, one or more chapters, one or more paragraphs, one or more sentences, and one or more verses. The raw text may be a text file, a web service call with Java script object notation or JSON or extensible markup language or XML message response. The raw text may be cleaned by removing headers, page numbers, subtitles and the like.

FIG. 29B illustrates a screenshot of a footnotes page 2920, in accordance with one embodiment of the present invention.

The footnotes page 2920 may include one or more footnotes 2922 preserved and linked to the paragraph or verse where they were found. The one or more footnotes 2922 may be added to the bottom of the corresponding text 2924 on the footnotes page 2920. FIG. 30A and FIG. 30B illustrate a plurality of terms and conditions 3000, in accordance with one embodiment of the present invention. More specifically, FIG. 30A illustrates a first page 3000A of the terms and conditions 3000 and FIG. 30B illustrates a second page 3000B of the terms and conditions 3000. There are several additional pages of the terms and conditions 3000 between the first page 3000A and the second page 3000B that are not shown.

Figure 31A:
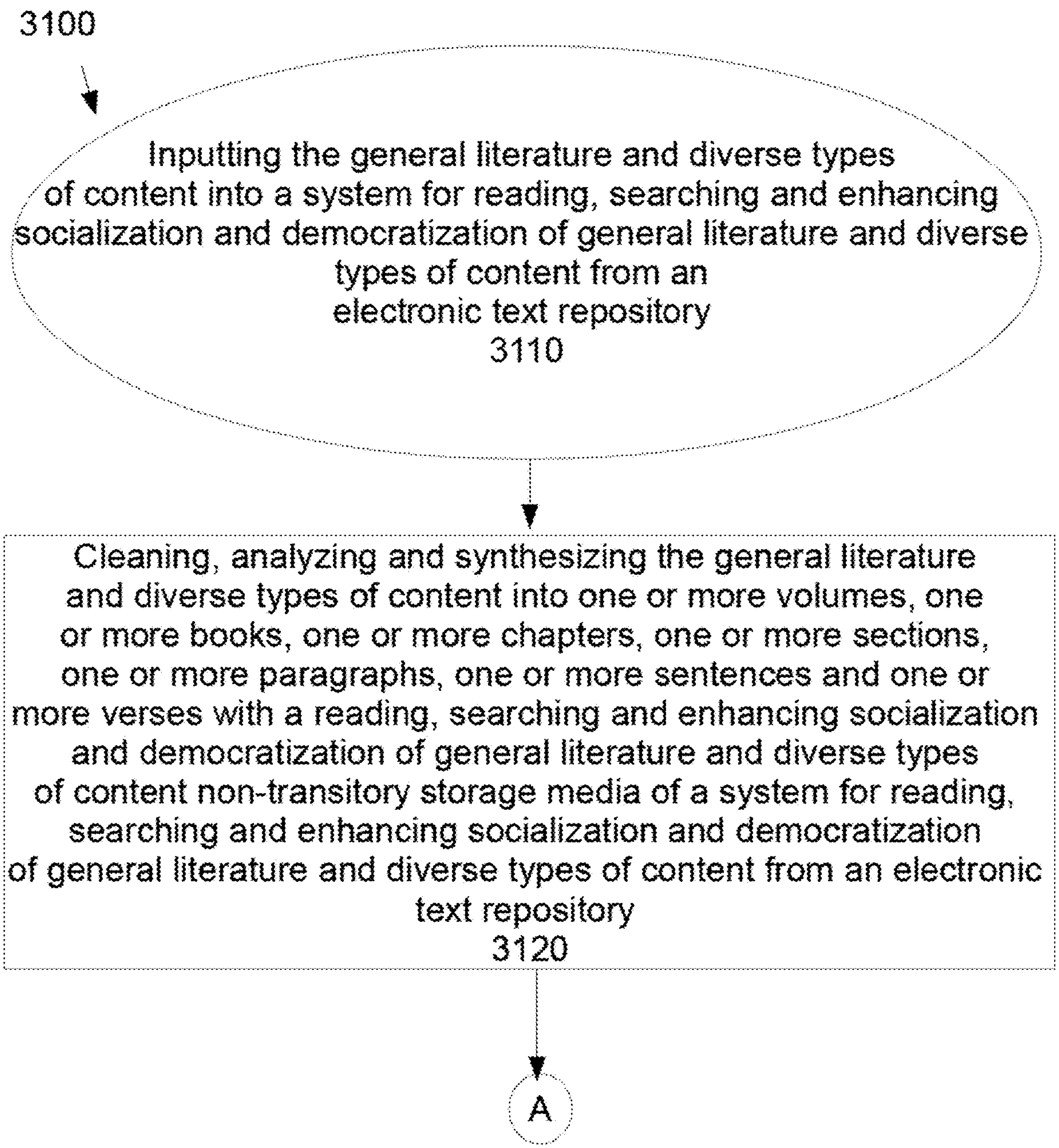

FIG. 31A and FIG. 31B illustrate a flowchart of a method for reading, searching and enhancing socialization and democratization of general literature and diverse types of content from an electronic text repository 3100, in accordance with one embodiment of the present invention.

The overall method 3100 may include the steps of inputting the general literature and diverse types of content into a system for reading, searching and enhancing socialization and democratization of general literature and diverse types of content from an electronic text repository 3110, cleaning, analyzing and synthesizing the general literature and diverse types of content into one or more volumes, one or more books, one or more chapters, one or more sections, one or more paragraphs, one or more sentences and one or more verses with a reading, searching and enhancing socialization and democratization of general literature and diverse types of content non-transitory storage media of a system for reading, searching and enhancing socialization and democratization of general literature and diverse types of content from an electronic text repository 3120, inspecting the general literature and diverse types of content with the reading, searching and enhancing socialization and democratization of general literature and diverse types of content non-transitory storage media 3130 and persisting the general literature and diverse types of content back into the reading, searching and enhancing socialization and democratization of general literature and diverse types of content non-transitory storage media 3140.

The overall method 3100 may be performed by reading, searching and enhancing socialization and democratization of general literature and diverse types of content non-transitory storage media (FIG. 2B, 256).

The system and method for reading, searching and enhancing socialization and democratization of general literature and diverse types of content from an electronic text repository may indicate that every time someone reads, bookmarks, tags, comments, reacts-to and share content, the overall system is fed and enabled for ever-better searching results. An electronic text repository may search over the body of the original content/text, but also on the tags people add to a given text piece. The overall system and method may democratization of the interpretation of written content, and the leveraging of such contributions for the identification of topics, keywords and overall for the betterment of the search engine.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

The invention claimed is:

1. A system for reading, searching and enhancing socialization and democratization of a plurality of general literature and diverse types of content from an electronic text repository, comprising:

a server system with a processor system, a communications interface, a communications system, an input system and an output system, the server system having access to a communications network;

a memory system with an operating system, a communications module, a web browser module, a web server application and a reading, searching and enhancing socialization and democratization of general literature and diverse types of content nontransitory storage media, the electronic text repository residing on the reading, searching and enhancing socialization and democratization of general literature and diverse types of content non-transitory storage media, the memory system is in communication with the server system through the communications network and the electronic text repository includes the general literature and diverse types of content; and a website having a plurality of web pages, the web pages reside on the electronic text repository and include the general literature and diverse types of content;

wherein the web pages include a home page, a signup page, a pair of Facebook authentication pages, a Google authentication page, a Twitter authentication page, an authenticated home page, a plurality of Title hierarchical subdivisions, a Browse Titles page, a Passage display page, a user-generated content page, a universal identifier and web-address page, a given cite page, a plurality of tags page, a plurality of comments page, a verse maximization page, a share button page, a verse translation page, a plurality of reactions page, a search page, a plurality of search tools page, a structured search page, a content search page, an activity log page, a verse anatomy page, a continue reading page, a relationships page, a selecting new relationship page, a pasting new relationship page, an enter a passage page, a qualify page, a groups page, a "What People Are Reading" page, a footnotes page, and a plurality of terms and conditions; and wherein the authenticated home page includes a user dropdown, a local language dropdown, a reload button, a share button, a Browse Titles tab, one or more available titles, and an identifying button.

2. The system according to claim 1, further comprising a client system, the client system accesses the server system via the communications network.

3. The system according to claim 1, wherein the Browse Titles page includes a plurality of parts each represented by a horizontal bar and a plurality of chapters each represented by a circle with a number within the circle indicating the number of the chapter for direct and easy navigation in order to start reading as soon as possible.

4. The system according to claim 1, wherein the Passage display page includes a SignOut button, a plurality of page navigation buttons, a plurality of passage navigation buttons, a translation toggle arrow, a number of verses, a name of a title, a part, a chapter and a subdivision of the chapter.

5. The system according to claim 4, wherein the page navigation buttons include a user's browser local language, a reload button, a share button and a home button and the passage navigation buttons include a return to beginning button, a return to previous chapter button, a display entire chapter button and a next chapter button.

6. The system according to claim 1, wherein the user-generated content page includes a Reaction's button, a bookmark button, a tag button, a comment button, a relationships button, a maximization button, a sharing button and a text comment button.

7. The system according to claim 1, wherein the reactions page includes a reaction's toggle button, a plurality of reaction emotes that each express a reaction and each includes a number of logged-in user's reactions with a lighter shading for one or more current user's reactions.

8. The system according to claim 7, wherein the reaction includes like, love, haha, wow, doubt, confused, sad, ew!, scared and angry.

9. The system according to claim 6, wherein the tags page that includes a tags toggle button, one or more named tags each with a pair of positive and negative buttons to express support or disapproval, lighter shading to indicate the user has not contributed any tags and a new tag free-form placeholder.

10. The system according to claim 1, wherein the comments page includes a comments button to display or hide a plurality of comment button information, a total number of comments, a comment user's name, a comment user's photo, a user's comment entry, a comment user's reaction utilizing the reaction emotes, a timestamp expressed in a number of years, months, days, hours, minutes or "Now" and a text box to enter an additional comment.

11. The system according to claim 1, wherein the universal identifier and web-address page includes a restful URL or web-address for any content displayed that will always yield an exact same passage, a type of content being displayed which could be a chapter, part of a chapter, a paragraph or a verse and provides a machine-readable universal identifier for the passage.

12. The system according to claim 1, wherein the verse translation page allows for simultaneous display of other translations of the same verse in the same or different one or more languages and includes a name or author of an additional translation, the title or the chapter to which the verse belongs in an alternative translation, a verse number, an actual equivalent text, a verse or a paragraph in the alternative translation, the translations an original publication year, a verse translation button that indicates a number of other translations available and toggles to disappear if there aren't other translations available.

13. The system according to claim 1, wherein the search page includes a search textbox, a structure button and a content button, a matching verses count, one or more search results that each display the title of the chapter or sub-section the verse belongs in, the name of the volume or the book, a context button, a search highlight feature and the chapter number and the verse number, wherein the verse numbers are created and cast that were not originally written and separated into the verse.

14. The system according to claim 1, wherein the search tools page includes a plurality of hierarchical filters having a texts button, a translation button, a divisions button, a books button, a view button and a clear button, a number of matches displayed, a search results pane, a menu options filter with a list of books and a search scope refinements tools toggle button.

15. The system according to claim 1, wherein the title structure search page includes a structure button, a content button, a plurality of hierarchical filters having a texts button, a translation button, a view button and a clear button, one or more search results that include the volume title, the book title, the chapter title or the chapter subtitle that matches a search term and a total match count result confirming that all matches are now being displayed.

16. The system according to claim 1, wherein the activity log page includes a plurality of activity type filters that include all, reading, book marks, comments, reactions, tags and searches, a number of actions or activities logged, a timestamp, an button indicating an action that took place, one or more reactions having an emote, one or more actionable buttons that take the user to the text the activity refers to in order to facilitate revisiting of content and a description of the action taken by the user.

17. The system according to claim 1, wherein the continue reading link page includes a continue reading link, a plurality of social media buttons, a plurality of filters and a plurality of sorting categories.

18. The system according to claim 1, wherein the relationships page includes the main text is contacted and swiped over in a left direction or a right direction to display a previous verse and a following verse or the main text is contacted and swiped over while displayed.

19. The system according to claim 18, wherein the relationships page allows a single left finger swipe or a single right finger swipe that changes the text's page when paginated, a double-finger swipe that moves to a next chapter, a triple-finger swipe that moves to a next book, a next volume or a next part in the system and a four-finger swipe moves the user to a next text or a next title in the system.

20. The system according to claim 1, wherein the relationships page, the selecting new relationship page, and the pasting new relationship page relate pieces of text content to each other.

21. The system according to claim 1, wherein the groups page includes a plurality of filter groups, a plurality of user desired filters, a plurality of non-anonymous users, and a chronological listing of user activities; and, wherein the "What People Are Reading" page includes a home page, a plurality of shared public information and one or more anonymous displays.

* * * * *